United States Patent
Beckmann et al.

(10) Patent No.: US 8,364,295 B2
(45) Date of Patent: **\*Jan. 29, 2013**

(54) INTERACTIVE SOUND REPRODUCING

(75) Inventors: Paul E. Beckmann, Southborough, MA (US); Santiago Carvajal, West Newton, MA (US); Christopher H. Perry, Westborough, MA (US)

(73) Assignee: Bose Corporation, Framingham, MA (US)

( * ) Notice: Subject to any disclaimer, the term of this patent is extended or adjusted under 35 U.S.C. 154(b) by 591 days.

This patent is subject to a terminal disclaimer.

(21) Appl. No.: 11/608,034

(22) Filed: Dec. 7, 2006

(65) Prior Publication Data

US 2007/0142945 A1    Jun. 21, 2007

Related U.S. Application Data

(63) Continuation of application No. 09/689,337, filed on Oct. 12, 2000, now Pat. No. 7,277,765.

(51) Int. Cl.
G06F 17/00 (2006.01)
G10L 21/00 (2006.01)
G10H 1/00 (2006.01)

(52) U.S. Cl. .............. 700/94; 704/272; 84/604

(58) Field of Classification Search ............ 700/94; 707/104.1; 704/270, 272, 278; 715/727; 84/600–602, 604

See application file for complete search history.

(56) References Cited

U.S. PATENT DOCUMENTS

| | | |
|---|---|---|
| 4,394,691 A | 7/1983 | Amano et al. |
| 4,621,374 A | 11/1986 | Micic et al. |
| 4,817,203 A | 3/1989 | Tsurumoto et al. |
| 4,825,209 A | 4/1989 | Sasaki et al. |
| 4,969,209 A | 11/1990 | Schwob |
| 5,081,534 A | 1/1992 | Geiger et al. |
| 5,132,679 A | 7/1992 | Kubo et al. |
| 5,182,551 A | 1/1993 | Goto |
| 5,204,768 A | 4/1993 | Tsakiris et al. |
| 5,240,179 A | 8/1993 | Drinkwater |
| 5,282,028 A | 1/1994 | Johnson et al. |
| 5,283,638 A | 2/1994 | Engberg et al. |
| 5,283,819 A | 2/1994 | Glick et al. |
| 5,313,524 A | 5/1994 | Van Hulle et al. |
| 5,367,316 A | 11/1994 | Ikezaki |
| 5,410,326 A | 4/1995 | Goldstein |
| 5,426,564 A | 6/1995 | Hsu .............................. 361/707 |
| 5,444,360 A | 8/1995 | Drinkwater |

(Continued)

FOREIGN PATENT DOCUMENTS

| | | |
|---|---|---|
| CN | 1172395 | 2/1998 |
| CN | 1437197 | 8/2003 |

(Continued)

OTHER PUBLICATIONS

European Office Action, Nov. 20, 2007, EP Application No. 01 308 560.0, 3 pages.

(Continued)

Primary Examiner — Xu Mei
(74) Attorney, Agent, or Firm — Fish & Richardson P.C.

(57) ABSTRACT

An audio system attachable to a computer includes a sound reproduction device for producing audible sound from audio signals. The sound reproduction device includes a radio tuner and a powered speaker. The audio system further includes a connector for connecting the sound reproduction device with a computer. The computer provides audio signals from a plurality of sources, the sources including a computer CD player, digitally encoded computer files stored on the computer, and a computer network connected to the computer. The sound reproduction device further includes control buttons for controlling at least one of the computer CD player, the digitally encoded computer files and the computer network.

78 Claims, 33 Drawing Sheets

U.S. PATENT DOCUMENTS

| | | | |
|---|---|---|---|
| 5,488,357 A | 1/1996 | Sato et al. |
| 5,519,457 A | 5/1996 | Nishigaki et al. |
| 5,519,572 A | 5/1996 | Luo |
| 5,537,106 A | 7/1996 | Mitsuhashi |
| 5,553,220 A | 9/1996 | Keene |
| 5,553,311 A | 9/1996 | McLaughlin et al. |
| 5,594,509 A | 1/1997 | Florin et al. |
| 5,604,663 A | 2/1997 | Shin et al. |
| 5,616,876 A | 4/1997 | Cluts |
| 5,625,608 A | 4/1997 | Grewe et al. |
| 5,636,276 A | 6/1997 | Brugger |
| 5,640,453 A | 6/1997 | Schuchman et al. |
| 5,650,831 A | 7/1997 | Farwell |
| 5,663,517 A | 9/1997 | Oppenheim |
| 5,668,977 A | 9/1997 | Swanstron et al. |
| 5,670,730 A | 9/1997 | Grewe et al. |
| D385,561 S | 10/1997 | Audoin |
| 5,675,390 A | 10/1997 | Schindler et al. |
| 5,694,312 A | 12/1997 | Brand et al. |
| 5,717,430 A | 2/1998 | Copland et al. |
| 5,724,482 A | 3/1998 | Grewe et al. |
| 5,751,672 A | 5/1998 | Yankowski |
| 5,764,503 A | 6/1998 | Brand et al. |
| 5,764,504 A | 6/1998 | Brand et al. |
| 5,787,259 A | 7/1998 | Haroun et al. |
| 5,790,423 A | 8/1998 | Lau et al. |
| 5,790,958 A | 8/1998 | McCoy et al. |
| 5,793,980 A | 8/1998 | Glaser et al. |
| 5,795,156 A | 8/1998 | Redford et al. |
| 5,799,042 A | 8/1998 | Xiao |
| 5,813,014 A | 9/1998 | Gustman |
| 5,815,206 A | 9/1998 | Malladi et al. |
| 5,845,104 A | 12/1998 | Rao |
| 5,864,868 A | 1/1999 | Contois |
| 5,867,223 A | 2/1999 | Schindler et al. |
| 5,870,710 A | 2/1999 | Ozawa et al. |
| 5,889,666 A | 3/1999 | Brand et al. |
| 5,900,867 A | 5/1999 | Schindler et al. |
| 5,901,057 A | 5/1999 | Brand et al. |
| 5,911,582 A | 6/1999 | Redford et al. |
| 5,914,941 A | 6/1999 | Janky |
| 5,926,624 A | 7/1999 | Katz et al. |
| 5,945,988 A | 8/1999 | Williams et al. |
| 5,956,025 A | 9/1999 | Goulden et al. |
| 5,960,366 A | 9/1999 | Duwaer |
| 5,969,283 A | 10/1999 | Looney et al. |
| 5,978,591 A | 11/1999 | Bartholomew et al. |
| 5,990,407 A | 11/1999 | Gannon |
| 5,990,884 A | 11/1999 | Douma et al. |
| 5,995,155 A | 11/1999 | Schindler et al. |
| 6,005,563 A | 12/1999 | White et al. |
| 6,007,228 A | 12/1999 | Agarwal et al. |
| 6,008,777 A | 12/1999 | Yiu |
| 6,011,212 A | 1/2000 | Rigopulos et al. |
| 6,026,150 A | 2/2000 | Frank et al. |
| 6,034,621 A | 3/2000 | Kaufman |
| 6,034,925 A | 3/2000 | Wehmeyer |
| 6,038,199 A | 3/2000 | Pawlowski et al. |
| D422,590 S | 4/2000 | Kloss |
| 6,084,638 A | 7/2000 | Hare et al. |
| 6,100,749 A | 8/2000 | Itoh |
| 6,111,825 A | 8/2000 | Wall |
| 6,118,450 A | 9/2000 | Proehl et al. |
| 6,122,749 A | 9/2000 | Gulick |
| 6,127,941 A | 10/2000 | Van Ryzin |
| 6,128,117 A | 10/2000 | Kim |
| 6,131,129 A | 10/2000 | Ludtke et al. |
| 6,131,130 A | 10/2000 | Van Ryzin |
| 6,134,426 A | 10/2000 | Völkel |
| 6,147,885 A | 11/2000 | Brand et al. |
| 6,148,353 A | 11/2000 | Cho |
| 6,167,116 A | 12/2000 | Freadman |
| D435,840 S | 1/2001 | Ishibashi et al. |
| 6,169,879 B1 | 1/2001 | Perlman |
| 6,170,060 B1 | 1/2001 | Mott et al. |
| 6,175,822 B1 | 1/2001 | Jones |
| 6,181,284 B1 | 1/2001 | Madsen et al. |
| 6,182,126 B1 | 1/2001 | Nathan et al. |
| 6,192,340 B1 | 2/2001 | Abecassos |
| 6,212,359 B1 | 4/2001 | Kno |
| 6,215,059 B1 | 4/2001 | Rauchi et al. |
| 6,225,546 B1 | 5/2001 | Kraft et al. |
| 6,232,539 B1 | 5/2001 | Looney et al. |
| 6,243,725 B1 | 6/2001 | Hempleman et al. |
| 6,248,946 B1 | 6/2001 | Dwek |
| 6,255,961 B1 | 7/2001 | Van Rysin et al. |
| 6,256,554 B1 | 7/2001 | DiLorenzo |
| 6,259,707 B1 | 7/2001 | Dara-Abrams et al. |
| 6,262,724 B1 | 7/2001 | Crow et al. |
| 6,263,503 B1 | 7/2001 | Margulis |
| D447,130 S | 8/2001 | Scott et al. |
| 6,298,332 B1 | 10/2001 | Montague |
| 6,313,812 B1 | 11/2001 | Nagano et al. |
| 6,326,537 B1 | 12/2001 | Tamura |
| 6,326,982 B1 | 12/2001 | Wu et al. |
| 6,332,175 B1 | 12/2001 | Birrell et al. |
| 6,342,664 B2 | 1/2002 | Sawada et al. |
| 6,349,352 B1 | 2/2002 | Lea |
| 6,356,971 B1 | 3/2002 | Katz et al. |
| 6,359,636 B1 | 3/2002 | Schindler et al. |
| 6,359,994 B1 | 3/2002 | Markow et al. ............... 381/333 |
| 6,374,148 B1 | 4/2002 | Dharmarajan et al. |
| 6,377,530 B1 | 4/2002 | Burrows |
| 6,380,947 B1 | 4/2002 | Stead |
| 6,380,978 B1 | 4/2002 | Adams et al. |
| 6,381,575 B1 | 4/2002 | Martin et al. |
| 6,389,463 B2 | 5/2002 | Bolas et al. |
| 6,400,280 B1 | 6/2002 | Osakabe |
| 6,401,059 B1 | 6/2002 | Shen et al. |
| 6,408,332 B1 | 6/2002 | Matsumoto et al. |
| 6,408,435 B1 | 6/2002 | Sato |
| 6,424,369 B1 | 7/2002 | Adair et al. |
| 6,424,660 B2 | 7/2002 | Jacobson, Jr. |
| 6,425,018 B1 | 7/2002 | Kaganas et al. |
| 6,427,165 B1 | 7/2002 | Anderson |
| 6,437,836 B1 | 8/2002 | Huang et al. |
| 6,449,226 B1 | 9/2002 | Kumagai |
| 6,453,281 B1 | 9/2002 | Walters et al. |
| 6,461,181 B1 | 10/2002 | Goh et al. |
| 6,463,469 B1 | 10/2002 | Yavitz |
| 6,473,792 B1 | 10/2002 | Yavitz et al. |
| 6,487,145 B1 | 11/2002 | Berhan |
| 6,496,692 B1 | 12/2002 | Shanahan |
| 6,502,194 B1 | 12/2002 | Berman et al. |
| 6,510,210 B1 | 1/2003 | Baughan |
| 6,512,722 B2 | 1/2003 | Kumagai |
| 6,542,870 B1 | 4/2003 | Matsumoto |
| 6,549,942 B1 | 4/2003 | Janky et al. |
| 6,560,469 B1 | 5/2003 | Kim et al. |
| 6,563,769 B1 | 5/2003 | Van Der Meulen |
| 6,580,679 B1 | 6/2003 | Maeda |
| 6,597,374 B1 | 7/2003 | Baker et al. |
| 6,598,230 B1 | 7/2003 | Ballhorn |
| 6,636,157 B1 | 10/2003 | Sato |
| 6,662,060 B1 | 12/2003 | Maliszewski et al. |
| 6,671,567 B1 | 12/2003 | Dwyer et al. |
| 6,675,233 B1 | 1/2004 | Du et al. |
| 6,678,215 B1 | 1/2004 | Treyz et al. |
| 6,684,249 B1 | 1/2004 | Frerichs et al. |
| 6,694,200 B1 | 2/2004 | Naim ............................. 700/94 |
| 6,697,032 B2 | 2/2004 | Chitturi et al. |
| 6,697,944 B1 | 2/2004 | Jones et al. |
| 6,701,951 B1 | 3/2004 | Drinkwater |
| 6,727,826 B1 | 4/2004 | Ki Kwan et al. |
| 6,734,882 B1 | 5/2004 | Becker |
| 6,741,720 B1 | 5/2004 | Myatt |
| 6,754,468 B1 | 6/2004 | Sieben et al. |
| 6,760,721 B1 | 7/2004 | Chasen et al. |
| 6,769,028 B1 | 7/2004 | Sass et al. |
| 6,772,212 B1 | 8/2004 | Lau et al. |
| 6,778,869 B2 | 8/2004 | Champion ...................... 700/94 |
| 6,813,528 B1 | 11/2004 | Yang |
| 6,823,225 B1 | 11/2004 | Sass |
| 6,879,865 B1 | 4/2005 | Gladwin et al. |
| 6,882,299 B1 | 4/2005 | Allport |
| 6,922,730 B1 | 7/2005 | Yaple |
| 6,941,181 B1 | 9/2005 | Mathurin |

| | | | | | | |
|---|---|---|---|---|---|---|
| 6,953,886 B1 | 10/2005 | Looney et al. | | EP | 0678851 | 10/1995 |
| 6,959,221 B1 | 10/2005 | Kataoka | | EP | 0712068 | 5/1996 |
| 6,990,208 B1 | 1/2006 | Lau et al. | | EP | 0 744 839 | 11/1996 |
| 7,020,704 B1 | 3/2006 | Lipscomb et al. | | EP | 0672276 | 11/1996 |
| 7,028,082 B1 | 4/2006 | Rosenberg et al. | | EP | 0741479 | 11/1996 |
| 7,065,287 B1 | 6/2006 | Heredia et al. | | EP | 0744751 | 11/1996 |
| 7,130,616 B2 | 10/2006 | Janik | | EP | 0744839 | 11/1996 |
| 7,142,934 B2 | 11/2006 | Janik | | EP | 0793355 | 9/1997 |
| 7,142,935 B2 | 11/2006 | Janik | | EP | 0798651 | 10/1997 |
| 7,176,372 B2 | 2/2007 | Georges | | EP | 0813302 | 12/1997 |
| 7,187,947 B1 | 3/2007 | White et al. | | EP | 0820180 | 1/1998 |
| 7,203,288 B1 | 4/2007 | Dwyer et al. | | EP | 0831608 | 3/1998 |
| 7,205,471 B2 | 4/2007 | Looney et al. | | EP | 0 836 324 | 4/1998 |
| 7,224,811 B1 | 5/2007 | Narusawa et al. | | EP | 0835004 | 4/1998 |
| 7,237,198 B1 | 6/2007 | Chaney | | EP | 0843419 | 5/1998 |
| 7,277,765 B1 | 10/2007 | Beckmann et al. | | EP | 0843429 | 5/1998 |
| 7,293,277 B1 | 11/2007 | Nathan | | EP | 0844572 | 5/1998 |
| 7,324,833 B2 | 1/2008 | White et al. | | EP | 0844788 | 5/1998 |
| 7,486,926 B2 | 2/2009 | White et al. | | EP | 0849884 | 6/1998 |
| 7,548,851 B1 | 6/2009 | Lau et al. | | EP | 0853301 | 7/1998 |
| 7,549,942 B2 | 6/2009 | Gumpoltsberger | | EP | 0859306 | 8/1998 |
| 2001/0038032 A1 | 11/2001 | Kang et al. | | EP | 0860764 | 8/1998 |
| 2001/0044664 A1 | 11/2001 | Mueller et al. | | EP | 0865175 | 9/1998 |
| 2002/0002039 A1 | 1/2002 | Qureshey et al. | | EP | 0866397 | 9/1998 |
| 2002/0009978 A1 | 1/2002 | Dukach et al. ............... 455/99 | | EP | 0878906 | 11/1998 |
| 2002/0029303 A1 | 3/2002 | Nguyen | | EP | 0883320 | 12/1998 |
| 2002/0038214 A1 | 3/2002 | D'Agosto, III et al. | | EP | 0886400 | 12/1998 |
| 2002/0069308 A1 | 6/2002 | Jones et al. | | EP | 0891066 | 1/1999 |
| 2002/0070960 A1 | 6/2002 | Maine et al. | | EP | 0898378 | 2/1999 |
| 2003/0018581 A1 | 1/2003 | Bratton et al. | | EP | 0905931 | 3/1999 |
| 2003/0163211 A1 | 8/2003 | Van Der Meulen | | EP | 0907265 | 4/1999 |
| 2003/0163486 A1 | 8/2003 | Van Der Meulen | | EP | 0908884 | 4/1999 |
| 2004/0069121 A1 | 4/2004 | Georges | | EP | 0917046 | 5/1999 |
| 2004/0074377 A1 | 4/2004 | Georges | | EP | 0935123 | 8/1999 |
| 2004/0223245 A1 | 11/2004 | Morohashi | | EP | 0839349 | 9/1999 |
| 2004/0268006 A1 | 12/2004 | Kang et al. | | EP | 0957600 | 11/1999 |
| 2005/0049002 A1 | 3/2005 | White et al. | | EP | 0967747 | 12/1999 |
| 2005/0141367 A1 | 6/2005 | Morohashi | | EP | 0967749 | 12/1999 |
| 2005/0201254 A1 | 9/2005 | Looney et al. | | EP | 0982686 | 3/2000 |
| 2008/0228517 A1 | 9/2008 | Martin et al. | | EP | 0840920 | 5/2000 |
| 2008/0273297 A1 | 11/2008 | Kumar | | EP | 1016956 | 7/2000 |
| 2008/0289230 A1 | 11/2008 | Mandelbaum et al. | | EP | 1018742 | 7/2000 |
| | | | | EP | 1026831 | 8/2000 |
| FOREIGN PATENT DOCUMENTS | | | | EP | 1032229 | 8/2000 |
| DE | 3040465 | 6/1832 | | EP | 1032230 | 8/2000 |
| DE | 30 40 465 | 6/1982 | | EP | 1033701 | 9/2000 |
| DE | 3040465 | 6/1982 | | EP | 1043665 | 10/2000 |
| DE | 69400864 | 5/1997 | | EP | 0701754 | 12/2001 |
| DE | 29814885 | 1/1999 | | EP | 1198070 | 4/2002 |
| DE | 69604075 | 1/2000 | | EP | 1002316 | 11/2003 |
| DE | 69608110 | 9/2000 | | EP | 0890156 | 1/2005 |
| DE | 69524323 | 8/2004 | | EP | 0890086 | 1/2007 |
| DE | 69819735 | 9/2004 | | EP | 1777829 | 4/2007 |
| DE | 69732227 | 12/2005 | | GB | 2064905 | 6/1981 |
| DE | 69737284 | 6/2007 | | GB | 2325547 | 11/1996 |
| EP | 0082905 | 7/1983 | | GB | 2325547 | 11/1998 |
| EP | 0 301 770 | 2/1989 | | JP | 3-105782 | 5/1991 |
| EP | 0301770 | 2/1989 | | JP | 03-105782 | 5/1991 |
| EP | 0386475 | 5/1990 | | JP | 4-107990 | 9/1992 |
| EP | 0 455 821 | 11/1991 | | JP | 04-287528 | 10/1992 |
| EP | 0455821 | 11/1991 | | JP | H04-334295 | 11/1992 |
| EP | 0457673 | 11/1991 | | JP | 06-276574 | 3/1993 |
| EP | 0571638 | 1/1993 | | JP | 06-205463 | 7/1994 |
| EP | 0 542 345 | 5/1993 | | JP | 06-311587 | 11/1994 |
| EP | 0542345 | 5/1993 | | JP | 6-311587 | 11/1994 |
| EP | 0550197 | 7/1993 | | JP | 09-13856 | 5/1996 |
| EP | 0597381 | 5/1994 | | JP | 08-163619 | 6/1996 |
| EP | 0597798 | 5/1994 | | JP | 08-222980 | 8/1996 |
| EP | 0598597 | 5/1994 | | JP | 08-298440 | 11/1996 |
| EP | 0604340 | 6/1994 | | JP | 8-298440 | 11/1996 |
| EP | 0624958 | 11/1994 | | JP | 09-006248 | 1/1997 |
| EP | 0626635 | 11/1994 | | JP | 9-102719 | 4/1997 |
| EP | 0630141 | 12/1994 | | JP | 09-102719 | 4/1997 |
| EP | 0633661 | 1/1995 | | JP | 09-146572 | 6/1997 |
| EP | 0633682 | 1/1995 | | JP | 09-230978 | 9/1997 |
| EP | 0647041 | 4/1995 | | JP | 09-274557 | 10/1997 |
| EP | 0658010 | 6/1995 | | JP | 10-023115 | 1/1998 |
| EP | 0658855 | 6/1995 | | JP | 10-178686 | 6/1998 |
| EP | 0667710 | 8/1995 | | JP | 10-285700 | 10/1998 |

| | | |
|---|---|---|
| JP | 10-319061 | 12/1998 |
| JP | 11-024678 | 1/1999 |
| JP | 11-027776 | 1/1999 |
| JP | 11-120681 | 4/1999 |
| JP | 11-122688 | 4/1999 |
| JP | 11-150788 | 6/1999 |
| JP | 11-168674 | 6/1999 |
| JP | 11-242686 | 9/1999 |
| JP | 11-250569 | 9/1999 |
| JP | 2000-20056 | 1/2000 |
| JP | 2000-020056 | 1/2000 |
| JP | 2000-149505 | 5/2000 |
| JP | 2000-207415 | 7/2000 |
| JP | 2001-313875 | 11/2001 |
| JP | 2001-358752 | 12/2001 |
| JP | 2002-099353 | 4/2002 |
| KR | 10175434 | 11/1998 |
| KR | 1019990083005 | 11/1999 |
| KR | 100262969 | 5/2000 |
| KR | 1020000049961 | 8/2000 |
| KR | 1020000056590 | 9/2000 |
| WO | 90/01195 | 2/1990 |
| WO | 93/13630 | 7/1993 |
| WO | 93/23957 | 11/1993 |
| WO | 94/16503 | 7/1994 |
| WO | 95/08146 | 3/1995 |
| WO | 95/27357 | 10/1995 |
| WO | 96/39751 | 12/1996 |
| WO | 97/04382 | 2/1997 |
| WO | 97/04431 | 2/1997 |
| WO | 97/20297 | 6/1997 |
| WO | 97/25821 | 7/1997 |
| WO | 97/32449 | 9/1997 |
| WO | 97/36257 | 10/1997 |
| WO | 97/36391 | 10/1997 |
| WO | 97/37202 | 10/1997 |
| WO | WO9737202 | 10/1997 |
| WO | 97/41504 | 11/1997 |
| WO | 97/45804 | 12/1997 |
| WO | 98/26398 | 6/1998 |
| WO | 98/53456 | 11/1998 |
| WO | 99/06998 | 2/1999 |
| WO | 99/27681 | 6/1999 |
| WO | WO99/27681 | 6/1999 |
| WO | 99/35787 | 7/1999 |
| WO | 99/38266 | 7/1999 |
| WO | 99/48296 | 9/1999 |
| WO | 99/64969 | 12/1999 |
| WO | 00/19431 | 4/2000 |
| WO | 00/27117 | 5/2000 |
| WO | 00/27681 | 5/2000 |
| WO | WO00/27117 | 5/2000 |
| WO | 00/42766 | 7/2000 |
| WO | WO00/42766 | 7/2000 |
| WO | 00/51128 | 8/2000 |
| WO | 00/54124 | 9/2000 |
| WO | 00/54187 | 9/2000 |
| WO | WO0060591 | 10/2000 |
| WO | 01/28222 | 4/2001 |

OTHER PUBLICATIONS

European Search Report issued Mar. 7, 2007, in European Application No. 06124855.5, filed on Oct. 8, 2001.
European Extended Search Report issued May 25, 2007, in European Application No. 06124855.5, filed on Oct. 8, 2001.
Office Action in Chinese Application No. 01135465.8, dated Jun. 6, 2008.
Official communication from India Patent Office regarding Application No. 881/MUM/2001.
The Golden Age 1981-1985 [online] Retrieved from the Internet: <URL:http://pocketcalculatorshow.com/boombox/golden2.html>, [retrieved on May 17, 2006], pp. 1-6.
Office Action dated Nov. 20, 2008 from corresponding European Application No. 06124855.5.
Excerpts from Webster's Ninth Collegiate Dictionary, Merriam-Webster, Inc. (1983), pp. 982, 1217, 1360.
"Technical Background, HAVI, the A/V digital network revolution", The HAVI Organization, San Ramon, CA, (1999), 7 pages, www.havi.org.
Thompson Coburn LLP, Request for Inter Partes Reexamination Under 35 U.S.C. §§ 311-218 dated Nov. 12, 2009, in U.S. Appl. No. 95/001,260, filed Dec. 4, 2009, 807 pages.
Thompson Coburn LLP, Replacement Request for Inter Partes Reexamination Under 35 U.S.C. §§ 311-218 dated Dec. 4, 2009, in U.S. Appl. No. 95/001,260, filed Dec. 4, 2009, 310 pages.
U.S. Patent and Trademark Office, Office Action in U.S. Appl. No. 95/001,260, mailed Jan. 13, 2010, 83 pages.
U.S. Appl. No. 60/230,530, filed Sep. 1, 2000 (25 pages).
U.S. Appl. No. 60/158,809, filed Oct. 10, 1999 (20 pages).
U.S. Appl. No. 60/223,872, filed Aug. 8, 2000 (22 pages).
U.S. Appl. No. 60/199,638, filed Apr. 25, 2000 (24 pages).
U.S. Appl. No. 60/187,894, filed Mar. 8, 2000 (12 pages).
Zenith Stereo CD Clock Radio Z253 Owner's Manual and Warranty [date unknown](14 pages).
Audio ReQuest Multimedia Manual, (2002) (68 pages).
Wong, W., "Home networking: Here but yet so far" CNET News, Jan. 21, 1999 (4 pages).
Cardinal Search Report re validity for U.S. 7,277,765, prepared Feb. 4, 2009, (39 pages).
The Mac Observer, Keyspan Ships USB Remote Control Device, Available online at http://www.macobserver.corn/news/99/october/991013/usbremoteships.html , Oct. 13, 1999, (3 pages).
Engst, A., "Better than Flying by wire," TidBiITS, Available online at http://db.tidbits.com/aratricle/5785, Jan. 31, 2000 (3 pages).
Soundesign Corporation, Model KG63P64 Brochure [date unknown] (2 pages).
SoundJam™ MP Playlists Explained, Available from the Internet at http://web.archive.org/web/2000818082957/soundjame.com/ov/playlist.html Aug. 18, 2000 (2 page).
SoundJam™ MP for Macintosh, Available from the Internet at http://web.archive.org/web/19991013114509/http://soundjame.com/, Oct. 13, 1999 (2 pages).
SoundJam™ MP Plus Playlist Composer, Available from the Internet at http://web.archive.org/web/200008183002/soundjame.com/ov/composer.html , Aug. 18, 2000 (4 pages).
View and Edit MB3 File Information Using SoundJam MP Plus, Available on the Internet at http://web.archive.org/web/20000810083008.soundjam.com/ov/editages.html, Aug. 18, 2000 (2 pages).
Moore, C.W., "Eight MP# Players for the Macintosh" Applelinks, Available on the Internet at http://www.applelinks.com/mooresviews/players.shtml, Dec. 17, 2008 (12 pages).
Chvatik, D. "Review: Rio Player 500" ATPM, Available on the Internet at http://www.atpm.com/5.12/rio500.shtml, Dec. 1999 (5 pages).
D-Link DMP-HD610 Roq-it MP3 Player and Hard Drive (10 GB), Amazon.com, Available on the Internet at http://www.amazon.com/D-Link-DMP-HD610-Roq-Player-Drive/dp/B00005TSUR, First available on Amazon.com: Nov. 17, 2001, (8 pages).
ROQ-it, E-Link ROQ-it 10 GB [DMP-HD610] Portable MP3 Jukebox User's Guide, Version 1.0, [date unknown] (41 pages).
Microsoft, WinHEC, Running HPNA 2.0 Over Existing Cable/TV Coax, (2003) (15 pages).
AudioReQuest Pro Edition With Crestron Introduced at CEDIA 2000; New hard Drive Based . . . Available on the Internet at http://www.allbusiness.com/technology/software-services-applications-internet-audio/6564, Sep. 8, 2000 (5 pages).
Conte, C., AV and Networking Systems with Style Brochure [date unknown] (6 pages).
ReQuest Unveils Home Stereo MP3 Unit at MP3 Summit99; Audio ReQuest Stereo System Component Stores Available on the Internet at http://www.allbusiness.com/electronics/computer-equipment-data-storage-devices-cd/665, Jun. 15, 1999 (5 pages).
Freund, J., "Get yours today" Wired 7/08: The MP3 Players, Available on the Internet at http://www.wired.com/wires/archive7.08/dl_players.html, Aug. 1999 (7 pages).
AudioReQuest Home Stereo Component to Support WindowsMedia Audio; First Home Stereo Component to . . . Available on the Internet at htp://www.allbusiness.com/media-telecommunications/movies-sound-recording/6660346, Aug. 17, 1999 (5 pages).

ReQuest Multimieda Ships First MP3 Home StereoJukebox: ReQuest Multimedia Begins Shipping . . . Available on the Internet at http://www.allbusiness.com/electronics/consumer-household-electronics-portable/6493758 , May 24, 2000 (6 pages).

ReQuest Delivers First Music Home Network Appliance; Latest AudioReQuest Update Enables Ethernet . . . Available on the Internet at http://allbusiness.com/technology/software-services-applications-internet-audio/6561, Sep. 5, 2000, (5 pages).

Numark TTi Turntable Turntable reviews—CNET Reviews, Available on the Internet at http://reviews.cnet.com/turntables/numark-tti-turntable/4505-7860, Printed Mar. 12, 2009 (10 pages).

ReQuest—Press Relations and Contacts, Available on the Internet at http://www.request.com/press/presscontacts.asp, Printed Mar. 12, 2009 (1 page).

DialogWeb, "Creative Labs Launches NOMAD Portable Digital Audio Players" Apr. 12, 1999 (4 pages).

Harmony Central, "Creative Labs Launches portable MP3 Player" Apr. 15, 1999 (3 pages).

DialogWeb, New MP3 Players: Music to Your Ears (Creative Labs' Creative Nomad and pine Technology's D'music) Oct. 1, 1999 (2 pages).

DialogWeb, "Creative Technology Announces First Quarter Fiscal 2000 Earnings" Oct. 27, 1999 (7 pages).

MP3 Newswire.net, "First MP3 Portable with 128MB Built-in Flash. Review The Soul", Dec. 7, 1999 (3 pages).

MP3 Newswire.net, "Review: The iPlay MP3 Moveman" (Apr. 7, 2000 (3 pages).

HighBeam Research, "MusicStore Jukebox Stores 200 Audio CDs in MP3 Format; Breakthrough . . . " Jun. 20, 2000 (3 pages).

HighBeam Research, "Toe-tapping in the digital era. . . . " Jul. 10, 2000 (2 pages).

DialogWeb, "Creative Announces Shipment of Stylish NOMAD II MG at Macworld Expo" Jul. 18, 2000 (4 pages).

Marriott, M. "News Watch; MP3 Jukebox Tries to Replace Just About Everything" New York Times-Technology, Oct. 5, 2000 (2 pages).

HighBeam Research, FYI; What is a stereo system?: Oct. 10, 2000 (3 pages).

DialogWeb, "PC Expo Showcases New Digital Formats, Products" Aug. 11, 2001 (3 pages).

The Onetouch Any Media iPod Uploader, Available on the Internet at http://hammacher.com/publish/73745.asp, (2008) (2pages).

The LP to iPod Converter Available on the Internet at http://hammacher.com/publish/74920.asp, , (2008) (2pages).

Rio PMP300 Features brochure, Available on the Internet at http://en.wikipedia.org/wiki/RioPMP300, Original Rio PMP300 pages available on the Internet at http://web.archive.org/web/19981201233928/www.diamondmm.com/products/current/rio.cfm, Dec. 1, 1998 (3 pages).

Rio PMP300 User's Guide (1998) (27 pages).

Eiger Labs MPMan F10, Available on the Internet at http://en.wikipedia.org/wiki/Eiger_Labs_MPMan_F10 (1998) (1 page).

Personal Jukebox (also known as PJB-100 or Music Compressor), Available on the Internet at http://en.wikipedia.org/wiki/Personal_Jukebox (1999) (13 pages).

SSI America—Contract Engineering, R&D and Consulting, Available on the Internet at http://www.ssiamerica.com/about-us/history-and-background-of-ssi-america-mp3-player-car-audio, (2009)(3 pages).

Philips MCi250 Wireless Broadband Internet Micro HiFi System, First date available at Amazon.com: May 22, 2003, (10 pages).

Digital audio player, Available on the Internet at http://en.wikipedia.org/wiki/Digital_audio_player (1998) (5 pages).

Rio500—Getting Started Guide, [date unknown] (2 pages).

Empeg car—mp3 in your dash—digital audio player user guide, (2000) (50 pages).

I-JAM MP3 Player Manual [date unknown] (48 pages).

Menta, R. MP3 Newswire.net, "Test Drive the i2Go eGo with IBM MicroDrive" Available on the Internet at http://www.mp3newswire.net/stories/2000/ego.html , Sep. 1, 2000 (5 pages).

Yepp, Available on the Internet at http://en.wikipedia.org/wiki/Yepp, Available prior to Oct. 19, 2009 (9 pages).

CD Media World, "MP3Kit MP3 Players" Available on the Internet at http://www.edmediaworld.com/hardware/cdrom/mp3_mp3kit.shtml Available prior Nov. 3, 2009 (3 pages).

Welcome to ReQuest Whole House Audio and Media Servers, Available on the Internet at http://www.request.com Available prior Nov. 3, 2009 (3 pages).

Lydstrom and Sigma partner Together in Launch of Songbank Platform for Set-Top Boxes; SongBank . . . Available on the Internet at http://www.allbusiness.com/media-telecommunications/data-transmission-broadband//6030112-1.html, Jan. 8, 2001 (8 pages).

Gibson Audio delivers the Wurlitzer Digital Jukebox, Available from the Internet at http://www.gizmag.com/go/2855 (2009) (7 pages).

Memory launches its SoulMate MP3 Player, ZDNet UK, Available on the Internet at http://www.zdnet.co.uk/misc/print/0,1000000169,2074908-39001108c,00.htm Nov. 4, 1999, (2 pages).

Jones, C., "MP3 Player Goes Retro" Wired Available on the Internet at http://www.wired.com/science/discoveries/news/2000/02/34574 (Feb. 8, 2000 (2 pages).

Sony S-Link Resource Center, Available on the Internet at http://www.brian-patti.com/s-link/ Available prior to Nov. 29, 1997 (3 pages).

MiniDisc Manager, Available on the Internet at http://web2.airmail.net/will/mdmanager.html Available prior to Oct. 29, 2009 (6 pages).

A bit about Me, Available on the Internet at http://web2.airmail.net/will/about.html Available prior to Oct. 29, 2009 (3 pages).

CDJ, Nirvis, Available on the Internet at http://www.nirvis.com/cdj.htm Available prior to Oct. 29, 2009 (1 page).

CDJ Features, Nirvis, Available on the Internet at http://www.nirvis.com/cdj_features.htm Available prior to Oct. 29, 2009 (2 pages).

Sharp MD/CD Stereo Model MD-X8 Operation Manual, Jun. 23, 1998 (60 pages).

Gateway Launches 'Connected Home With AOL, Broadcom and Transmeta, Available on the Internet at http://www.prnewswire.com/cgi-bin/stories.pl?ACCT=104&STORY=/www/story/11-10-2000/0001362594 Nov. 10, 2000 (4 pages).

Gateway Launches Connected Home With AOL, Broadcom and Transmeta, BestStuff, Available on the Internet at http://www.prnewswire.com/cgi-bin/stories.pl?ACCT=104&STORY=/www/story/11-10-2000/0001362594 Nov. 10, 2000 (4 pages).

Crouch, C., "Digital Music Streams Beyond the PC," About.com Computing Center, Available on the Internet at http://pcworld.about.com/news/Jan072001ud37742.htm Jan. 7, 2001, (3 pages).

Menta, R. "Collecting MP3 Portables—Part 1," Available on the Internet at http://www.antiqueradio.com/Dec04_Menta_mp3pt1.html Oct. 31, 2004 (8 pages).

Menta, R. "Collecting MP3 Portables—Part 2," Available on the Internet at http://www.antiqueradio.com/Apr05_Menta_mp3.html Feb. 27, 2005 (8 pages).

Menta, R. "Collecting MP3 Portables—Part 3," Available on the Internet at http://www.antiqueradio.com/Jul05_Menta_mp3s.html Jun. 27, 2005 (10 pages).

Gateway Support Search, Available on the Internet at http://search.support.gateway.com/iphrase/queri?command=text&attr1-attr2-&t=0&text-connected+mu, Available before Jul. 1, 2009 (4 pages).

Gearfuse >> Bose home theatre surround sound for your throne, Available on the Internet at http://www.gearfuse.com/bose-home-theatre-surround-sound-for-your-throne/ Available before Mar. 12, 2009 (5 pages).

Bose Acoustimass-Better Profits Through Marketing, Available on the Internet at http://www.intellexual.net/bose.html Oct. 27, 2004 (11 pages).

Bose Settles Lawsuit With Phitek, DynamicPatents Patent News, Reviews, Available on the Internet at http://www.dynamicpatents.com/2008/12/bose-settles-lawsuit-with-philek Dec. 2008 (5 pages).

Gadgets and Beyond, Available on the Internet at http://gadgetsfun.blogspot.com/2007/05/bose-patent-app-sees-electroacoustical.html , May 24, 2007 (3 pages).

Stereophile: Harman Will Appeal Judgment on Bose Patent Infringement, Available on the Internet at http://www.printthis.clickability.com/pt/cpt?action=cpt&title=Stereophile%3A+Harman+ Sep. 10, 2000 (1 page).

Creative Labs NOMAD II MG 64 MB MP3 Player Silver with Docking Station, Amazon.com, Available on the Internet at http://www.amazon.com/Creative-Labs-Docking-Station/dp/B00004XOYF Available before Jul. 1, 2009 (11 page).
Creative Labs NOMAD II MG 64 MB MP3 Player Silver with Docking Station, Amazon.com, Available on the Internet at http://www.amazon.com/Creative-Labs-Docking-Station/dp/B00004XOYF Available before Jan. 21, 2009 (18 page).
The Patent Prospector: No Noise Reduction, Available on the Internet at http://www.patenthawk.com/blog/2009/02/no)_noise_reduction.html Feb. 18, 2009 (2 pages).
MD Community Page: Sharp MD-X8PC, Available on the Internet at http://www.minidisc.org/part_Sharp_MD-X8PC.html, Available before Oct. 5, 2009 (2 pages).
Comparison of media players—Wikipedia, Available on the Internet at http://en.wikipedia.org/wiki/Comparison_of_media_players, Oct. 28, 2009 (46 pages).
HAVi, the A/V digital network revolution, 1999, (7 pages).
Philips InternetAudio Mini Hi-Fi System-FWi 1000, Dec. 1998 (104 pages).
Complete Guide to Your New Kenwood Sovereign Entré Entertainment Hub, ver. 2.0 [date unknown] (182 pages).
COMPAQ iPAQ Music Center, Wayback Machine Available on the Internet at http://web.archive.org/web/20010410010206/athome.compaq.com/showroom/static/ipaq/music_center.asp, May 16, 2001 (1 page).
COMPAQ Secures Key Place in Consumer Electronics Market with Expanded Audio Products Line, Available on the Internet at http://www.hp.info/newsroom/press/2001pmc/pr2001061201.html?jumpid=reg_R1002_USEN Jun. 12, 2001 (2 pages).
COMPAQ iPAQ Music Center—Getting Started, 2001 (67 pages).
COMPAQ Ipaq Music Center—Addendum A [date unknown] (182 pages) (38 pages).
Fuchs, HiFi Technology, Audio [date unknown] (5 pages).
Der Audio-Mac, Audio & PC (5 pages).
Keyspan's Innovative Digital Media Remote Now Available at CompUSA, Available on the Internet at http://www.allbusiness.com/retail/retailers/6719224-0.html, Nov. 8, 1999 (5 pages).
NOMAD and NOMAD MuVo—Wikipedia, Available on the Internet at http://en.wikipedia.org/wiki/Creative_NOMAD, May 14, 2009 (4 pages).
Equipment Review No. 2 Mar./Apr. 2002, Audio Request ARQ1-20, Home MP3/CD Player/Recorder with HD Storage, Available on the Internet at http://www.audaud.com/audaud/MAR01/EQUIP/equip2MAR01.html Mar./Apr. 2001 (7 pages).
Menta, R., "We Test Drive the Creative Nomad Jukebox," MP3 Newswire.net, Available on the Internet at http://www.mp3newswire.net/stories/2000/nomadreview.html, Nov. 21, 2000 (5 pages).
Japanese Press Release, Panasonic SJ-MJ50 reviews at eCoustics.com, Available on the Internet at http://minidisc.org/part_Panasonic_SJ-MJ50.html, Available before Oct. 9, 2009 (85 pages).
Panasonic SJ-MR270, Minidisc.org, [date unknown] (2 pages).
MD Community Page: Panasonic SJ-MR270, Available on the Internet at http://minidisc.org/part_Panasonic_SJ-MR230.html, Available before Oct. 9, 2009 (2 pages).
Panasonic SJ-MR270/SJ-MR240 Operating Instructions, 2003 (40 pages).
MD Community Page: Panasonic SJ-MR230, Available on the Internet at http://minidisc.org/part_Panasonic_SJ-MR230.html, Available before Oct. 9, 2009 (2 pages).
MiniDisc J-MR230DGH / JS-MR230DGK Service Manual Portable MD Recorder, [date unknown] (65 pages).
MD Community Page: Sony MZ-R5ST, Available on the Internet at http://minidisc.org/part_Sony_MZ-R5ST.html, 1997 (81 pages).
MD Community Page: Sony DJC-MD595, Available on the Internet at http://minidisc.org/part_Sony_DHC-MD595.html, [date unknown] (1 page).
Soni Mini Hi-Fi Component System Operating Instructions 2000 (76 pages).
MD Community Page: Sony MZ-R4ST, Available on the Internet at http://minidisc.org/part_Sony_MZ-R4ST.html, Available before Oct. 9, 2009 (1 page).
Sony Operating Instructions, MiniDisc MD Walkman™ 1996 (64 pages).
MD Community Page: Sony CMT-M333NT/M373NT, Available on the http://minidisc.org/part_Sony_CMT-M333NT+M373NT.html, Available before Oct. 9, 2009 (2 pages).
MD Community Page: Sony LAM-10/Z10, Available on the Internet at http://minidisc.org/part_Sony_LAM-10+Z10.html, Available before Oct. 9, 2009 (2 pages).
MD Community Page: Sony CMT-PX333, Available before Oct. 9, 2009 (1 page).
MD Community Page: Sony DHC-VZ50MD, Available on the Internet at http://minidisc.org/part_Sony_DHC-VZ250MD.html, Available before Oct. 9, 2009 (1 page).
MD Community Page: Sony MZ-E810SP, Available on the Internet at http://minidisc.org/part_Sony_MZ-E810SP.html, Available before Oct. 9, 2009 (2 pages).
MD Community Page: Sony MZ-E606W, Available on the Internet at http://minidisc.org/part_Sony_MZ-E606W.html, Available before Oct. 9, 2009 (1 page).
MD Community Page: Sony CMT-PX7, Available on the Internet at http://minidisc.org/part_Sony_CMT-PX7.html, Available before Oct. 9, 2009 (1 page).
MD Community Page: Sony CMT-PX3, Available before Oct. 9, 2009 (1 page).
MD Community Page: JVC XM-PX601, Available on the Internet at http://minidisc.org/part_JVC_XM-PX601.html, Available before Oct. 9, 2009 (1 page).
MD Community Page: Sony ZS-M1, Available on the Internet at http://minidisc.org/part_Sony_ZM-M1.html, [date unknown] (1 page).
MD Community Page: Kenwood DMC-P55, Available on the Internet at http://minidisc.org/part_Kenwood_DMC-P55.html, Available before Oct. 9, 2009 (1 page).
MD Community Page: Kenwood DMC-S55/s77, Available on the Internet at http://minidisc.org/part_Kenwood_DMC-S55+S77.html, Available before Oct. 9, 2009 (2 pages).
Panasonic SJ-MR230, Minidisc.org [date unknown] (2 pages).
MD Community Page: Sony CMT-PX5, Available on the Internet at http://minidisc.org/part_Sony_CMT-PX5.html, [date unknown] (2 pages).
AudioTron3 Turtle Beach Connected Audio3 Reference Manual, May 2002 (98 pages).
All-in-One—No. 355, Japanese Companies in the United States, Apr. 1999, (58 pages).
COMPAQ Ipaq internet devices, Available on the Internet at http://web.archive.org/web/20010410010206/athome.compaq.com/showroom/static/ipaq/music_center, Apr. 10, 2001 (2 pages).
Highbeam Research, "ReQuest Multimedia Ships First MP3 Home Stereo Jukebox: ReQuest Multimedia Begins Shipping . . . " May 24, 2000 (3 pages).
Jones, S. "Dell Digital Audio Receiver-Digital upgrade for your analog stereo" Jun. 24, 2000 (32 pages).
AudioTron, Available on the Internet at http://en.wikipedia.org/wiki/AudioTron, Nov. 15, 2008 (2 pages).
Panasonic Portable Stereo System Model RX-D11 / RX-D10 Operating Instructions, 1999 (8 pages).
Formen.ign.com: Testing Ground: AudioReQuest, Available on the Internet at http://web.archive.org/web/2000815230322/formen.ign.com/news/21394.html Jun. 27, 2000 (5 pages).
ReQuest Multimedia Audio ReQuest Users Manual ARQ2 Pro / ARQ Zone / ARQ1 Pro [date unknown] (63 pages).
AudioReQuest User Manual, 2005 (44 pages).
Empeg car, mp3 in your dash, digital audio player user guide, 2000(50 pages).
Archos MP3 Jukebox Recorder Review—PCSTATS.com, Available on the Internet at http://www.pcstats.com/articleview/cfm?articleID=829 Available before Oct. 27, 2009 (3 pages).
ReQuest Multimedia Shops First MP3 Home StereoJukebox, Available on the Internet at http://www.allbusiness.com/electronics/consumer-household-electronics-portable/6493758-1.html May 24, 2000, (4 pages).

ReQuest Multimedia Shops First MP3 Home StereoJukebox, Available on the Internet at http://www.allbusiness.com/electronics/consumer-household/electronics-portable/6493758-1.html May 24, 2000, (4 pages).
AudioReQuest: Features Available on the Internet at http://web.archive.org/web/2000817023745/www.request.com/features.html Aug. 17, 2000 (2 pages).
AudioReQuest: Overview, Aug. 15, 2000, (2 pages).
AudioReQuest: Photo Gallery, Aug. 17, 2000, (2 pages).
AudioReQuest: Press Release, Aug. 17, 2000, (2 pages).
AudioReQuest: Remote, Aug. 29, 2000, (2 pages).
AudioReQuest Software Changes, 2008 (16 pages).
AudioReQuest: Specifications, Aug. 17, 2000, (2 pages).
AudioReQuest: Press Release, May 24, 2000, (1 page).
AudioReQuest Manual, 2001 (75 pages).
The Critical Eye-ReQuest Multimedia AudioReQuest, [date unknown] (2 pages).
Hetherington, B., Home Toys Review Audio Request (ARQ1) Music Player, Mar. 2001, (3 pages).
Martinez, M.J., "What to Get for Your Geek" Oct. 30, 2000 (4 pages).
ReQuest Unveils Home Stereo MP3 Unit at MP3 Summit99 Jun. 15, 1999 (2 pages).
"Mp3 Summit is Ground Zero" Jun. 16, 1999 (3 pages).
"MP3.com—ReQuest Revolutionizes MP3 Home Audio 2" Jun. 5, 2000 (5 pages).
U.S. News: Personal TECH: toe-tapping in the digital era, Jul. 10, 2000, (2 pages).
Audio ReQuest in the News, Oct. 6, 2000 (3 pages).
Evangelista, B., "Beefing Up the Home Jukebox," Jan. 17, 2000 (4 pages).
"ReQuest Unveils Home Stereo MPT Unite at MP3 Summitt99," Jun. 20, 1999 (4 pages).
AudioReQuest: Features, Dec. 15, 2000 (2 pages).
AudioReQuest: Features, May 25, 2000 (2 pages).
Davis, J., "Black Boxes: ReQuest Multimedia AudioRequest ARQ1-20 MMP3 Jukebox" 2001 (2 pages).
Kirschner, S.K., Music Boxes go for a Spin, Popular Science, Mar. 1999.
AWN65.79 Speaker Installation Notes, [date unknown] (4 pages).
CASA System Interface Owner's Manual, [date unknown] (7 pages).
CASA System Keypad Unit Installation Notes, [date unknown] (4 pages).
CASA System Remote Control Notes, [date unknown] (2 pages).
CASA System Installation Manual, Issue 5, Jun. 2, 2001 (63 pages).
"Russound, 4-Source Multi-Zone Central Audio Controller/Amplifiers CAi-Series Instruction Manual" [date unknown] (16 pages).
CarPlayer.com, "Plans & Components-Build Your Own" Mar. 1, 2000 (3 pages).
CASA System Installation Manual, [date unknown] (62 pages).
Changing Rooms Part Two, Oct. 6, 1999 (1 page).
Niko UK announces two major new appointments, Jun. 1, 2009 (4 pages).
New Products from Bowers and Wilkins Loudspeakers, Sep. 7, 2000 (3 pages).
ComputerRemote.com, Available on the Internet at http://www.readyware.net/ComputerRemove.htm, Available before Oct. 15, 2009 (4 pages).
Check out How-To's of the Future, Available on the Internet at http://www.wired.com/wired/archive/7.08/dl_players.html, Available before Oct. 27, 2009 (9 pages).
D'Music SM-200C,Available on the Internet at http://web.archive.org/web/20000823111901/www.mp3hardware.com/previews/sm-200c.html, Aug. 23, 2000 (1 page).
EETimes.com—Engineers drive craze for MP3 audio players, Available on the Internet at http://www.eetimes.com/story/OEG19990205S0016, Feb. 5, 1999 (4 pages).
Empeg—Download Section Customer Support, Available on the Internet at http://web.archive.org/web/20011005000929/ww.empeg.com/cgi-bin/display.cgi?section=download, Oct. 5, 2001 (2 pages).
Empeg, Ltd's Empeg MP3 Car Audio Player, Available on the Internet at http://web.archive.org/web/19991009183655/www.empeg.com/i_ssue04.html, Nov. 3, 1998 (4 pages).

Empeg, Ltd's Empeg MP3 Car Audio Player, Available on the Internet at http://web.archive.org/web/20000519231342/www2.empeg.com/issue07.html, Apr. 19, 1999 (3 pages).
Empeg Car Player Specification, [date unknown] (1 page).
Welcome to empeg, Available on the Internet at http://web.archive.org/web/20001019041230/www.empeg.com/, Oct. 19, 2000 (1 pages).
Empeg, Ltd's Empeg MP3 Car Audio Player, Mark 2 New Features List, Available on the Internet at http://web.archive.org/web/20000605234634/www2.empeg.com/issue_14.html, Jun. 5, 2000, (4 pages).
Empeg Ltd's Empeg MP3 Car Audio Player, Available on the Internet at http://web.archive.org/web/19990430033318/www.empeg.com/main.html, Apr. 30, 1999 (1 page).
Empeg Ltd's Empeg MP3 Car Audio Player, Read The Empeg FAQ, Available on the Internet at http://web.archive.org/web/19990430033318/www.empeg.com/main.html, Apr. 30, 1999 (1 page).
Empeg, Ltd's Empeg MP3 Car Audio Player, Available on the Internet at http://web.archive.org/web/20000310132750/www2.empeg.com/player.html , Mar. 10, 2000 (2 pages).
New Products From Bowers and Wilkins Loudspeakers—AVRev.com, Sep. 7, 2000 (4 pages).
AudioReQuest, MP3 Home Stereo Jukebox, Available on the Internet at http://web.archive.org/web/2000302194934/www.audiorequest.com/home.html, Mar. 2, 2000 (1 page).
AudioReQuest: Features, Available on the Internet at http://web.archive.org/web/20000525171344/www.audiorequest.com/features.html, May 25, 2000 (2 pages).
AudioReQuest: Specifications, Available on the Internet at http://web.archive.org/web/200001021104359/www.audiorequest.com/specs.html, Oct. 21, 2000 (2 pages).
i2Go eGo, Test Drive of The i2Go eGo with IBM MicroDrive, Available on the Internet at http://www.mp3newswire.net/stories/2000/ego.html, Sep. 1, 2000 (4 pages).
Imerge brochure [date unknown] (11 pages).
Imerge brochure [date unknown] (7 pages).
Imerge—XiVA, the home media server, Available on the Internet at http://web.archive.org/web/19991204095948/www.imerge.co.uk/xiva.htm, Dec. 4, 1999 (2 pages).
Imerge Press Information—media servers for business, home, education and entertainment, Mar. 2000 (1 page).
Human-Computer User Guides—Consumer Equipment [date unknown] (1 page).
Miller, B. "Wireless MPS Remote Jukebox with Atmel AT90S2313-4PC," Reprinted from Circuit Cellar #134 [date unknown] (6 pages).
esp@cenet—Bibliographic data for CN1172395, Entitled: Display apparatus having radio receiver and method controlling the same, Published Feb. 4, 1998 (1 page).
My MP3 Jukebox, Available on the Internet at http://wandel.ca/homepage/jukebox.html, Available before Oct. 27, 2009 (5 pages).
JVC Powered Woofer CD System Instruction Manual for Model RV-B90/B70, [date unknown] (40 pages).
Portable MP3 Players Put the Music in Your Pocket—specifications, [date unknown], (2 pages).
MP3: The Definitive Guide: Sample Chapter, Hardware, Portables, Home Stereos, and Kits. 1$^{st}$ Edition Mar. 2000 (44 pages).
Softlab: Oct. 2, 2000 (2 pages).
Softlab: Dec. 12, 2001 (2 pages).
Softlab: Oct. 14, 2001 (7 pages).
MP3.com—MP3 Hardware Guide, Apr. 21, 1999 (4 pages).
Helfgot, J.M., MP3.com—ReQuest Revolutionizes MP3 Home Audio, Jun. 5, 2000 (6 pages).
MP3.com—ReQuest Revolutionizes MP3 Home Audio 2, Jun. 5, 2000 (6 pages).
MP3 Home Player Equipment, MP3 Home Player Gear, Available before Oct. 29, 2009 (4 pages).
Musicstore Specification, Available on the Internet at http://www.bitweb.com/modweb/mstorespec.htm, [date unknown] (4 pages).
Neoseeker InHouse Articles Browser, Available on the Internet at http://web.archive.org/web/20000815071721/www.neoseeker.com/Article, Aug. 15, 2000 (2 pages).

Neoseeker Portable USB MP3 Player Roundup—p. 1, Jul. 28, 2000 (2 pages).
Neoseeker Portable USB MP3 Player Roundup—p. 2, Jul. 28, 2000 (2 pages).
Neoseeker Portable USB MP3 Player Roundup—p. 3, Jul. 28, 2000 (2 pages).
Neoseeker Portable USB MP3 Player Roundup—p. 4, Jul. 28, 2000 (2 pages).
Neoseeker Portable USB MP3 Player Roundup—p. 5, Jul. 28, 2000 (2 pages).
Neoseeker Portable USB MP3 Player Roundup—p. 6, Jul. 28, 2000 (2 pages).
Neoseeker Portable USB MP3 Player Roundup—p. 7, Jul. 28, 2000 (2 pages).
Neoseeker Portable USB MP3 Player Roundup—p. 8, Jul. 28, 2000 (2 pages).
Neoseeker Portable USB MP3 Player Roundup—p. 9, Jul. 28, 2000 (2 pages).
Niles, Preliminary Technical Data Sheet, 1999 (2 pages).
The Bose® Wave® Radio/CD Owner's Guide [date unknown] (30 pages).
OSCAR MP3-Player Kit Instructions, Version B, Nov. 2000 (12 pages).
OSCAR MP3-Player Kit Instructions, Version 4A, Oct. 2000 (22 pages).
OSCAR MP3-Player Kit Instructions, Version 6A, Jun. 2002 (22 pages).
Howard, B., ZDNet: AudioReQuest ARQ 1—PC Magazine First Looks, Jul. 6, 2000 (3 pages).
PC Remote Control—Info Page, Available on the Internet at http://web.archive.org/web/19991127135411/www.pcremotecontrol.com/info.html, Nov. 27, 1999 (4 pages).
PC Remote Control—IrDA compatibility info, Available on the Internet at http://web.archive.org/web/19991127154245/www.pcremotecontrol.com/irda.html, Nov. 27, 1999 (3 pages).
HanGo electronics, Personal Jukebox User Manual, 1999 (32 pages).
MP3 Newswire.net, 1200 Song MP3 Portable is a Milestone Player, Available on the Internet at http://www.mp3newswire.net/stories/personaljuke.html, Available before Oct. 27, 2009 (4 pages).
Philips, Internet Audio Mini Hi-Fi System, FW-I 1000, Dec. 1998 (36 pages).
Menta, R., Test Driving the Rave MP 2200, Available on the Internet at http://www.mp3newswire.net/stories/2000/rave200.html, Aug. 29, 2000 (3 pages).
MP3.com: Hardware > Portables, Rome II (UP-322), Nov. 29, 2003 (2 pages).
MP3 Player Saehan MPMan F20 Review—X-bit labs, Available on the Internet at http://www.xbitlabs.com/articles/multimedia/display/mpman-f20.html, Jul. 14, 1999 (12 pages).
Hospod, S., iApplianceWeb-OEG, Imerge SoundServer M 1000, Available on the Internet at http://www.iapplianceweb.com/ap-preview/audio_players_10.htm, Available before Nov. 9, 2009 (1 pages).
Trackz!™ HD Player, Available on the Internet at http://web.archive.org/web/19991012165726/mp3kit.com/trackz.htm, Oct. 12, 1000 (3 pages).
AudioReQuest Press Release, May 24, 2000 (2 pages).
Press Releases: CASA, B&W homes in on an exciting new market with the Launch of casa, the stunning new multiroom system, Dec. 1997 (3 pages).
Empeg car digital Audio Player User Guide, Jun. 2000.
Empeg car User Guide, Jun. 1999.
The Bose Wave Radio/CD Owners' Guide 1999.
AugioReQuest User Manual May 24, 2000.
Antonoff, Michael, Test Report: AudioReQuest ARQ1 Digital Music System, Sound & Vision, Jul./Aug. 2000.
Press Release, B&W Homes in on an Exciting New Market with the Launch of CASA The stunning New Multiroom System, Dec. 1997.
Sony Personal Audio System Manual, Model ZS-D7, 1998.
Hango Personal Jukebox Manual 1999.
Hacker, Scott, MP3: The Definitive Guide, Chapters 3, 4 and 6, O'Reilly & Associates, Mar. 2000.

Merriam-Webster Ninth New Collegiate Dictionary, 1986, (excerpt including pp. 982, 1217 and 1360).
Relevant portions of file history of U.S. Appl. No. 09/689,337, (219 pages), May 2006.
European Patent Office, Office Action dated Feb. 18, 2010 in counterpart European Application No. 06124855.5, 4 pages.
Chinese First Office Action in counterpart Application No. 01135465.8 dated Jul. 8, 2005, (4 pages).
European Search Report in counterpart Application No. 01308560.0 dated Jan. 4, 2008, (9 pages).
European Patent Office Action in counterpart European Application No. 06 124 855.5 dated Feb. 18, 2010, (4 pages).
Japanese Office Action in counterpart Application No. 2001-314486 dated Sep. 24, 2004, (2 pages).
Japanese Office Action in counterpart Application No. 2001-314486 dated Feb. 27, 2004, (4 pages).
Japanese Office Action in counterpart Application No. 2005-015727 dated May 12, 2008, (5 pages).
Appeal Decision, Japanese Patent Office in counterpart Application No. 2005-15727 dated Jul. 13, 2010, (21 pages).
Japanese Office Action for application No. 2008-232616 dated Oct. 4, 2011, 2 pages (English translation).
Yamaha RP-U100 Personal Receiver Owner's Manual (97 pages).
*Bose v. SDI Technologies, Opening Expert Report of Andrew B. Lippman*, Civil Action No. 09-cv-11439-WGY, filed Nov. 22, 2011 (73 pages).
*Bose v. SDI Technologies, Opening Expert Report of Andrew B. Lippman—Exhibit F*, Civil Action No. 09-cv-11439-WGY, filed Nov. 22, 2011 (11 pages).
*Bose v. SDI Technologies, Opening Expert Report of Andrew B. Lippman—Exhibit K*, Civil Action No. 09-cv-11439-WGY, filed Nov. 22, 2011 (11 pages).
*Bose v. SDI Technologies, Opening Expert Report of Andrew B. Lippman—Exhibit N*, Civil Action No. 09-cv-11439-WGY, filed Nov. 22, 2011 (13 pages).
*Bose v. SDI Technologies, Opening Expert Report of Andrew B. Lippman—Exhibit T*, Civil Action No. 09-cv-11439-WGY, filed Nov. 22, 2011 (16 pages).
*Bose v. SDI Technologies, Opening Expert Report of Andrew B. Lippman—Exhibit U*, Civil Action No. 09-cv-11439-WGY, filed Nov. 22, 2011 (31 pages).
*Bose v. SDI Technologies, Opening Expert Report of Andrew B. Lippman—Exhibit BB*, Civil Action No. 09-cv-11439-WGY, filed Nov. 22, 2011 (40 pages).
*Bose v. SDI Technologies, Opening Expert Report of Andrew B. Lippman—Exhibit DD*, Civil Action No. 09-cv-11439-WGY, filed Nov. 22, 2011 (9 pages).
*Bose v. SDI Technologies, Rebuttal Expert Report of Dr. Paul E. Beckmann*, Civil Action No. 1:09-cv-11439-WGY, filed Dec. 20, 2011 (96 pages).
*Bose v. SDI Technologies, Rebuttal Expert Report of Dr. Paul E. Beckmann—Exhibits A-E*, Civil Action No. 1:09-cv-11439-WGY, filed Dec. 20, 2011 (138 pages).
*Bose v. SDI Technologies, Markman Hearing*, Nov. 14, 2011, (17 pages).
*Bose v. SDI Technologies, Memorandum of Decision Concerning Patent Claim Construction*, Dec. 12, 2011 (23 pages).
European Search Report for Application No. EP 10181101.6, dated May 18, 2011, 4 pages.
Communication under Rule 71(3) for Application 06124855.5, dated Apr. 21, 2011, 56 pages.
Examiner comments and Extended European Search Report for Application No. EP 10176559.2 dated Apr. 26, 2011, 5 pages.
JP OA dated Mar. 1, 2011 for JP 2008-232616.
JP OA dated Oct. 26, 2010 for JP 2008-232616.
Bose Wave Radio Owners Manual, 1999.
Hedtke, John "*MP3 and the Digital Music Revolution: Turn you PC Into a CD-Quality Digital Jukebox*", Top Floor Publishing, Jun. 1999, Chapters 2, 7, and 8 (81 pages).
Audio ReQuest User Manual, 2000, p. 1-68.
*Bose Corporation v. SDI Technologies, Inc., Imation Corp., Memorex Products, Inc., 3XM Consulting, LLC,* and *DPI, Inc.; List of Claim Terms for Construction and Proposed Constructions of Defenedants*

SDI Technologies, Inc., Imation Corp., Memorex Products, Inc., and DPI, Inc.; Cse No. 1:09-CV-11439-WJY.

Bose Corporation v. SDI Technologies, Inc., Imation Corp., Memorex Products, Inc., 3XM Consulting, LLD, and DPI, Inc.; "Bose's List of Claim Terms for Construction and Proposed Constructions[Served Only]" Civil Action No. 09-cv-11439-WGY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit A; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit B; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit C; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit D; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit E; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit F; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit G; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit H; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit I; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit J; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit K; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit L; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit M; Filed Jul. 15, 2011; Case No. 1:09-CV-11439-WJY.

Bose Corporation, v. SDI Technologies, Inc., Imation Corp., Memorex Products, Inc., EXM Consulting, LLC, and DPI, Inc., "Preliminary Invalidity and Non-Infringement Contentions of Defendants SDI Technologies, Inc., Imation Corp., Memorex Products, Inc., and DPI, Inc." Exhibit N; Filed Jul. 15, 2011; Case No. 1:09-CV-11439-WJY.

Bose Corporation v. SDI Technologies, Inc., Imation Corp., Memorex Products, Inc., 3XM Consulting, LLC., and DPI, Inc., "Plaintiff Bose's Opening Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Declaration of Tal Kedem In Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit 1 to Declaration of Tal Kedem In Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit 2 to Declaration of Tal Kedem In Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit 3 to Declaration of Tal Kedem In Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit 4 to Declaration of Tal Kedem In Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Declaration of Dr. Paul E. Beckmann in Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit A-1 to Declaration of Dr. Paul E. Beckmann in Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit A-2 to Declaration of Dr. Paul E. Beckmann in Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Exhibit B to Declaration of Dr. Paul E. Beckmann in Support of Plaintiff Bose's Claim Construction Brief"; filed Aug. 8, 2011; Civil Action No. 09-cv-11439-WGY.

Bose Corporation v. SDI Technologies, Inc., Imation Corp., Memorex Products, Inc., 3XM Consulting, LLC., and DPI, Inc., "Declaration of Aaron W. Moore In Support of Opening Claim Construction Brief of

*Defendants SDI Technologies, Inc., Imation Corp., Memorex Products, Inc. and DPI, Inc.*"; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 1 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 2 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 3 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 4 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 5 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 6 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 7 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 8 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 9 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 10 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 11 to Declaration of Aaron W. Moore In Support of Opening Claim Construction Brief of Defendants SDI Technologies, Inc., Imation Corp., Memorex Products, Inc. and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Opening Claim Construction Brief of Defendants SDI Technologies, Inc., Imation Corp., Memorex Products, Inc., and DPI, Inc."; filed Aug. 8, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Claim Construction Reply Brief of Defendants SDI Technologies, Inc., Imation Corp., Memorex Products, Inc., and DPI, Inc."; filed Aug. 19, 2011; Civil Action No. 09-cv-11439-WGY.

*Bose Corporation v. SDI Technologies, Inc., Imation Corp., Memorex Products, Inc., 3XM Consulting, LLC.*, and *DPI, Inc.*, "Declaration of Aaron W. Moore In Support of Claim Construction Reply Brief of Defendants SDI Technologies, Inc., Imation Corp., Memorex Products, Inc., and DPI, Inc."; filed Aug. 19, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 1 of Declaration of Aaron W. Moore In Support of Claim Construction Reply Brief of Defendants SDI Technologies, Inc., Imation Corp., Memorex Products, Inc., and DPI, Inc."; filed Aug. 19, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit 2 of Declaration of Aaron W. Moore In Support of Claim Construction Reply Brief of Defendants SDI Technologies, Inc., Imation Corp., Memorex Products, Inc., and DPI, Inc."; filed Aug. 19, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Plaintiff Bose's Responsive Claim Construction Brief"; filed Aug. 19, 2011; Civil Action No. 09-cv-11439-WGY.

*Bose Corporation v. SDI Technologies, Inc., Imation Corp., Memorex Products, Inc., 3XM Consulting, LLC.*, and *DPI, Inc.*, "Declaration of Dr. Paul E. Beckmann in Support of Bose's Responsive Claim Construction Brief"; filed Aug. 19, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Claim Construction Reply Brief of Defendants SDI Technologies, Inc., Imation Corp., Memorex Products, Inc., and DPI, Inc—Leave to File Granted on Aug. 29, 2011--."; filed Aug. 29, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Exhibit A to Claim Construction Reply Brief of Defendants SDI Technologies, Inc., Imation Corp., Memorex Products, Inc., and DPI, Inc—Leave to File Granted on Aug. 29, 2011--."; filed Aug. 29, 2011; Civil Action No. 09-cv-11439-WGY.

*Bose Corporation v. SDI Technologies, Inc., Imation Corp., Memorex Products, Inc., 3XM Consulting, LLC., and DPI, Inc.*, "Defendant DPI, Inc.'s Imation Corp.'S, and Memorex Products, Inc.'s Reply to Plaintiff's Responsive Claim Construction Brief—Leave to File Granted on Aug. 29, 2011--"; filed Aug. 29, 2011; Civil Action No. 09-cv-11439-WGY.

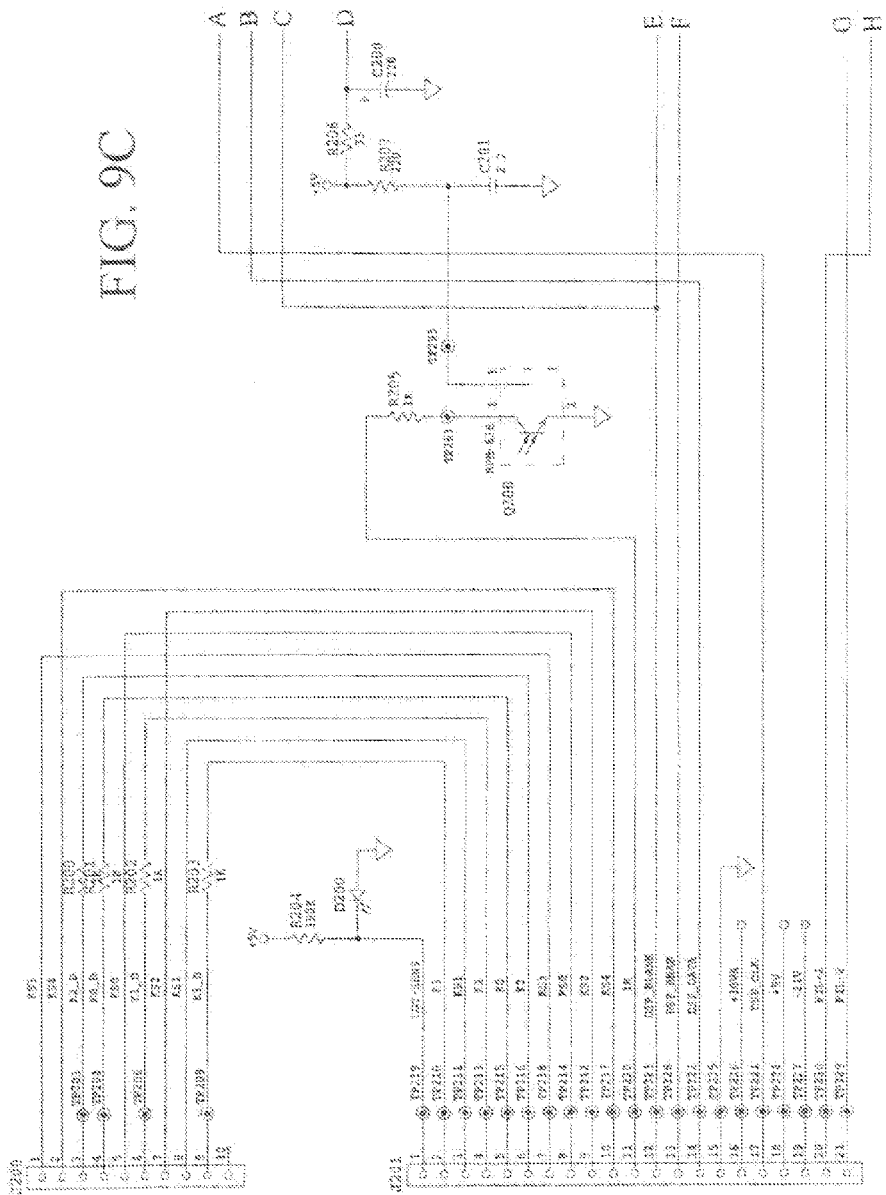

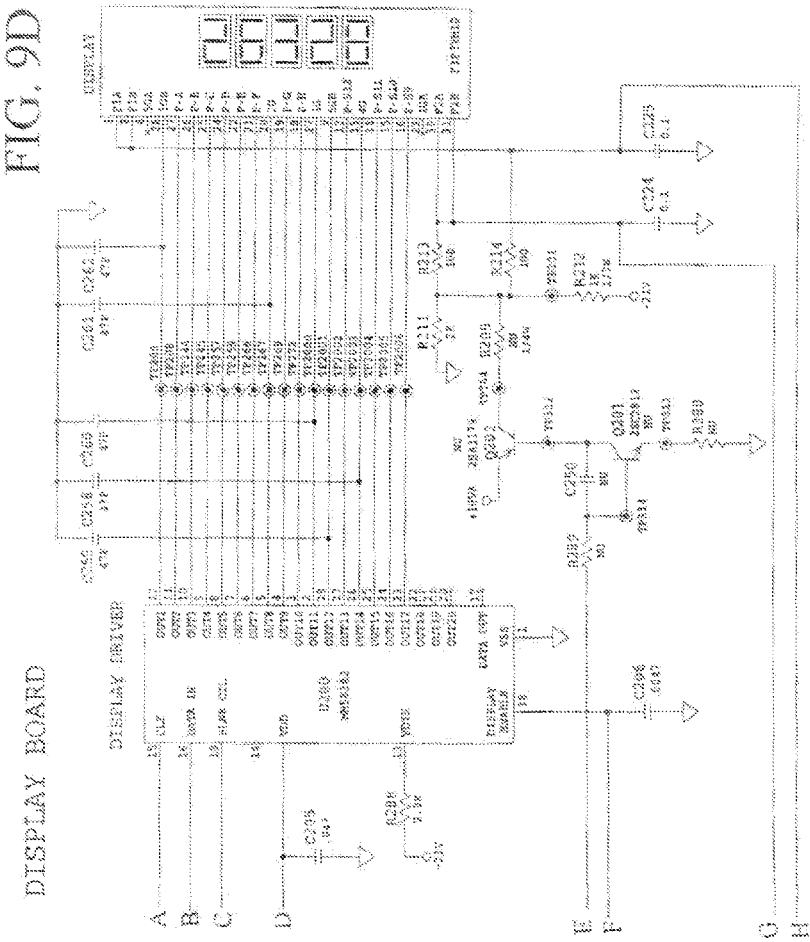

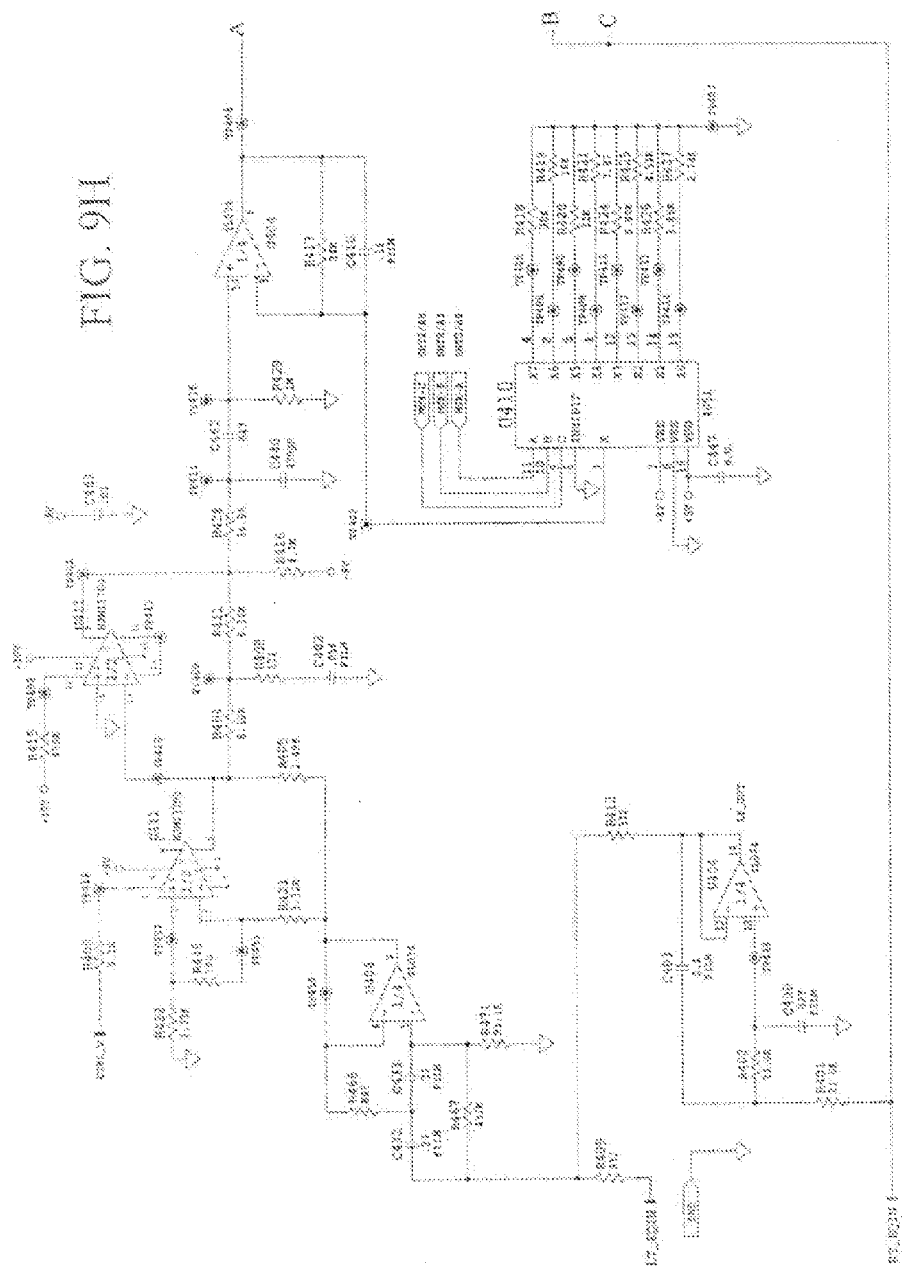
FIG. 9I1

(TO FIG. 9R)

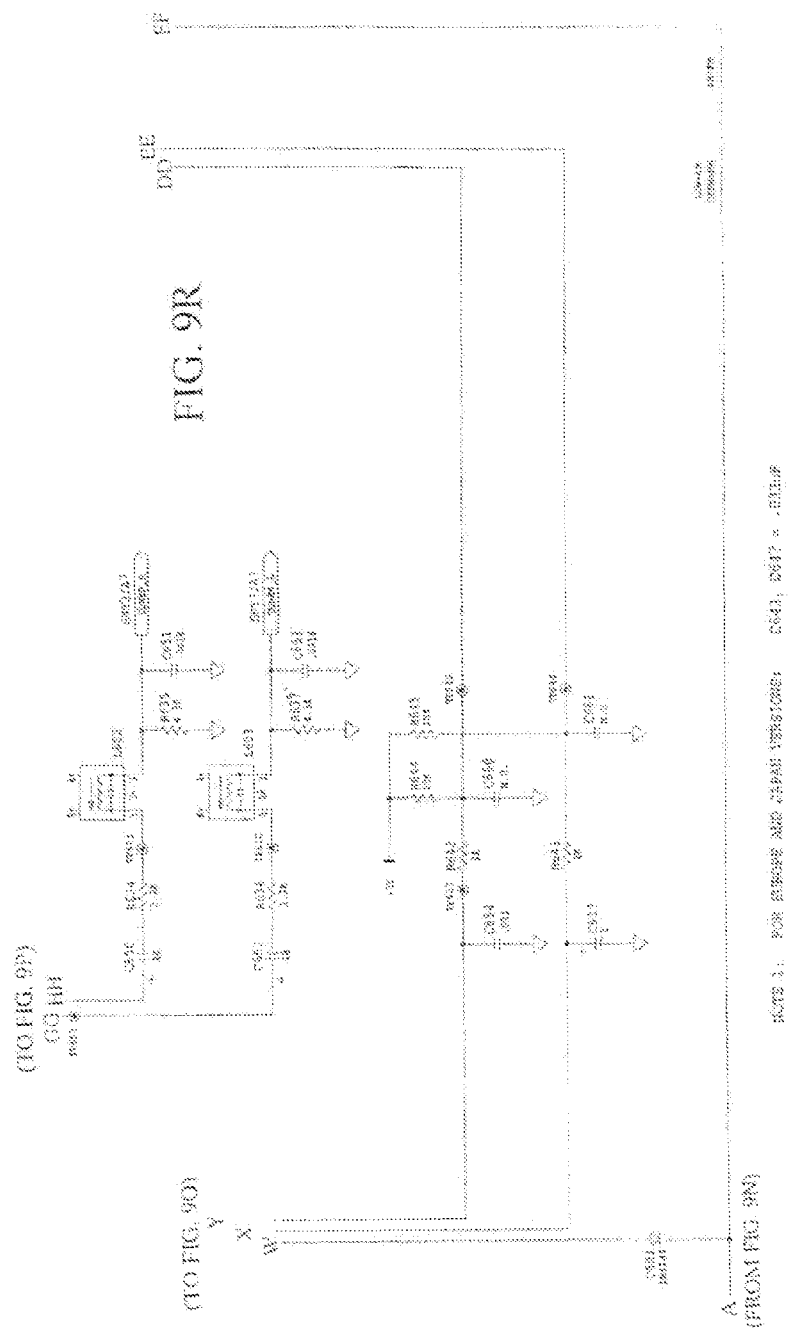

FIG. 10A

INTERACTIVE SOUND REPRODUCING

CROSS-REFERENCE TO RELATED APPLICATIONS

This application is a continuation and claims the benefit of priority under 35 USC 120 of U.S. application Ser. No. 09/689,337, entitled INTERACTIVE SOUND REPRODUCING, filed Oct. 12, 2000 now U.S. Pat. No. 7,277,765.

STATEMENT REGARDING FEDERALLY SPONSORED RESEARCH OR DEVELOPMENT

Not applicable.

BACKGROUND OF THE INVENTION

The invention relates to interactive sound reproducing and more particularly to sound reproducing from computer compact disk (CD) drives, network radio stations, broadcast radio stations, and digitally encoded computer files.

It is an important object of the invention to provide improved interactive sound reproducing.

BRIEF SUMMARY OF THE INVENTION

According to the invention, an audio system includes a sound reproduction device for producing audible sound from audio signals. The sound reproduction device includes a radio tuner, a powered speaker and a connector for connecting the sound reproduction device with a computer. The computer provides audio signals from a plurality of sources. The sources include a computer CD player, digitally encoded computer files stored on the computer, and a computer network connected to the computer. The sound reproduction device includes control buttons for controlling at least one of the computer CD player, the digitally encoded computer files and the computer network.

In another aspect of the invention, an audio system includes a sound reproduction device for producing audible sound from audio signals. The sound reproduction device includes an enclosure, enclosing a radio tuner and a powered speaker. The audio system further includes a connector for connecting the sound reproduction device with a computer, the computer for providing audio signals from a computer CD player, from digitally encoded computer files, and from a computer network.

In another aspect of the invention, an audio system includes a sound reproduction device for reproducing audible sound from audio signals, a computer coupled to the sound reproduction device for receiving the audio signals from a computer network, the audio signals being transmitted from an alternatively selectable plurality of network addresses, and a remote control device, for communicating commands to the sound reproduction device, the remote control device comprising a plurality of indicator buttons. An indicating one of the indicator buttons causes the computer to select a preassigned one of the network addresses.

In another aspect of the invention, an audio system includes a computer system and a sound reproduction system for reproducing audible sound from audio signals. The audio signals come from a plurality of selectable sources. A method for switching the sound reproduction system from an unpowered state to a powered state includes transmitting a control signal from the sound reproduction system to the computer system. If the computer system responds to the control signal, the method determining by the sound reproduction device that the computer system is in a responsive state and If the computer system does not respond to the control signal, determining by the sound reproduction device that the computer system in an unresponsive state.

In another aspect of the invention, a radio receiver has a number n of preset indicators. A method for assigning broadcast frequencies to individual preset indicators includes determining the location of the radio receiver and scanning the frequency spectrum to determine the strongest signals.

In another aspect of the invention, a sound system includes a sound reproduction device coupled to a computer system and a remote control device, for transmitting encoded control commands to the sound reproduction device. A method for decoding the commands includes receiving, by the sound reproduction device, one of the encoded control commands, and decoding, by the sound reproduction device, the one received control command, and executing, by the sound reproduction device, the one received control command. In the event that the one received control command is not decodable or is not executable by the sound reproduction device, the method includes transmitting the encoded control command to the computer system.

In another aspect of the invention, an audio system includes a sound reproduction device for reproducing audible sound from audio signals from a plurality of sources. The sources including a radio tuner and at least one of a CD containing a plurality of individually indicatable tracks, a plurality of individually indicatable network addresses, and a plurality of individually indicatable digitally encoded files stored on a digital storage device. The audio system includes a source selector for selecting from the plurality of sources, a source of audio signals to be reproduced by the sound reproduction device and a control signal input device. If the selected source is the radio tuner, an activation of the control signal input device changes the tuning frequency of the radio tuner; if the selected source is the CD, an activation of the control signal input device changes the indicated CD track or play position within a track; and if the selected source is the selectable network addresses, an activation of the control signal device changes the indicated network address.

In another aspect of the invention, a method of operating an audio system adapted to reproduce sound from a plurality of digitally encoded files which contain identifying characteristics includes assigning a value of one of the identifying characteristics to a preset indicator; on the indicating of the preset indicator, searching the plurality of files for the value of the one identifying characteristic; and selecting for reproduction the digitally encoded files having the value.

In still another aspect of the invention, a method for selecting from a plurality of audio signal sources having identifying characteristics, a single audio signal source, includes specifying a value of one of the identifying characteristics; determining, by a computer, which of the audio signal sources have the value for the one characteristic; and selecting a single audio source from the plurality of audio signal sources.

According to another aspect of the invention, a method gives multiple sets of values to a single set of presets being used with a single source. The method changes the set of values by clicking on a graphic, such as a right or left arrow on the screen display, to bring up a new set of values for the presets. Typically, any one of the set of values is selectable by either clicking with the pointing device on the appropriate preset on the screen, pressing the selected preset on the remote, or pressing the preset on the radio.

Other features, objects, and advantages will become apparent from the following detailed description, which refers to the following drawings in which:

BRIEF DESCRIPTION OF THE DRAWINGS

FIGS. 10A-10F and FIGS. 10A-10F are an implementation of the interface unit 54 of FIG. 2.

DETAILED DESCRIPTION OF THE INVENTION

Figure 1:
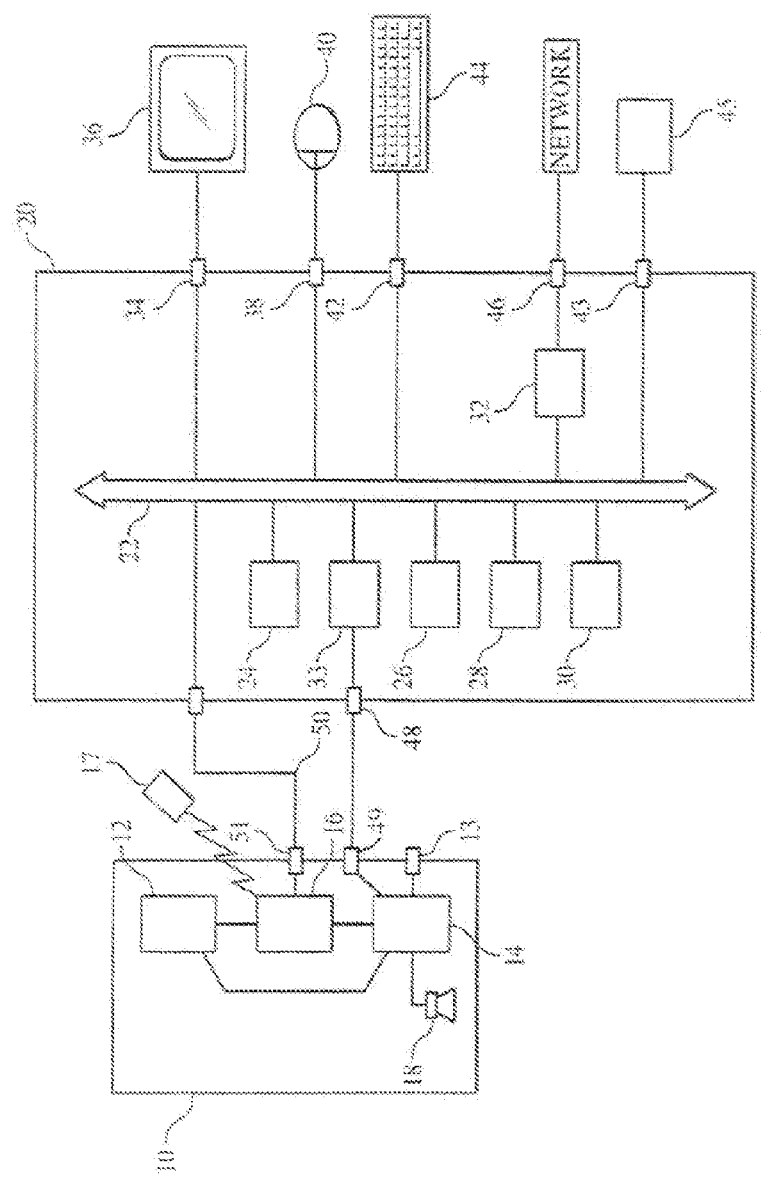
FIG. 1 is a block diagram of a first configuration of a networked sound system according to the invention.

With reference now to the drawings and more particularly to FIG. 1, there is shown a first configuration of a networked sound system according to the invention. Sound reproduction device 10 includes an AM/FM tuner 12, audio signal processing circuitry 14, control electronics circuitry 16 for controlling the tuner and signal processing circuitry, a remote control device 17 for communicating commands to control electronics circuitry 16, and an electroacoustical transducer 18. An auxiliary (hereinafter "aux") input 13 typically implemented as a signal jack permits the sound reproduction device to receive audio signals from outside sources, such as portable CD players. Computer system (PC) 20 includes a bus 22 which interconnects various computer system components and carries data and control signals between them. Hardware components may include CPU 24, RAM 26, CD player 28, a mass storage device, such as a hard disk 30, a network interface card 32, and a sound card 33. Computer system 20 also includes a number of external connectors for connecting bus 22 with various external devices. A first external connector 34 connects to an external display 36. A second external connector 38 connects to an external input device such as a mouse 40. A third external connector 42 connects to a keyboard 44. A fourth external connector 46 connects network interface card 32 to a local or wide area network for transmitting to and receiving signals from remote devices that are connected to the local or wide area network. A fifth external connector 43 connects to external mass storage device 45. Stereo jack 48 connects sound card 33 to radio audio signal processing circuitry 14 through analog input terminal 49. Audio system control connector 50 connects bus 22 to control electronics circuitry 16 through digital input terminal 51.

Figure 2:
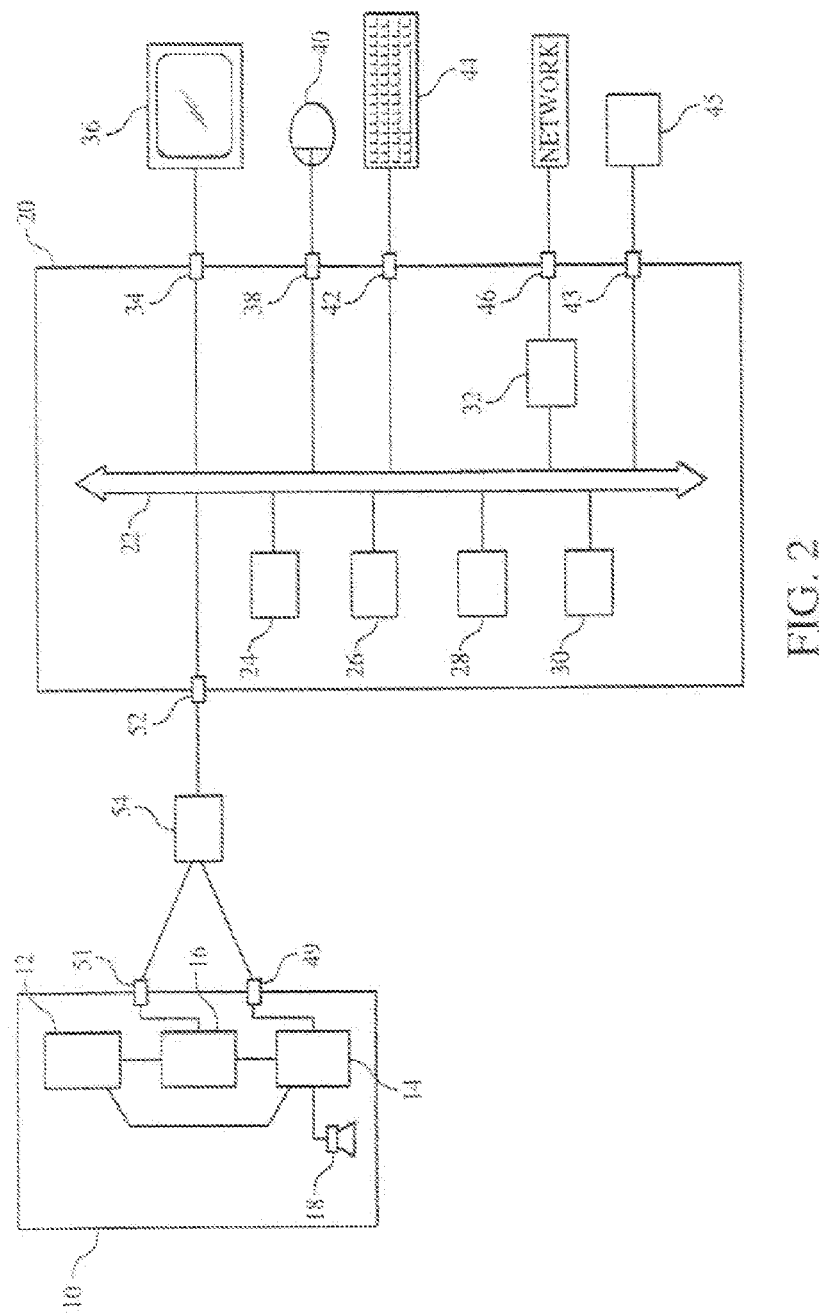
FIG. 2 is a block diagram of a second configuration of a networked sound system according to the invention.

Referring now to FIG. 2, there is shown a second configuration of a networked audio system according to the invention. The elements of FIG. 2 are the same as the elements of FIG. 1, with some exceptions. Sound card 33 of FIG. 1 is not needed in this configuration. Stereo jack 48 and the audio system control connector 50 of FIG. 1 are replaced by a bus interface connector 52, which connects to an interface unit 54. The interface unit 54 connects to audio signal processing circuitry 14 through analog terminal 49 and to control electronics circuitry 16 through digital terminal 51. Interface unit 54 will be described in more detail in connection with a subsequent figure.

A networked audio system which contains both the powered speaker and the radio tuner in a single enclosure is advantageous over conventional audio systems which house the speakers and radio tuner in separate enclosures, because the system can then be configured to occupy less space in a work area.

Figure 3:
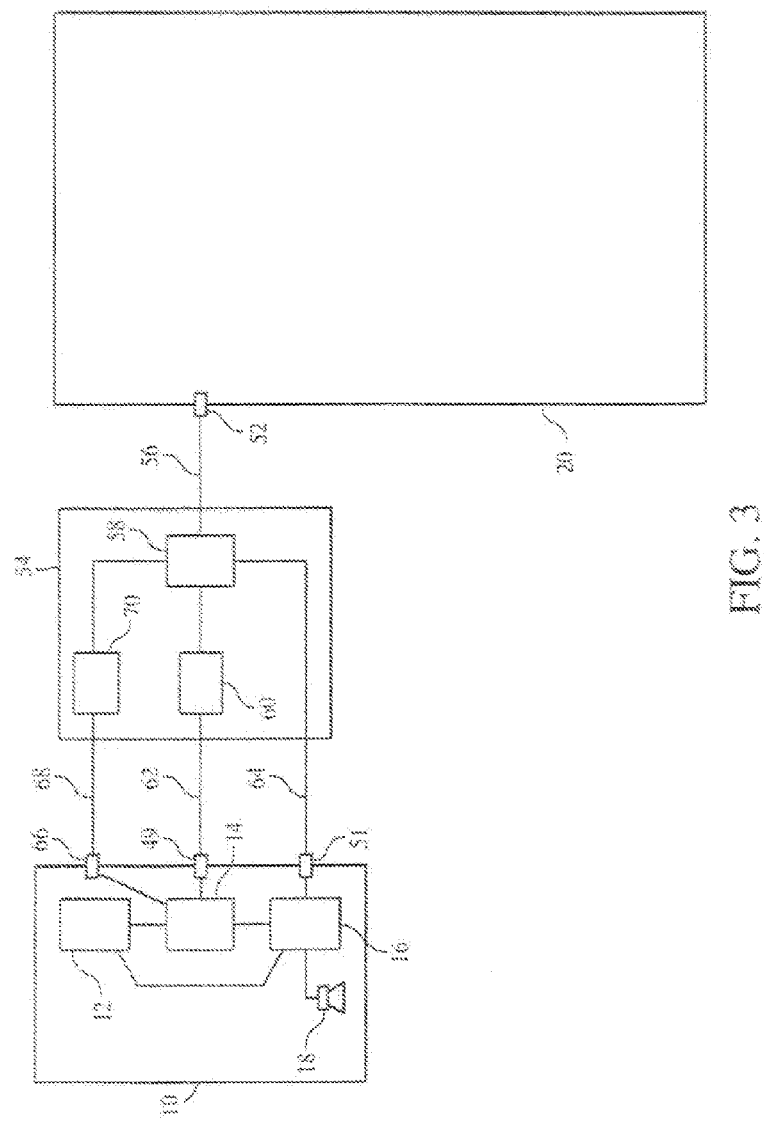
FIG. 3 is a block diagram of the interface unit of FIGS. 1 and 2.

Referring to FIG. 3, there is shown interface unit 54 in more detail. Signal line 56 from interface connector 52 is connected to logic circuitry 58. Logic circuitry 58 is coupled to D/A converter 60 which is connected to analog terminal 49 by analog signal line 62. Analog terminal 49 is in turn connected to audio signal processing circuitry 14. Logic circuitry 58 is connected to digital terminal 51 by digital signal line 64. Digital terminal 51 is in turn connected to control electronics circuitry 16. If bi-directional flow of analog signals is desired, a second analog signal path is provided. The second analog signal path includes a signal line between audio signal processing circuitry 14 and a second analog terminal 66; a second analog signal line 68 connecting second analog terminal 66 and an A/D converter 70; and a signal line connecting A/D converter 70 and logic circuitry 58.

In operation, logic circuitry 58 determines if transmissions on signal line 56 from bus 22 are intended for sound reproduction device 10. If signals on bus 22 are intended for sound reproduction device 10, logic circuitry 58 determines whether the signals are control signals or audio information. If the signals are control signals, logic circuitry 58 transmits signals to digital terminal 51 over digital signal line 64. If signals are audio information, logic circuitry transmits signals to D/A converter 60 which converts the digital signal to an analog audio signal. Analog audio signal is then transmitted over analog signal line 62 to analog terminal 49 and then to audio signal processing circuitry 14. The digital signal path including control circuitry 16, digital terminal 51, digital signal line 64, logic circuitry 58 signal line 56, and interface connector 52 is constructed and arranged to transmit signals bidirectionally, so that control signals originating at control circuitry 16 can be transmitted to computer bus 22 for processing by CPU 24. If bidirectional flow of analog circuitry is desired, analog signals may be transmitted from audio signal processing circuitry 14 to second analog terminal 66, and to A/D converter 70, where it is converted to a digital signal that is then transmitted to logic circuitry 58.

In one implementation, sound reproduction device 10 is a Wave® radio equipped with an appropriate communications ports, available from the Bose Corporation of Framingham, Mass. Computer system 20 may be a conventional multimedia personal computer.

There are typically three implementation arrangements for interface unit 54. One alternative is to implement interface unit 54 as a module in computer system 10. In this arrangement, interface unit 54 is implemented as a circuit board that connects internally to bus 22 (so that interface connector 52 is internal to the computer, and is physically connected to an expansion slot in the computer), signal lines 62, 64, and 68 are implemented as cables, and digital terminal 51, analog terminal 49 (and second analog terminal 66, if present) are external ports for the sound reproduction device 10.

A second alternative is to implement interface unit 54 as an intermediate, separate unit, typically integrated with cables which implement signal lines 62, 64, 68, and 56. In this arrangement, interface connector 52 is an external computer port, and digital terminal 51, analog terminal 49 (and second analog terminal 66, if present) are external ports for the sound reproduction device 10.

A third alternative is to implement interface unit 54 as a module, such as a circuit board, in the sound reproduction device 10. In this arrangement, sound reproduction device 10 has an external port to accommodate a cable that implements signal line 56, and the remaining signal lines and terminals are internal to sound reproduction device 10.

A networked sound system according to the invention may have a number of operating modes. In a first mode, sound reproduction device 10 operates as a standalone sound reproduction device (hereinafter "standalone mode"), similar to a conventional radio or hi-fi receiver. Operating in this mode, sound reproduction device operates independently of computer system 20, and even operates if computer system 20 is not running. In a second operating mode (hereinafter "sound effects mode"), sound reproduction device 10 operates as conventional computer speakers, reproducing sounds that are incidental to programs running on computer system 20. Examples may be sound effects in computer games, audible alarms and warnings, indicating, for example, that the computer system has received electronic mail. In a third operating mode (hereinafter "audio system mode") sound reproduction device 10 operates as a processor and reproducer of audio signals from a variety of sources, including networked sources and components of the computer system 20.

When the system is operating in the sound effects mode and the audio systems mode, the operation of the components of the system is controlled by a software program running on computer system 20. For efficient use of computer resources, the software program may be divided into two program modules, one of which provides communications between components of computer system 20 and sound reproduction device 10, and a second which accesses sound sources as described below. Additionally, the first program module can contain instructions such that it automatically activates the second program module if it detects a communication from sound reproduction device 10 to computer system 20 that requires that the second module be running.

Operating in standalone mode, sound reproduction device 10 is controlled as, and operates as a standard radio or receiver. On/off, tuning, and volume control are all either entered by control buttons or dials that are connected electronically to control electronics circuitry 16, or by remote control device 17.

Operating in sound effects mode, sound reproduction device 10 is controlled as, and operates as, standard amplified computer speakers having an on/off switch and volume control.

Operating in audio systems mode, sound reproduction device 10 reproduces sound from tuner 12, aux input 13, digital audio signals stored in RAM 26, hard disk 30, or external mass storage device 45; audio signals received from sources connected to the local or wide area network connected to network interface 32; and other sources such as CD player 28 (which can be a component of computer system 20 as shown, or which can be a separate component, connected directly to sound reproduction device 10). The source or sources of the audio signals is controlled by a computer program running on computer system 20.

If sound reproduction device 10 is in the "off" state, and is turned "on" either by pressing the "on" or "power" button or a button or indicator performing an equivalent function, or by pressing the corresponding button on remote control device 17, control electronics circuitry 16 detects whether computer 20 is connected, and if connected, in the "on" or "off" state. If computer 20 is not connected or is in the "off" state, sound reproduction device 10 operates in standalone mode, and sound reproduction device begins reproducing audio signals from the last internal audio signal source (in one implementation, either AM or FM signals from AM/FM tuner 12, or signals from aux input 13). If computer 20 is in the "on" position and the second program module (as described above in the discussion of "Operating Modes") is not running, the first program module activates the second program module, and the sound reproduction device begins producing signals from the last audio signal source, as described above in the discussion of "audio systems mode." If computer 20 is in the "on" position and the second program module is running, the sound reproduction device begins producing signals from the last audio signal source.

Recorded on hard disk 30 or external mass storage 45 may be information about typically either AM broadcast, FM broadcast, broadcast radio stations available to the reproduction device 10 through tuner 12. Typically, availability is determined by a combination of proximity to and direction to the broadcast site, directionality and power of the broadcast signal, obstructions (such as tall buildings and mountains), and competing signals, especially those in nearby frequency bands. The list of radio stations available to the reproduction device may be assembled in a number of ways. In a simple form, the user may manually tune a radio station and manually enter into the data base identifying information about the radio station. In more sophisticated forms, the reproduction device may automatically scan the broadcast frequency spectrum and assemble a list of available radio stations by noting the frequency and by measuring signal strength of received signals, or a suggested list of radio stations, based on location information such as zip code, or can be compiled by a resource (such as the vendor of the reproduction device or a commercial information assembler). Information about each radio station can also be collected and stored. Such information can include: station broadcast frequency; station call letters and/or other identifiers; station format (news, type of music, location, and others).

Information about radio stations that are accessible over the local or wide area network (hereinafter web radio stations) is also acquired and stored. This information may be acquired through search engines, by commercially available listings from suppliers such as vTuner (vTuner.com), or assembled by the user. Information about web radio stations typically include a station identifier, a network address, a category (e.g. news, rock, jazz, sports, classical), and a location of origination.

The information about broadcast radio stations and web radio stations, respectively, may be organized and sorted based on any of the information types mentioned above.

In addition to reproducing sound, a networked sound system according to the invention can record, on hard disk 30 or external mass storage device 45. Recording can be done simultaneously with sound reproduction, or in the "background." Sound is recorded in units, and the units are identified and information about the units are recorded in a data base. For example, a typical recording unit is a track on a CD. The information about each unit (track) may include title, composer, artist, category (e.g. classical, rock, blues). The information may be obtained automatically or by user intervention from commercially available internet sources and/or may be entered or edited by the user. Additionally, for other types of recording units, the information may be of other types (such as for radio broadcasts a station and a time interval; for athletic events the date and participating teams; for cultural events the date, performer, composer; and others). For convenience, recorded units and assemblages of recorded units are referred to as "music files" even though the recorded units are not necessarily recordings of music.

Figure 4:
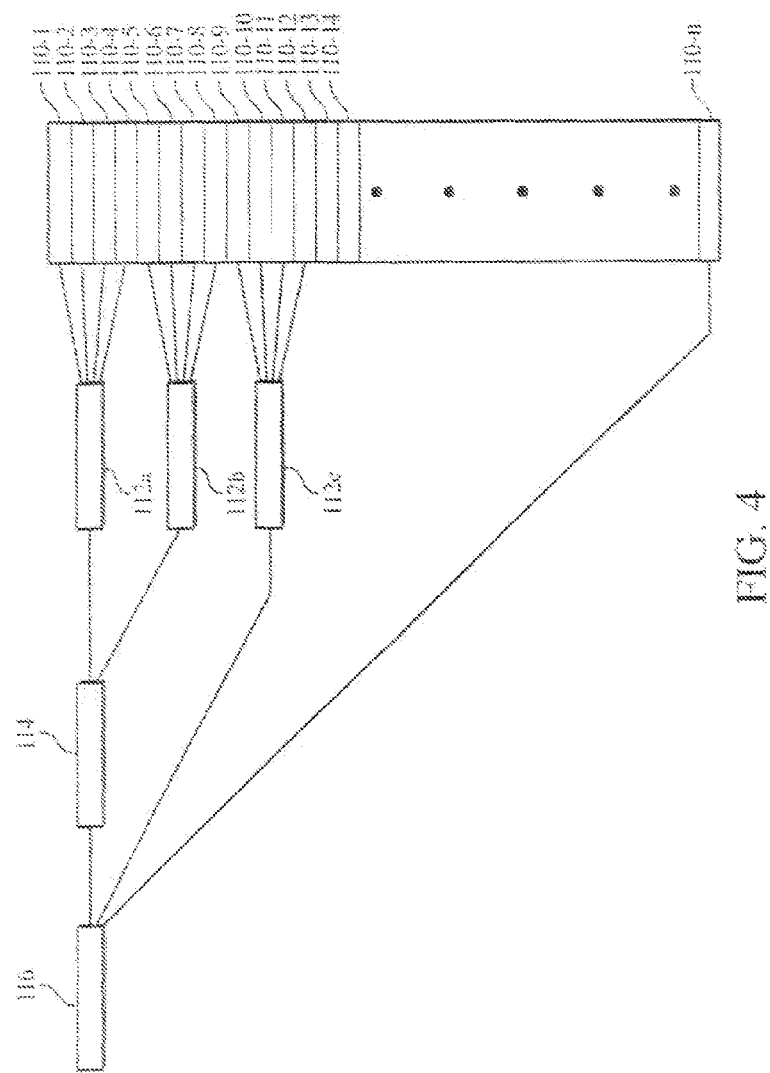
FIG. 4 is a diagram helpful in explaining the logical database relationships of recorded units and assemblages of recorded units.

Referring now to FIG. 4, there is shown a diagram that will be used to discuss the logical relationships of recorded units and assemblages of recorded units. Recorded units 110-1 through 110-n each contain data representing the recorded sound and information about the recorded sound. Information could include the artist, the composer, and the type of music. A first type of assemblage of recorded units is an "album" represented here as items 112a, 112b, 112c. Albums 112a, 112b, and 112c may also have associated with them information similar to the information about the recorded units, such as artist, composer, and type of music. Albums may include recorded units that have different composers, artists, or type of music.

A second type of assemblage includes recorded units with common identifying characteristics, sometimes referred to as common "metadata" values. "Metadata" values are typically included in file header information of music files in many popular music file formats. Metadata values may include the artist, the composer, the type of music, and others. For example, element 114 represents an assemblage that includes all albums (112a and 112b) that include a track performed by a predetermined artist and all tracks performed by that artist. Album 112b is included in the assemblage, even though it may include only one track 110-7 performed by that artist and even though that album may contain tracks that are performed by other artists. In other embodiments, the assemblage may be set up such that only tracks performed by the artist are included in the assemblage. Similarly, assemblage 114 may represent an assemblage of all recorded units written by a common composer or containing a common type of music.

For example, if an assemblage contains music files having a common composer metadata value of "Beethoven", each time the assemblage is requested, a computer database program may search all the music files for the metadata value of "Beethoven" as the composer. In this manner, each time a new music file is recorded with "Beethoven" as the composer, it is automatically added to the assemblage. In other words, this second type of assemblage may be said to be dynamically constructed.

A third type of assemblage is represented by playlist 116. In this example, playlist 116 includes artist assemblage 114, album 112c, and track 110-n.

Information about recorded units, playlists and other assemblages, broadcast radio stations, computer network accessible radio stations is stored in a data base stored in RAM 26 mass storage device 30 or external mass storage device 45. In one implementation, a record of the data base may correspond to a broadcast radio station, a web radio station, or a recorded unit. The fields of the records representing broadcast radio stations may contain information such as call letters, broadcast frequency, station format, or signal strength. The fields of record representing computer network accessible radio stations may include a identifiers, network addresses, locations, and station formats. The fields of record representing recorded units may include the metadata values as described above.

Figure 5:
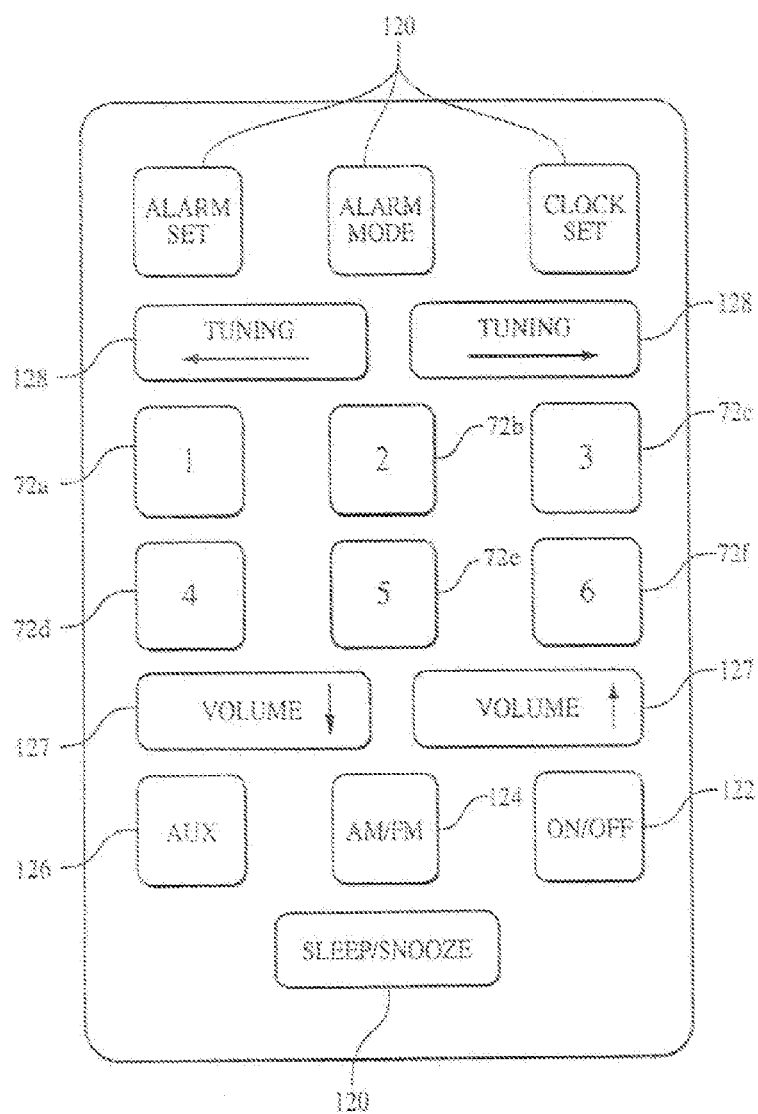
FIG. 5 is a sound reproduction device control panel according to the invention.

Referring to FIG. 5, there is shown a control panel from sound reproduction device 10. Preset buttons 72a-72f each have a broadcast frequency associated with it. When that button is depressed by the user, the control electronics circuitry causes the control electronics circuitry (of FIG. 1) to cause the tuner 12 to tune to the frequency associated with that preset button.

In addition to associating broadcast frequencies to the identifiers, a networked sound system according to the invention can assign other entities to the preset button. Other entities can include web radio network addresses, playlists; or recorded units, such as individual CD tracks, or other assemblages of recorded unit as described above.

Figure 6:
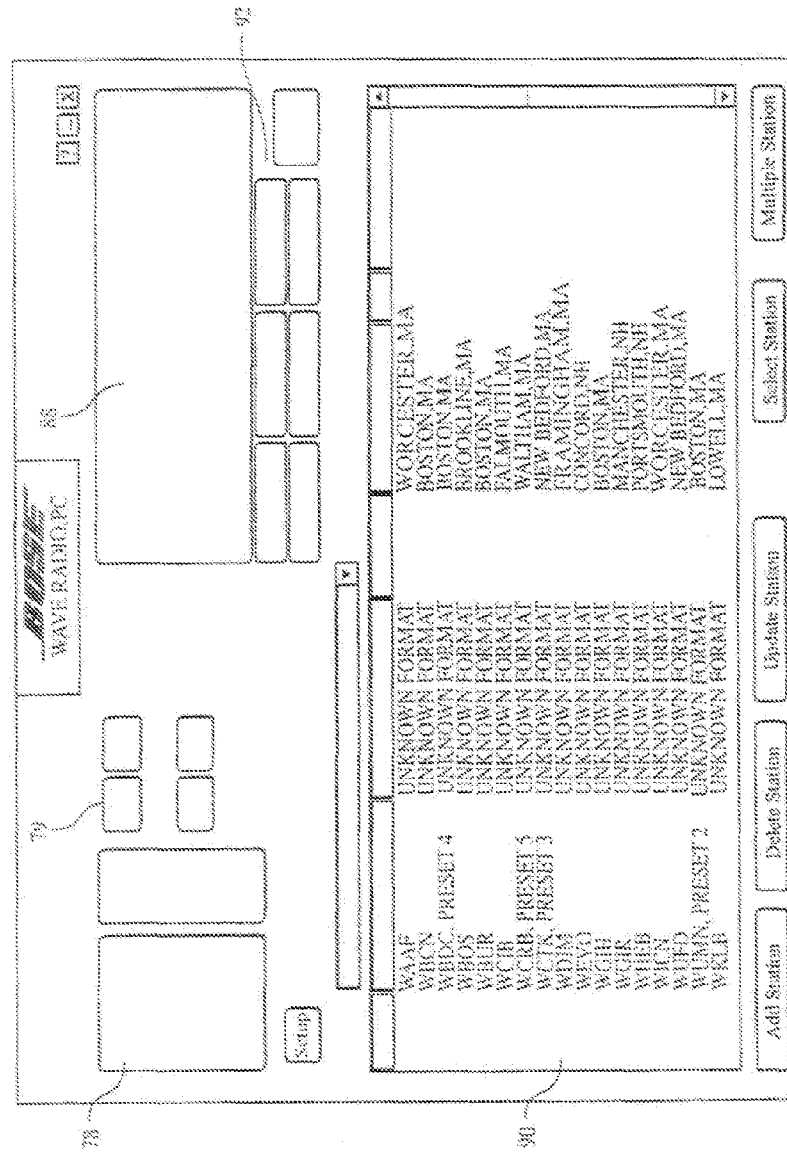
FIG. 6 is a representation of an interface screen on a computer display in accordance with the invention.

In a networked sound system according to the invention, there are at least three ways of activating the preset buttons. The buttons of FIG. 5 can be depressed; corresponding buttons on remote control device 17 can be depressed; or a graphical representation of a corresponding preset button that is caused to appear on external display 36 by a computer program may be selected by operation of mouse 40. Hereinafter, the term "preset indicator" will be used to denote the preset buttons on the control panel (FIG. 5), the preset buttons on the remote control device (FIG. 8), or the graphical representation of the preset buttons on the display (FIG. 6). In one embodiment, there is a one to one correspondence between the preset buttons on the control panel of the sound reproduction device, the preset buttons on remote control device 17, and the graphical representation of preset buttons appearing on external display 36. Activating a preset button on control panel of FIG. 5, the corresponding preset button on remote control device 17, or the graphical representation of the preset button on external display 36 causes the same entity to be selected. For each different source, a different entity may be assigned to each preset button, as will be described below. There may also be multiple sets of values to a single set of presets being used with a single source as discussed above. For example, there may be multiple sets of FM and/or AM radio stations.

A common user interface screen is caused to appear on external display, with some of the portions of the screen having different identifying legends. Referring to FIG. 6, there is shown a user interface screen. Source selection region 78 has graphical regions enabling the user to select the audio signal source. In this implementation, a CD, AM broadcast radio, FM broadcast radio, Web Radio, and Music Files (e.g. recorded units) can be selected. In current selection region 88, information about the selection currently displayed is shown. In available selections region 90, information about the available selections is shown. In preset section 92, six graphical figures, corresponding to the six preset buttons shown in FIG. 6 are displayed. "Tune" graphical FIGS. 79 are discussed below in the discussion of FIG. 8.

The information displayed in the available selections region 90 may be ordered based on any of the metadata values. For example, the list of FM stations of FIG. 6 can be ordered in by station ID as shown, or could be ordered by broadcast frequency, or by category (station format). Ordering the list of stations in different manners enables the user to more easily select the music to be reproduced from the list of available selections, especially if the number of available selections is large. For example, if the user has selected "web radio" as the source, there may be hundreds of entries displayed in the available selections region. If the user wants to listen to a particular type of music, for example jazz, the user can order the list of available web radio stations by station format, and scroll through the list and listen to web radio stations until a suitable station is found. Scrolling through the list can be done by using the arrow keys on the computer keyboard, the "tuning" buttons 128 (FIG. 5) on the control panel, or the corresponding buttons 147 (FIG. 8) on the remote control device.

The entities that can be assigned to the preset buttons are dependent on the audio source selected by activating the appropriate graphical figure in the source selection region 78. If the CD source has been activated, the preset buttons are not active. If the AM broadcast or FM broadcast graphical figure have been activated, broadcast frequencies in the AM and FM broadcast bands, respectively, can be assigned to the preset buttons. For convenience and ease of identification, the call letters may also be displayed on the graphical representation. If the web radio audio source has been activated, a URL of a web radio website are assigned to the preset buttons. For ease of identification, the name, or other identification about the website is typically displayed on the preset buttons.

If the music files audio source has been selected, any assemblage, as discussed above, of recorded units can be assigned to a preset buttons. For combinations of recorded units, a play mode may also be assigned to the preset button. "Play modes" may include sequential, in which the recorded units are played in the order they appear in the database (typically, for example, for an album, this means in the order the individual "cuts" appear on the album), "shuffle" or "random," in which the recorded units are played in a random order, and "repeat" either single cuts or a sequence of cuts.

Figure 7:
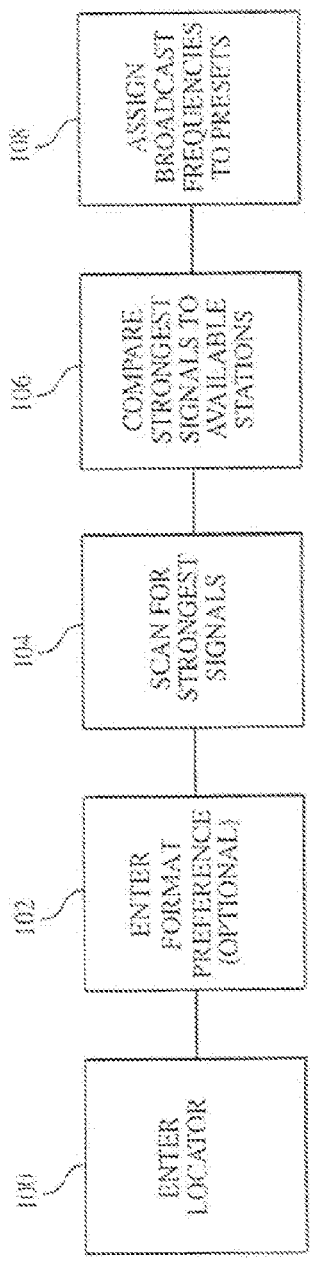
FIG. 7 is a flow diagram for assigning broadcast radio frequencies to the preset buttons according to the invention.

In one embodiment, initial preset assignment of broadcast radio stations is done automatically. Referring to FIG. 7, there is shown a flow diagram of a process for automatically initial preset assignment by a computer program running on computer system 20. In step 100, a locator is entered, for example, by a user entering a "zip code" using keyboard 44. In optional step 102, the user enters radio format preference or preferences (i.e. such as news, talk, type of music as discussed above). At step 104, the computer program directs AM/FM tuner 12 to scan the applicable broadcast frequency band for strong signals. At step 106, the strongest signals are compared to available stations based on the locator and information about available radio stations, as discussed above in the discussion of audio system mode operation. At step 108, the broadcast frequencies of the strongest signals are assigned by the computer program to the presets. If format preferences have been entered at optional step 102, the strongest signals for each of the selected formats may be assigned to the presets. The number of presets for each format is dependent on the number of presets available and the number of formats selected. For example, if the user has selected two formats and there are six presets available, the broadcast frequencies of the strongest three signals in each format are assigned to presets. If optional step 102 has not been performed, stations may be assigned to presets in other ways; for example, the strongest signal of each of the formats may be assigned to a preset, or the strongest signals, irrespective of format may be assigned to preset.

A user can enter control signals or data for controlling the operation of the sound system through three data/control input systems. A first input system includes the input devices of computer system 20, including mouse 40, keyboard 44, and external display 36. A second input system includes the buttons of control panel (FIG. 5) of sound reproduction device 10 of FIG. 1. A third input system includes the remote control device 17 of FIG. 1, shown in more detail in FIG. 8. In one implementation, different subsets of control signals and data input can be entered through each of the input systems. In this implementation the control panel (FIG. 5) has input buttons for the following control/data functions: four buttons 120 for entering control signals and data for various clock-radio functions of sound reproduction device 10; a sound reproduction device on/off switch 122; a broadcast band selector button 124; an aux input selector 126; volume control buttons 127; two tuning buttons 128; and preset buttons 72a-72f, discussed above. Remote control device (FIG. 8) has input buttons for the following control/data functions: sound reproduction device on/off switch 130; volume control buttons 134; broadcast band selector button 136; PC signal source selector buttons 138, preset selector buttons 140a-140f, CD player pause button 141; and five "overloaded" or multi-use buttons. Button 142 activates the "snooze" feature if the sound reproduction device has been turned on to a broadcast radio station by the alarm, or mutes or unmutes the sound reproduction device if the sound reproduction device has been turned on any other way. Button 144 turn off the alarm if the clock radio alarm feature of the sound reproduction device is sounding, or stops the CD player 28. Track/tune button 147 is discussed in more detail below.

Equivalent control signals that can be entered from more than one of the three input systems have the same effect, regardless of which input system was used to enter the data or control signal. For example, if the sound source is FM broadcast radio, and preset button 1 is activated, the audio system tunes to the broadcast frequency represented by preset button 1, regardless of whether the preset button was activated by pressing preset button 72a on the control panel, pressing preset button 140a, on remote control device 17, or by selecting preset icon 150a on the user interface screen (FIG. 6) shown on display 36 (FIG. 1). Additionally, if the data or control signal is entered through remote control device 17 or through the sound reproduction device control panel (FIG. 5), a visible indication is displayed on the user interface screen (FIG. 6). For example, if preset button 140a (preset button 1) is pressed on remote control device 17, a visible indication appears on user interface screen (FIG. 6) shown on display 36.

The effect of the control signal may depend on the source of the audio signals. For example, if the source of the audio signals is the AM/FM tuner 12 (FIGS. 1 and 2), selecting the "tuning" buttons 128 (FIG. 5) on the control panel, or the corresponding buttons 147 (FIG. 8) on the remote control device, or the corresponding graphical FIGS. 79 (FIG. 6) causes the tuning frequency of the AM/FM tuner to change. If the source is music files, the names of the music files may appear in the available selections region 90 (FIG. 6) of the interface screen, and selecting of the tuning buttons on the control panel or the equivalent control buttons on remote control device or the equivalent graphical figure on the display screen may cause the display to change the highlighted music file. If the source is web radio stations, the available web radio stations my appear in the available selections region 90 (FIG. 6) of the interface screen, and selecting of the tuning buttons on the control panel or the equivalent control buttons on remote control device or the equivalent graphical figure on the display screen may cause the display to change the highlighted web radio station.

In the event that the control electronics circuitry 16 (FIG. 1) of the sound reproduction device receives from remote control device 17 a remote control signal that control electronics circuitry 16 cannot decode, the control electronics circuitry retransmits the remote control signal to computer system 20 for decoding.

For ease of selecting individual sources, in one embodiment, in addition to specifying a category (such as music files, broadcast radio stations, computer network accessible radio stations, music files, and CD) of sources, the user may select from a subset of all the sources in a category. For example, if the user has selected broadcast FM, broadcast AM, or network accessible radio as the source category, the user may choose to select an individual radio station from a subset of all available radio stations, the subset including only radio stations having a particular format, such as news; or if the user has selected music files as the source category the user may choose to select a file from a subset of all available files, the subset including only music of a certain type, such as jazz.

Figure 8:
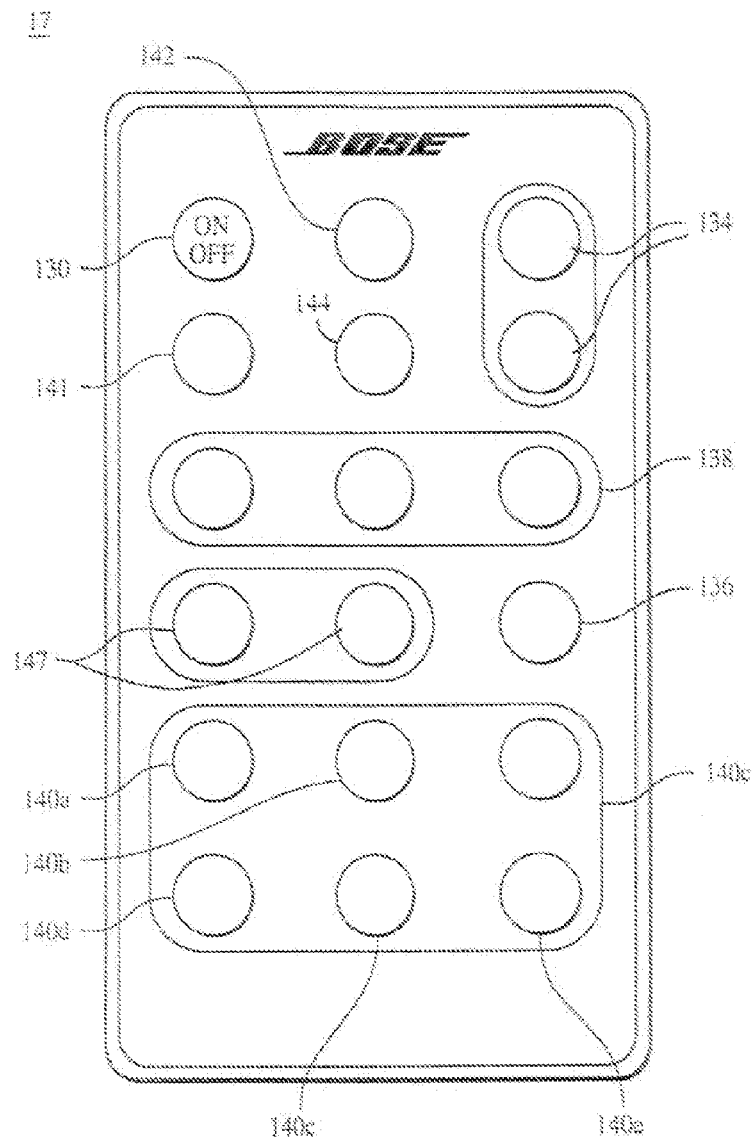
FIG. 8 shows the buttons on the remote control device.

This may be conveniently done using the available selections region 90 (FIG. 6) and the various control input devices, including keyboard 44 or mouse 40 (FIGS. 1 and 2) radio control panel (FIG. 5), or the remote control device 17 (FIGS. 1, 2, and 8). The computer program running on computer 20 may provide for the user to enter a preferred subset category, or alternatively, may allow the user to sort, order or filter the entries in the available selections region. The input devices may then be used to highlight and select entries in the available selections region 90. In one embodiment, the tuning keys 128 of the control panel (FIG. 5), or the corresponding buttons 147 on remote control 17 are used to highlight and select entries in the available selections region. In this embodiment, pressing the tuning key 128 or 147 highlights the next entry in the available selections region 90. The tuning keys may also be used in the above manner even if the interface screen (FIG. 6) is not visible on the display, as may happen if the interface screen has been minimized or if the view of the interface screen is obscured by a graphical display generated by a software program. This aspect of the invention may also be used in audio systems which have no display associated with them.

In another embodiment, when the source category is broadcast radio, tuning keys 128 of the control panel (FIG. 5) and the corresponding buttons 147 on remote control 17 are used in the conventional manner, that is, to change the tuning frequency of AM/FM tuner 12.

Figure 9:
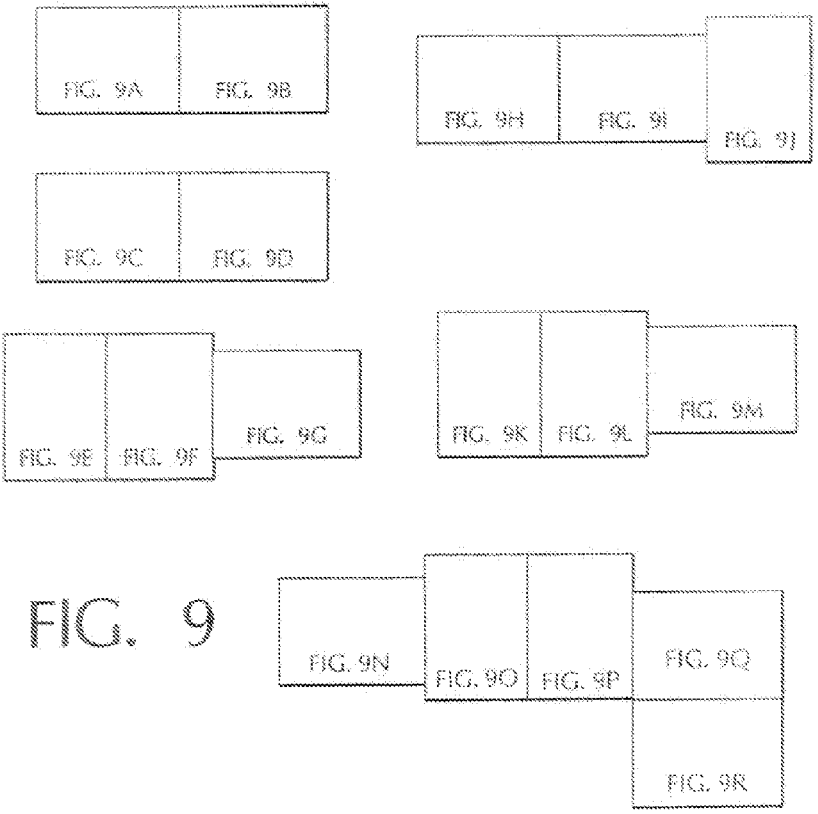
FIG. 9 shows the relations among
Figure 10:
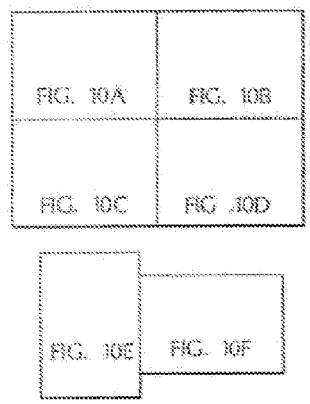
FIG. 10 shows the relationship among
Figure 9A:
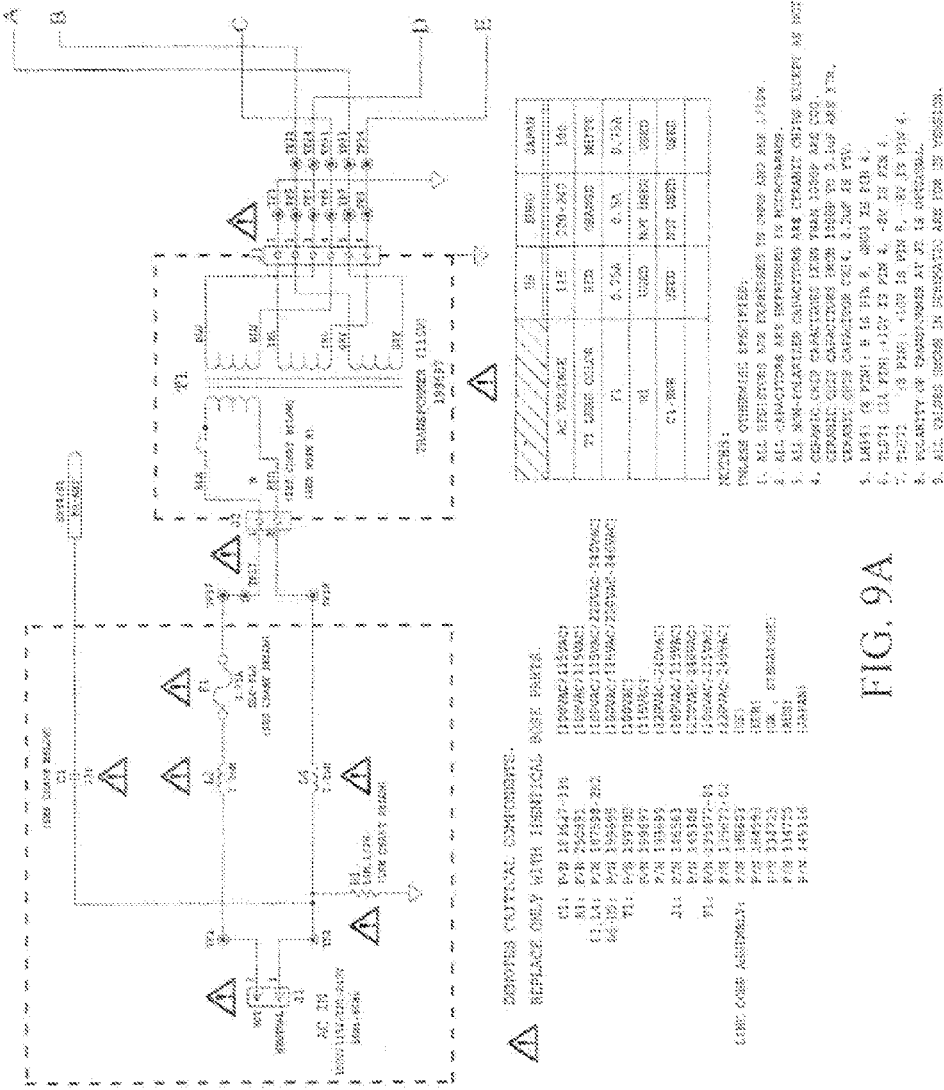
FIGS. 9A-9R and FIGS. 9A-9R are schematic circuit diagrams of circuitry in a radio that implement elements 12, 14 and 16 of the system of FIG. 2.
Figure 9B:
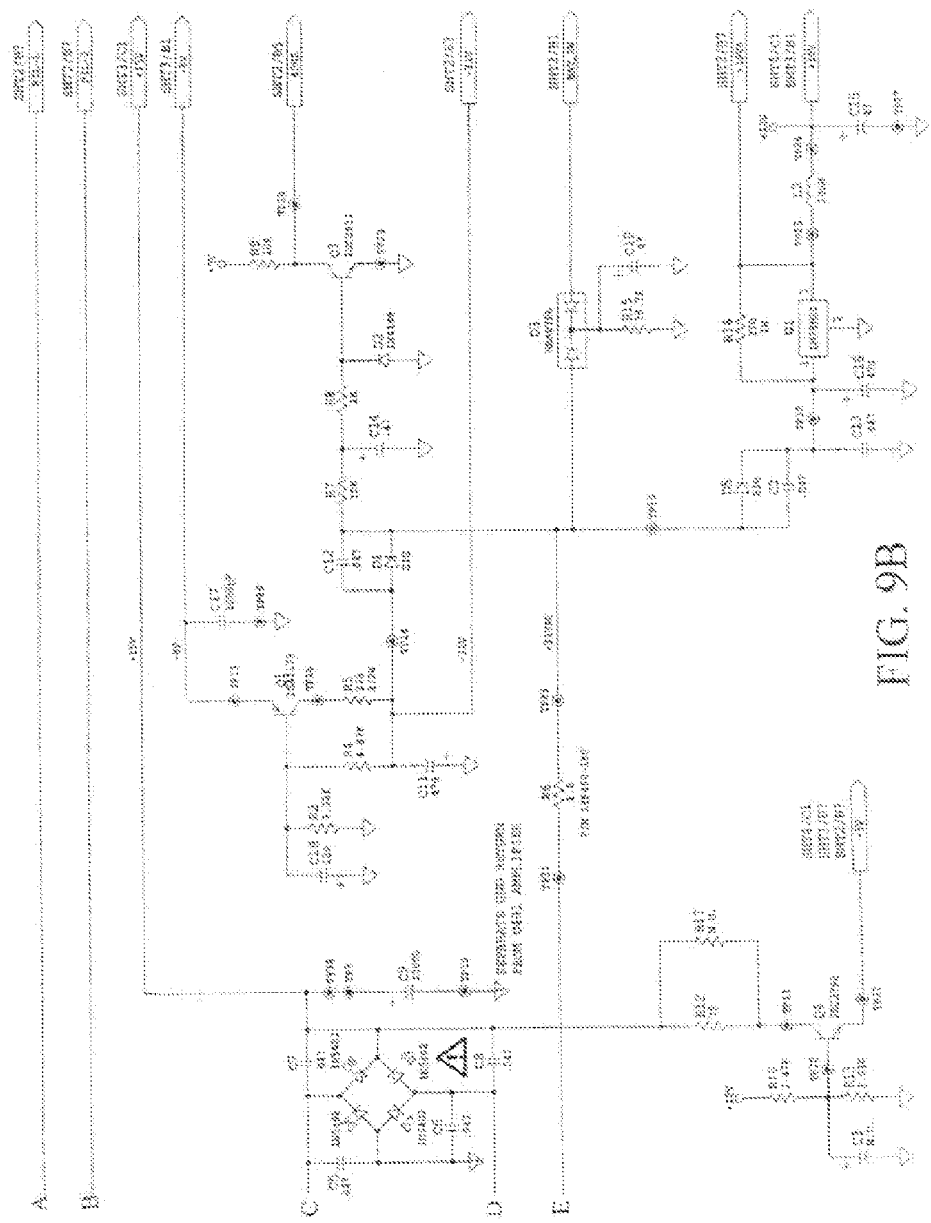
Figure 9E:
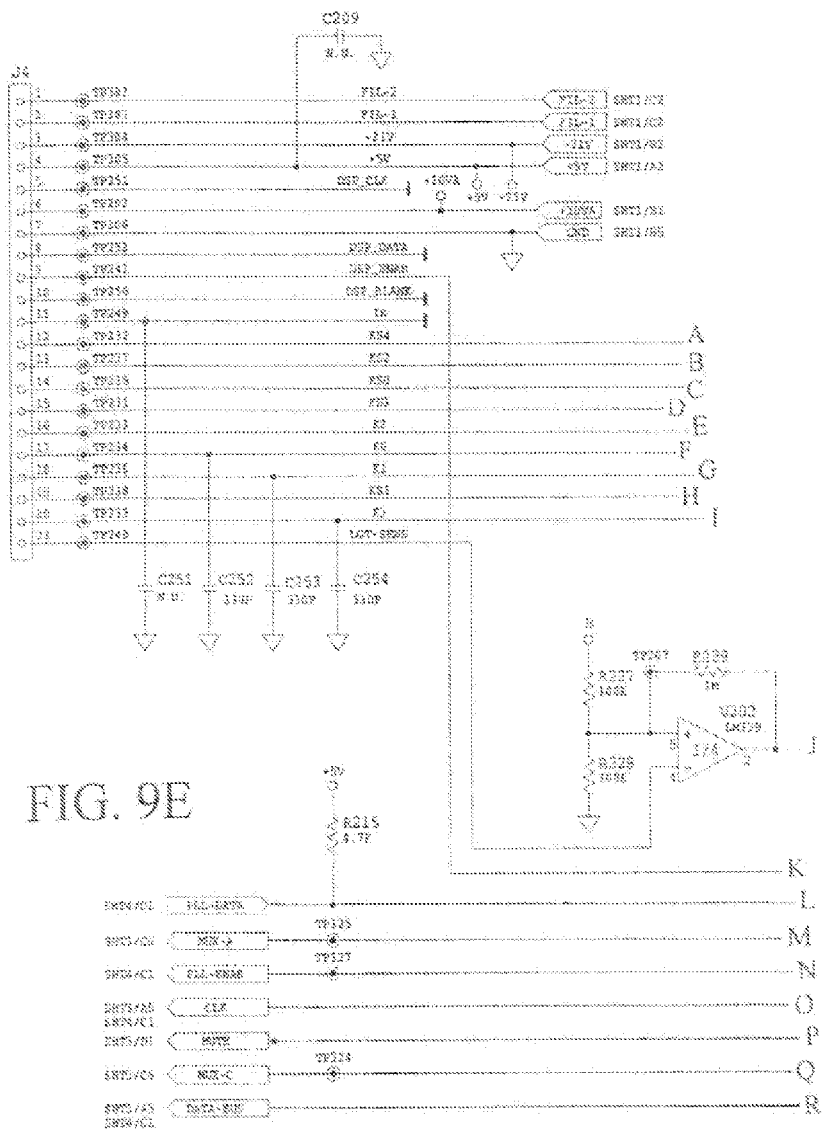
Figure 9F:
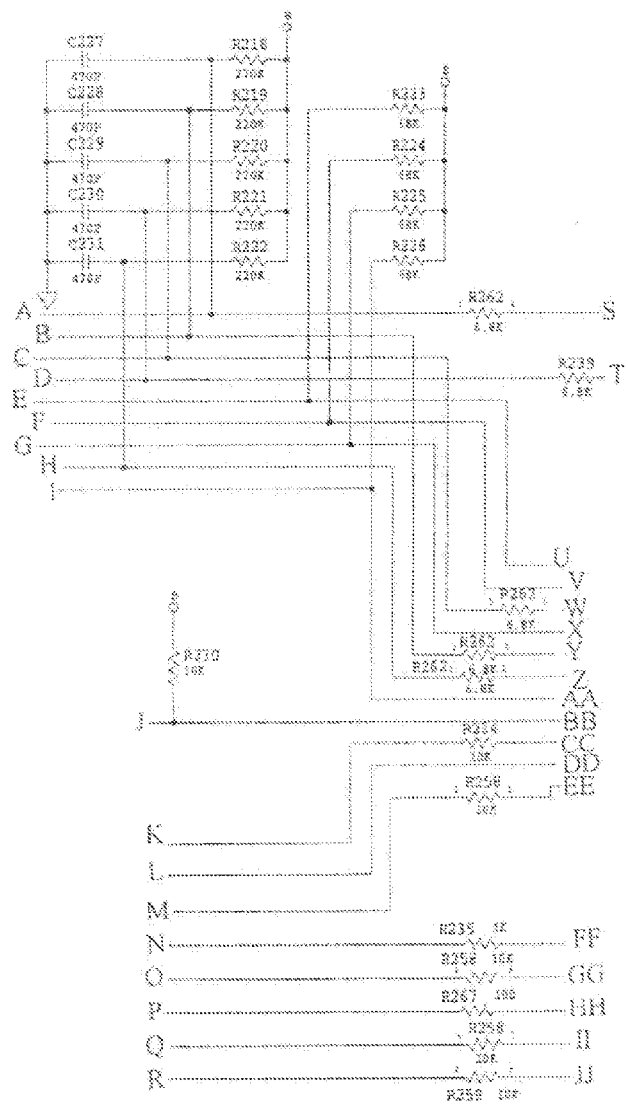
Figure 9G:
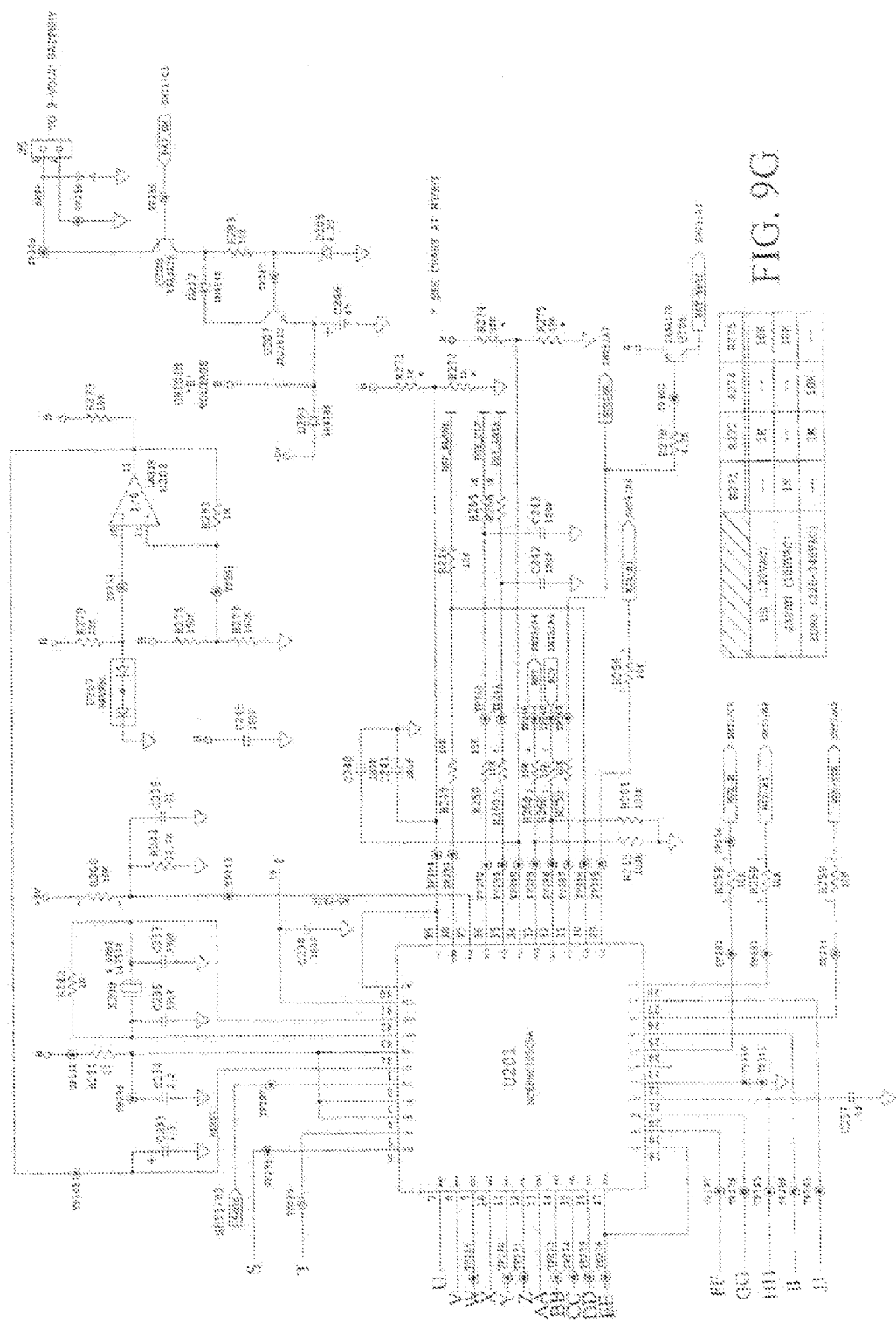
Figure 9I:
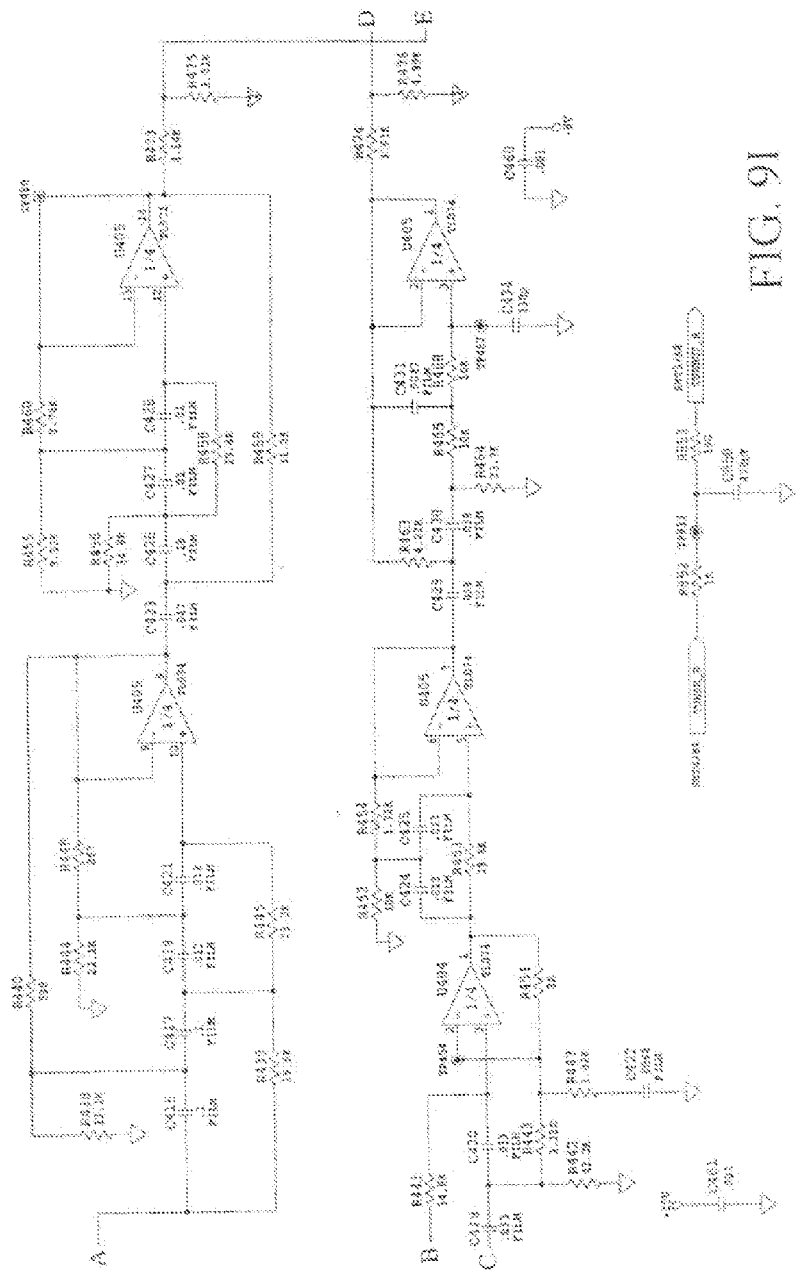
Figure 9J:
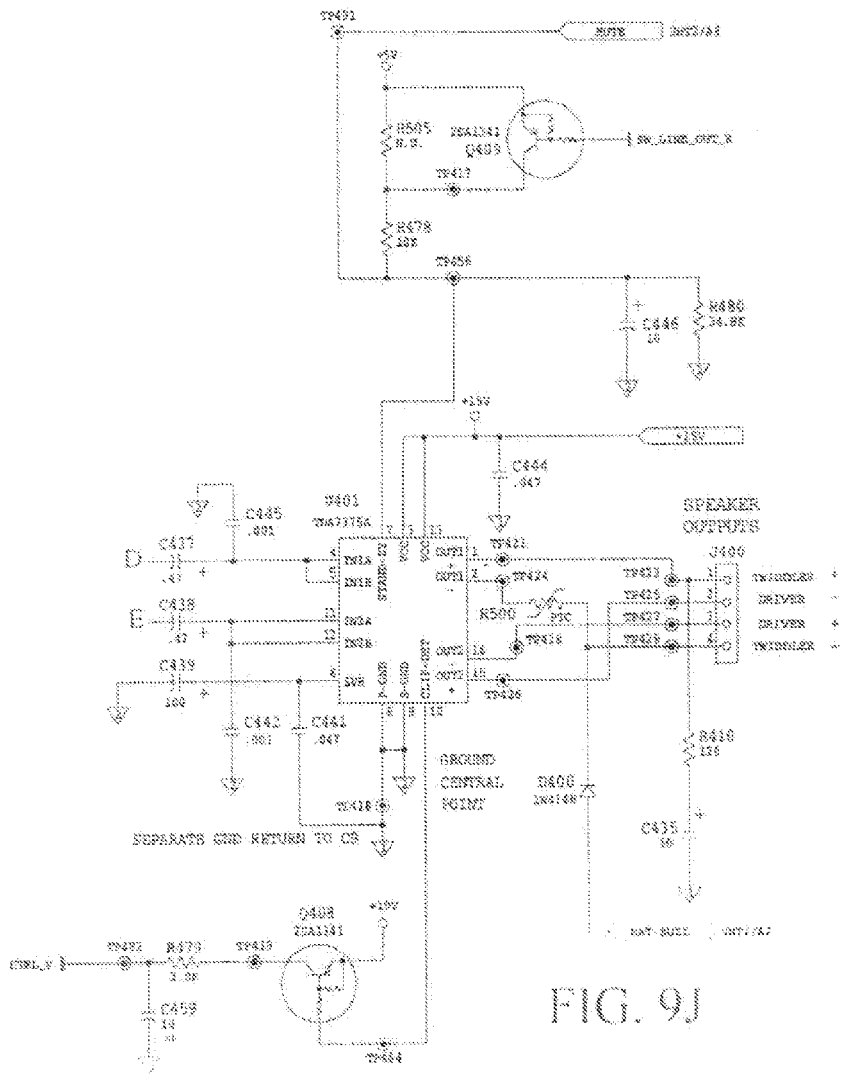
Figure 9K:
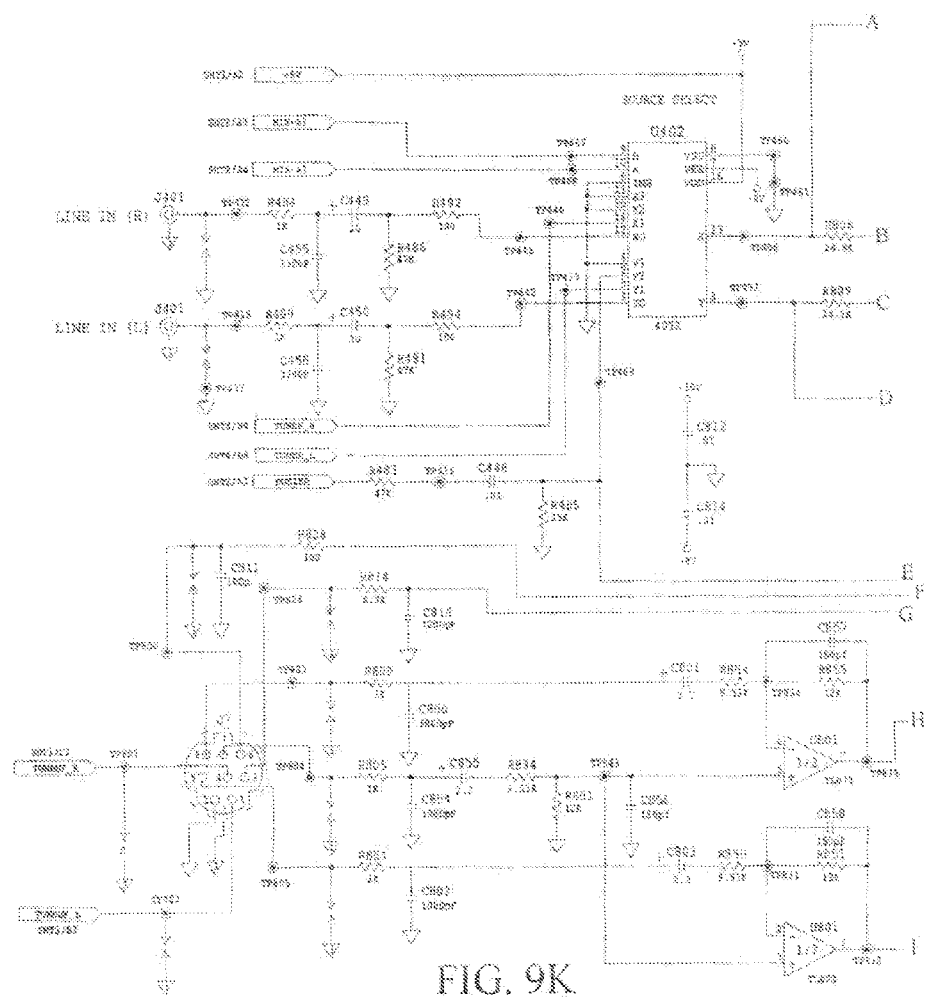
Figure 9L:
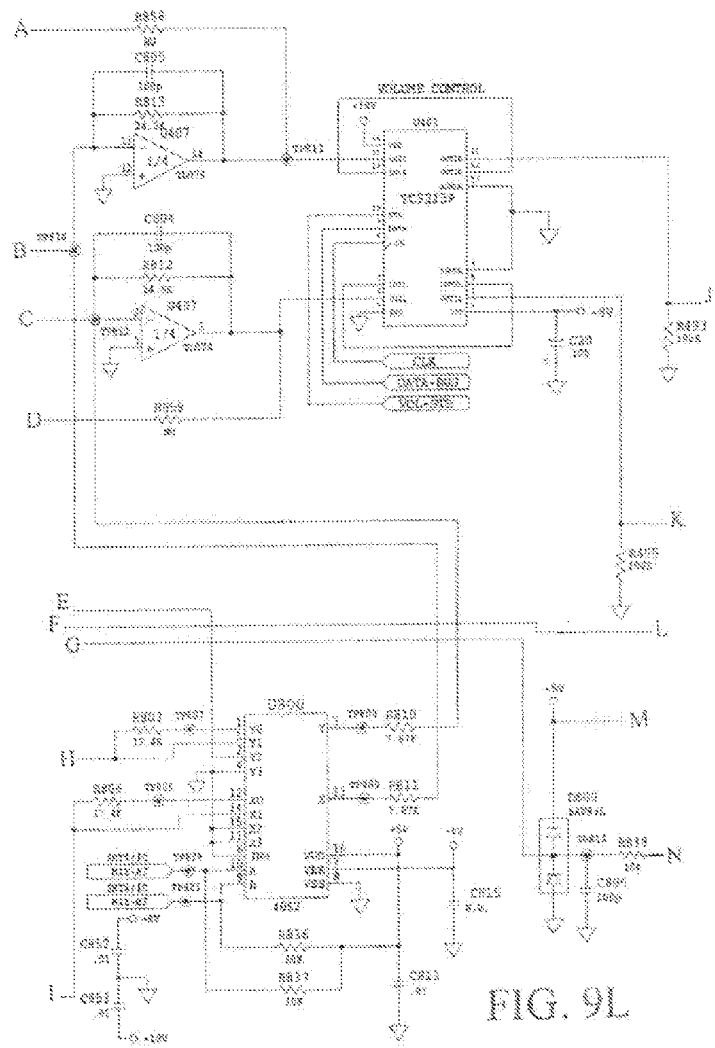
Figure 9M:
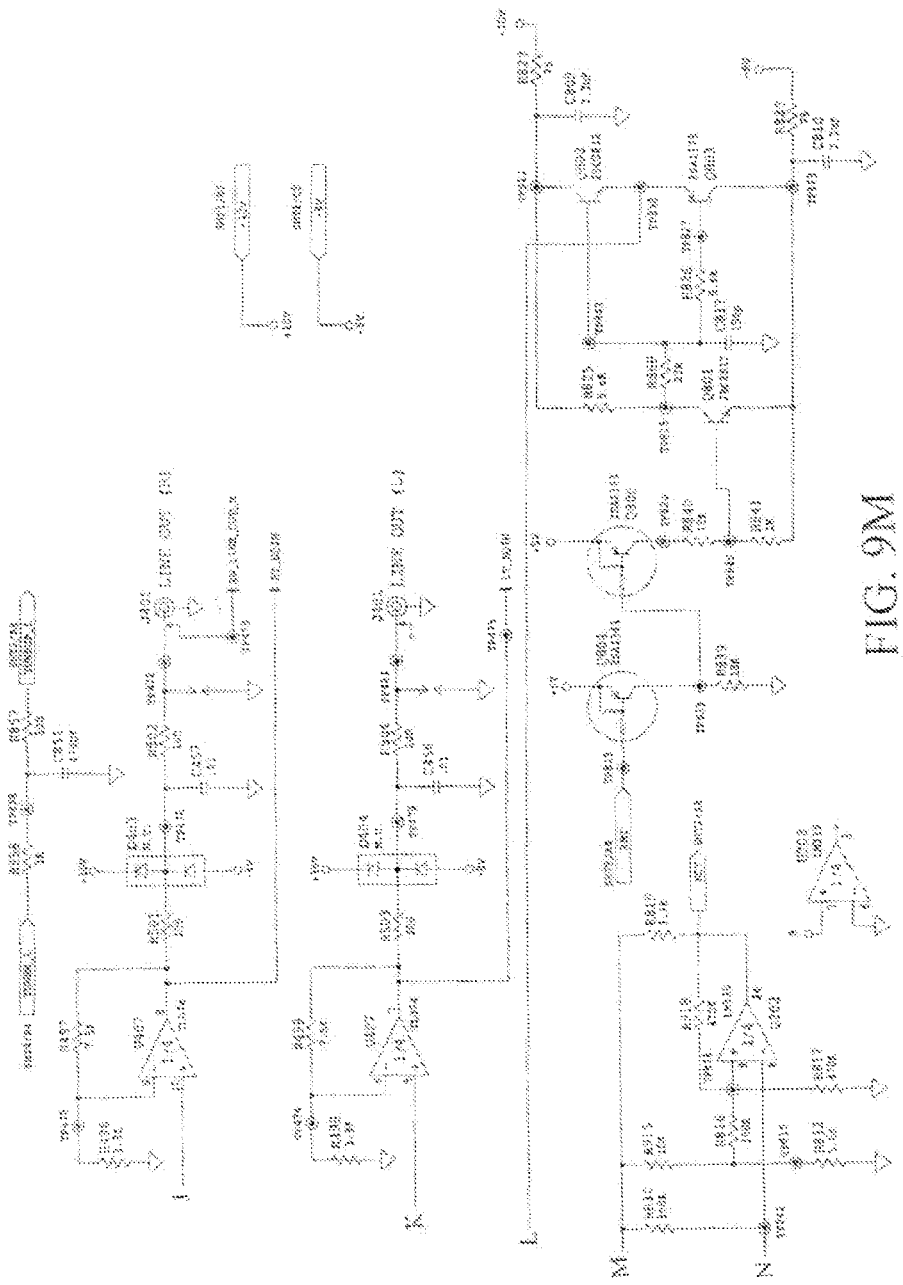
Figure 9N:
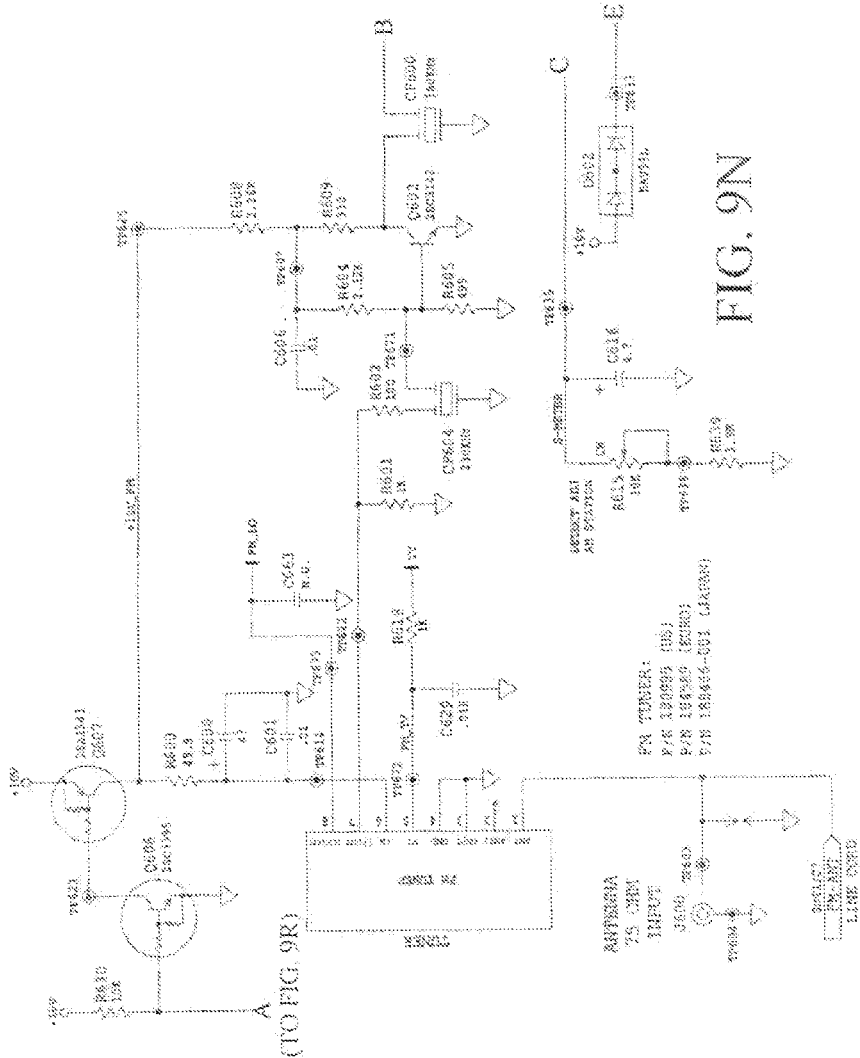
Figure 9O:
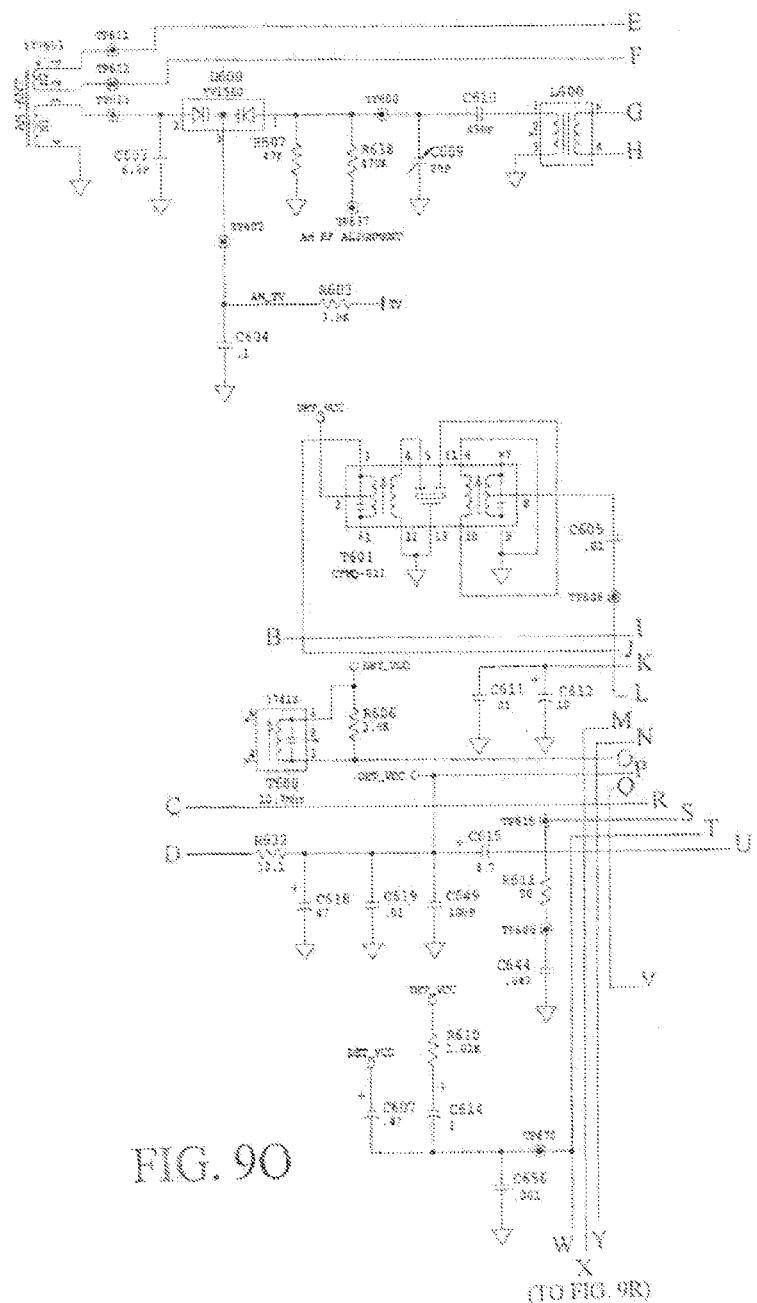
Figure 9P:
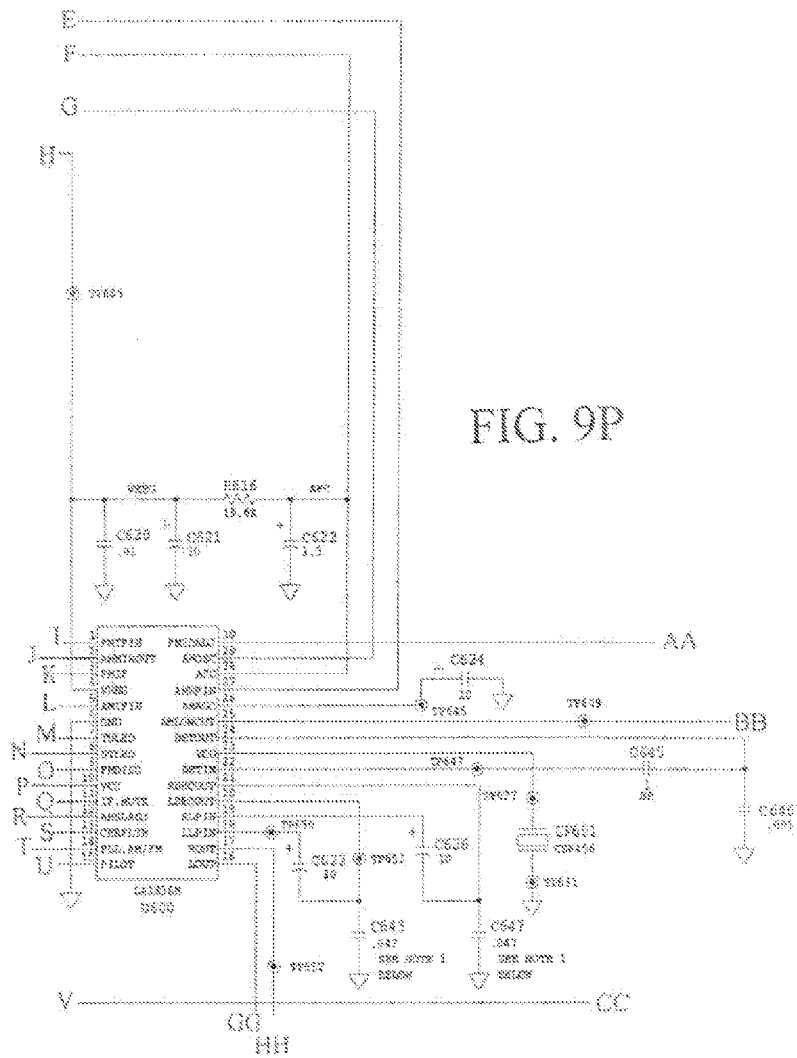
Figure 9Q:
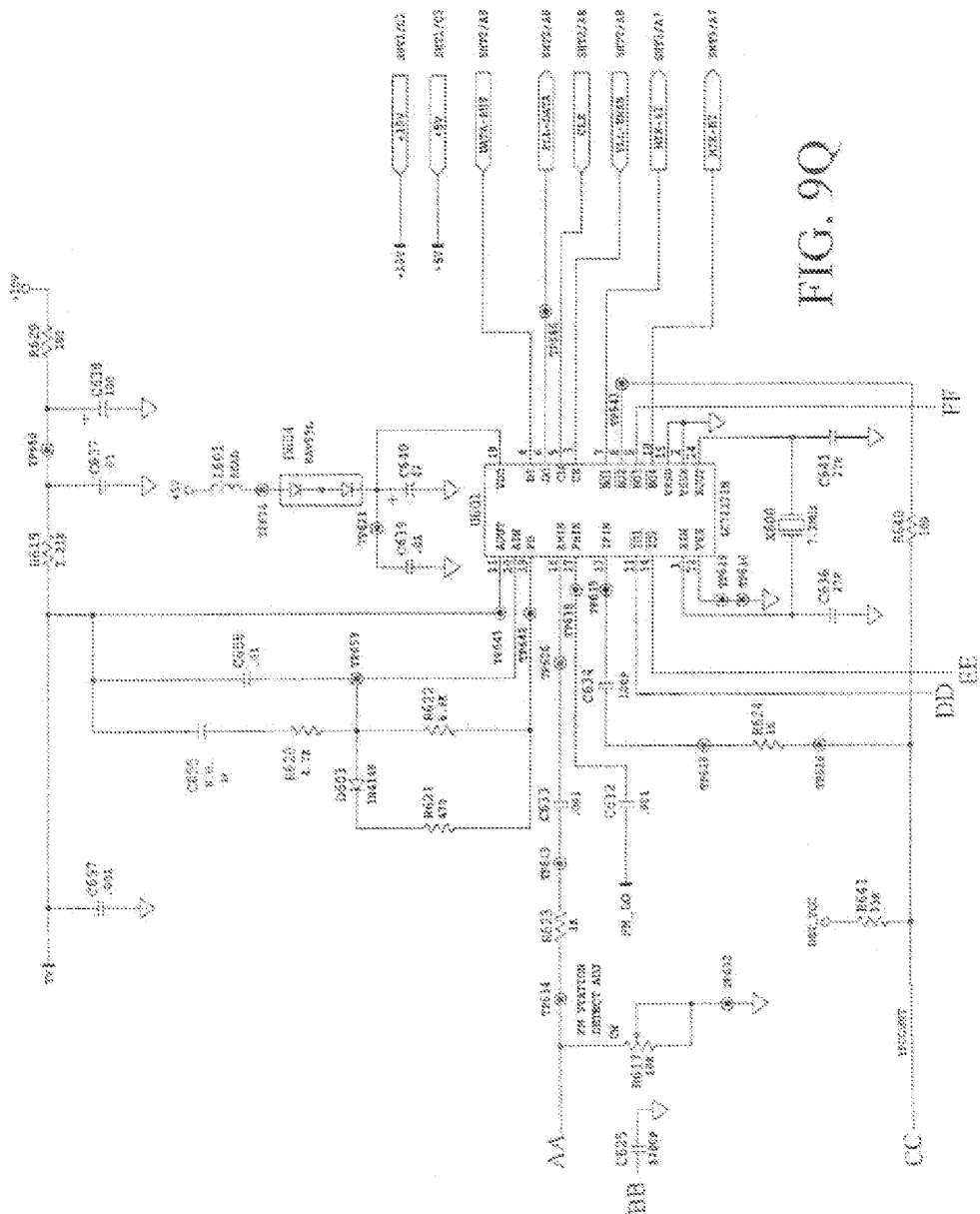
Figure 10A:
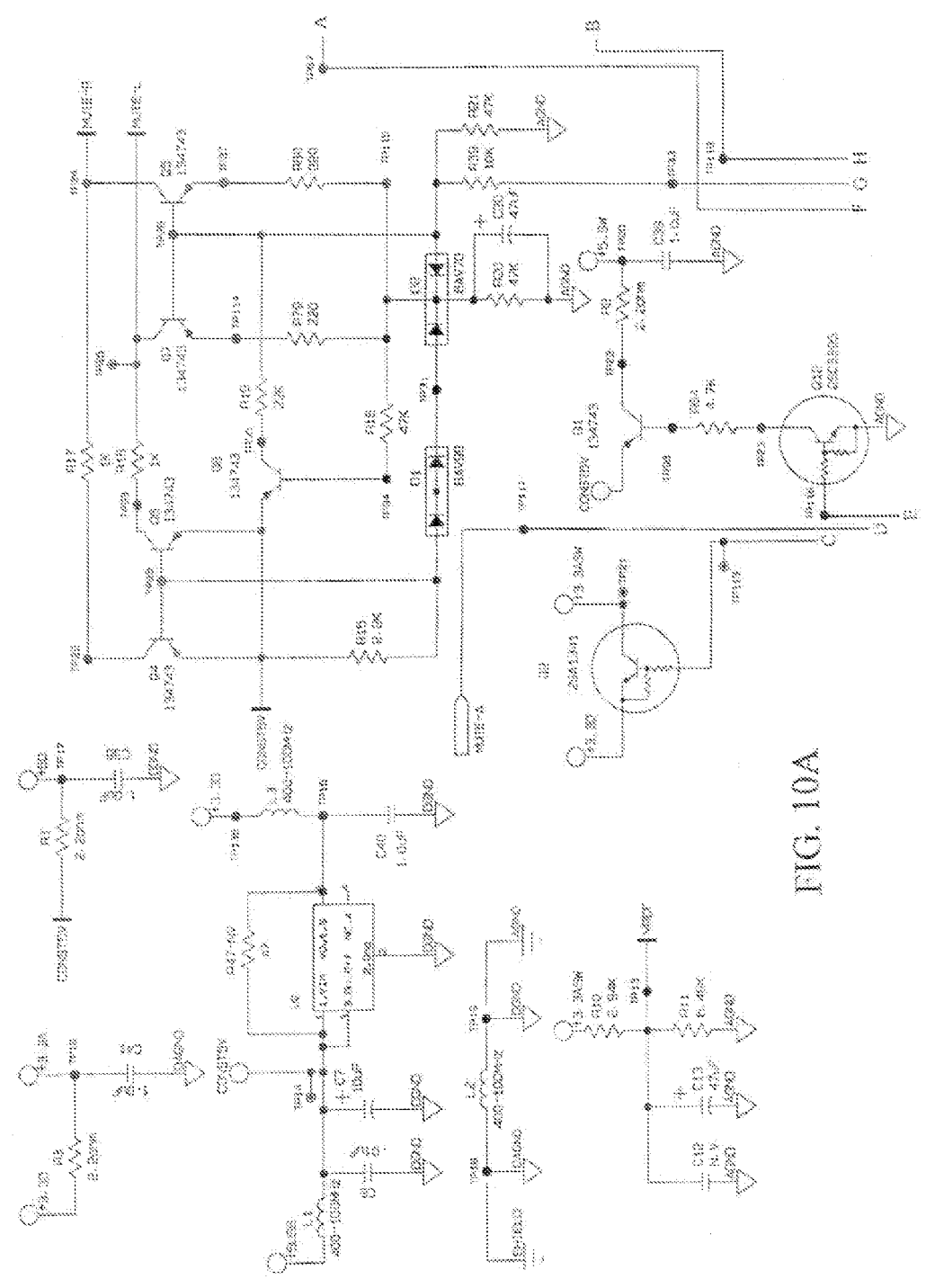
Figure 10B:
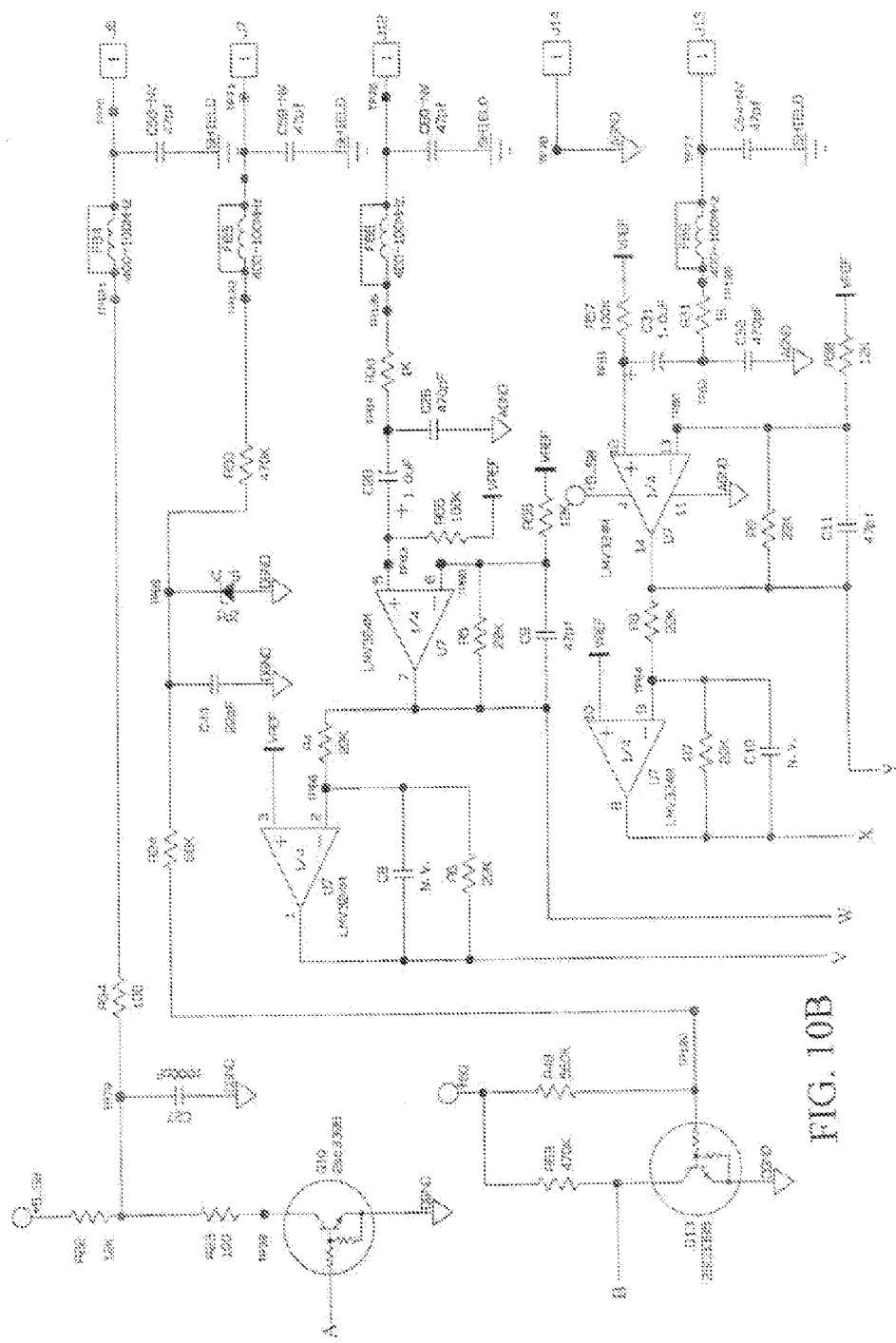
Figure 10C:
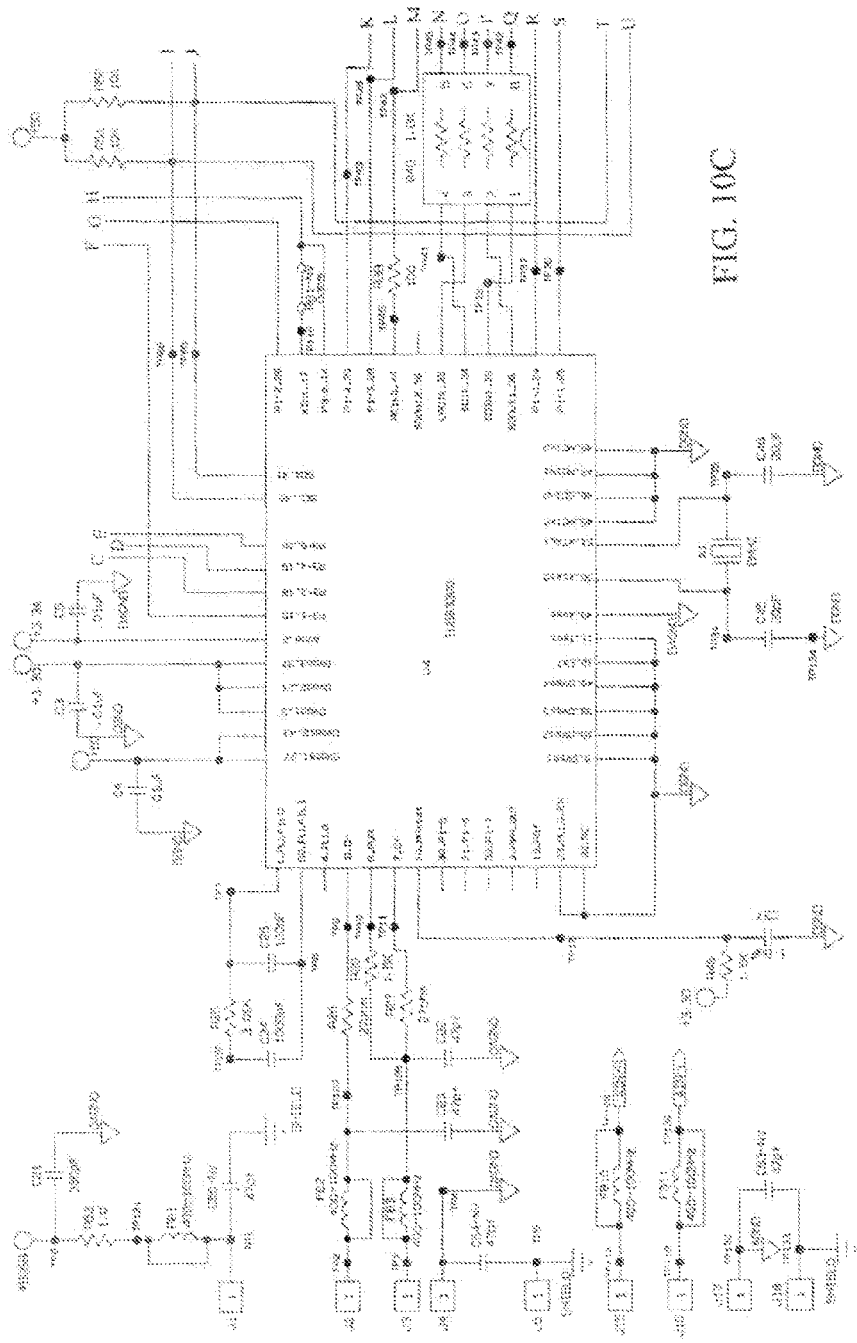
Figure 10D:
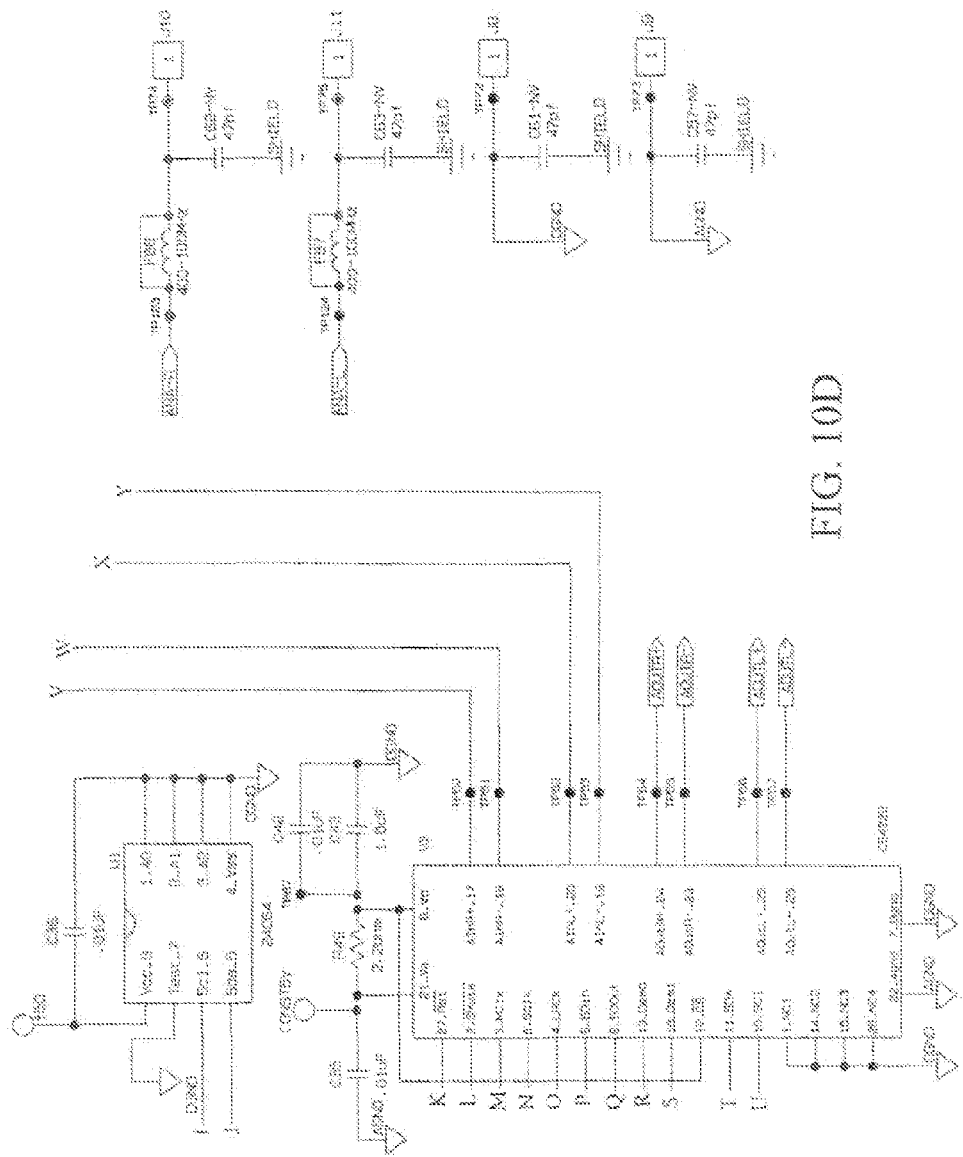
Figure 10E:
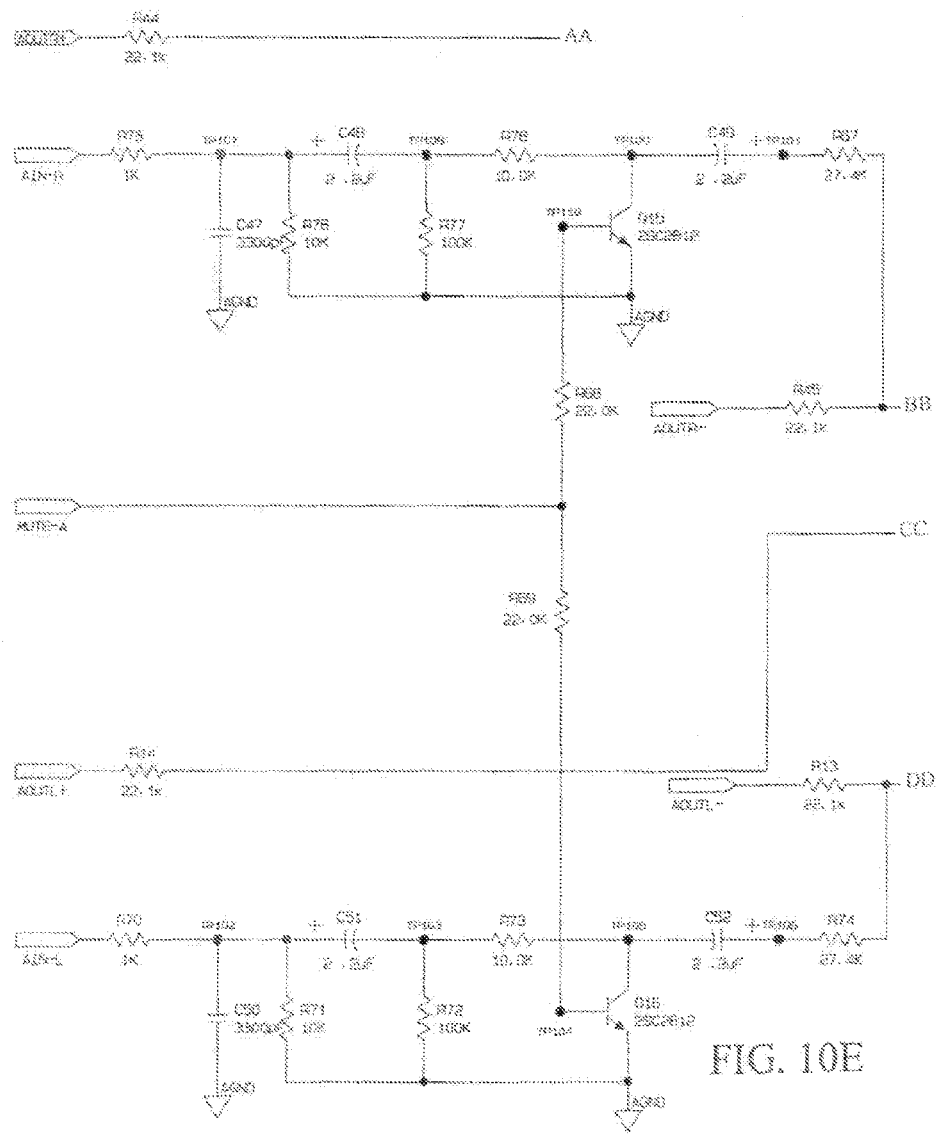
Figure 10F:
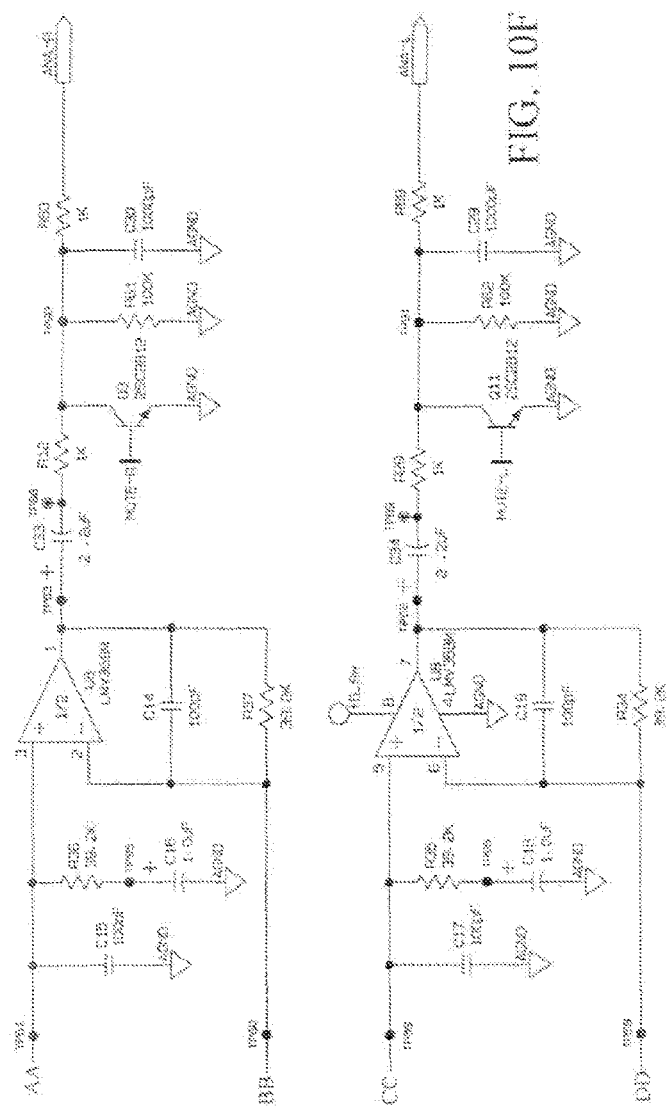

FIGS. 9A-9R are schematic circuit diagrams of circuitry in a radio in an exemplary embodiment of the invention implementing AM-FM tuner 16, audio signal processing circuit 14 and control electronic circuitry 16 in the system of FIG. 2. FIGS. 10A-10F show a schematic circuit diagram of an exemplary embodiment of interface unit 54.

There is enclosed a CD-ROM that may be inserted into the D drive of a personal computer in an exemplary embodiment of the invention.

It is evident that those skilled in the art may make numerous modifications of and departures from the specific apparatus and techniques disclosed herein without departing from the invention concepts. Consequently, the invention is to be construed as limited only by the spirit and scope of the appended claims.

What is claimed is:

1. An audio system configured to connect to a separate computer that is configured to provide audio information from any one of a plurality of sources, including digital music files stored on the computer and a network accessible by the computer, the audio system comprising:

(A) a sound reproduction device comprising: a housing; one or more speakers located at least partially within the housing;

an amplifier located within the housing for powering the one or more speakers; control circuitry located within the housing; and a connector located at least partially within the housing that is configured to provide a physical and electrical connection exclusively between the sound reproduction device and the computer, wherein the connection includes one or more signal paths configured to (i) receive audio information from the computer corresponding to the digital music files stored on the computer and audio information from the network via the computer, and (ii) transmit to the computer signals for controlling the computer; and (B) a remote control device configured to transmit signals representing at least a first type of command from a user and a second type of command from a user to the sound reproduction device, wherein the first type of command is a command to control a user function of the sound reproduction device and the second type of command is a command to control a user function of the computer, wherein the control circuitry is configured to receive the signals from the remote control and, in response to receiving such signals:

(i) control the user function of the sound reproduction device when the user issues a command of the first type, and (ii) transmit to the computer, via a signal path of the connector, a signal for controlling the user function of the computer when the user issues a command of the second type.

2. The audio system of claim 1, wherein the connector comprises a dedicated cable.

3. The audio system of claim 1, wherein the connector is configured to couple to the computer in close proximity to said sound reproduction device.

4. The audio system of claim 1, wherein the connector is configured to couple to the computer adjacent to said sound reproduction device.

5. The audio system of claim 1 further comprising an AM/FM radio tuner located at least partially within the housing.

6. The audio system of claim 5 further comprising an alarm clock located at least partially within the housing.

7. The audio system of claim 1 wherein the signal representing the second type of command configured to be transmitted by the remote control device corresponds to a subset of commands that the computer is capable of receiving.

8. The audio system of claim 1, wherein the remote control is configured to transmit a signal representing a command selected from the group consisting of commands for controlling the volume of the sound reproduction device, controlling the power setting of the sound reproduction device, and muting the sound of the sound reproduction device.

9. The audio system of claim 5, wherein the remote control is configured to transmit a signal representing a command for selecting the AM/FM radio tuner as the audio source for the sound reproduction device.

10. The audio system of claim 1, wherein the remote control is configured to transmit a signal representing a command for selecting the computer as the audio source for the sound reproduction device.

11. The audio system of claim 1, wherein the remote control is configured to transmit a signal representing a command selected from the group consisting of commands for causing the computer to play a music file, causing the computer to pause the play of a music file, causing the computer to select a playlist, causing the computer to select the next or previous music file, causing the computer device to select an assemblage of music files based on a first type of metadata included in the music files, causing the computer to repeat the play of a music file, and causing the computer to shuffle the play of selected music files.

12. The audio system of claim 11, wherein the remote control is configured to transmit a signal representing a command for causing the computer to select an assemblage of music files based on a first type of metadata included in the music files, and the assemblage is based on information about the music genre.

13. The audio system of claim 11, wherein the remote control is configured to transmit a signal representing a command for causing the computer to select an assemblage of music files based on a first type of metadata included in the music files.

14. The audio system of claim 13, wherein the assemblage is based on information about the music artist.

15. The audio system of claim 13, wherein the assemblage is based on information about the album associated with the music files.

16. The audio system of claim 13, wherein the remote control is further configured to transmit a signal representing a command for causing the computer to select a subset of the assemblage of music files based on a second type of metadata included in the music files.

17. The audio system of claim 16, wherein the assemblage is based on information about the music genre, and the subset is based on information about the music artist.

18. The audio system of claim 1, wherein the audio information is in digital form.

19. The audio system of claim 1, wherein the audio information is in analog form.

20. The audio system of claim 5 wherein the sound reproduction device is configured to operate in at least two modes:
   a first mode wherein the sound reproduction device produces audible sound from audio information received from the computer via the connector; and
   a second mode wherein the sound reproduction device produces audible sound from the AM/FM radio tuner.

21. The audio system of claim 20 further comprising one or more control buttons on the housing, wherein at least one of the control buttons is configured to control a user function of the computer via the connector when the sound reproduction device is operating in the first mode, and configured to control a user function of the AM/FM radio tuner when the sound reproduction device is operating in the second mode.

22. The audio system of claim 20 further comprising a plurality of preset buttons, wherein the preset buttons are assignable to a first set of user- defined playlists when the sound reproduction device is configured to operate in the first mode, and assignable to broadcast frequencies of the AM/FM radio tuner when the sound reproduction device is configured to operate in the second mode.

23. The audio system of claim 22 further comprising a scrolling button that, when activated, is configured to assign the plurality of preset buttons to a second set of user-defined playlists.

24. The audio system of claim 1, wherein the connection includes (i) an audio signal path configured to receive the audio information from the computer and from the network via the computer and (ii) a separate signal path configured to transmit to the computer the signals for controlling the computer.

25. The audio system of claim 1 wherein the sound reproduction device is configured to respond to signals received from the computer.

26. The audio system of claim 25 wherein signals to the computer and signals from the computer to the sound reproduction device are transmitted via a signal path of the connector.

27. An audio system configured to connect to a separate computer that has a plurality of user functions, a subset of the user functions relating to control of audio information, the audio system comprising:

(A) a sound reproduction device comprising:
   a housing;
   one or more speakers located at least partially within the housing;
   an amplifier located within the housing for powering the one or more speakers;
   control circuitry located within the housing; and
   a connector located at least partially within the housing that is configured to provide a physical and electrical connection exclusively between the sound reproduction device and the computer, wherein the connection includes one or more signal paths configured to (i) receive audio information from the computer, and (ii) transmit to the computer signals for controlling the computer; and
(B) a remote control device configured to transmit signals representing at least a first type of command from a user and a second type of command from a user to the sound reproduction device, wherein the first type of command is a command to control user function of the sound reproduction device and the second type of command is a command to control a user function of the computer relating to control of audio information,
wherein the control circuitry is configured to receive the signals from the remote control and, in response to receiving such signals:
   (i) control the user function of the sound reproduction device when the user issues a command of the first type, and
   (ii) transmit to the computer, via a signal path of the connector, a signal for controlling the user function of the computer when the user issues a command of the second type.

28. The audio system of claim 27, wherein the computer is a personal computer.

29. The audio system of claim 27, wherein the connector comprises a dedicated cable.

30. The audio system of claim 27, wherein the connector is configured to couple to the computer in close proximity to said sound reproduction device.

31. The audio system of claim 27, wherein the connector is configured to couple to the computer adjacent to said sound reproduction device.

32. The audio system of claim 27 further comprising an AM/FM radio tuner located at least partially within the housing.

33. The audio system of claim 32 further comprising an alarm clock located at least partially within the housing.

34. The audio system of claim 27, wherein the remote control is configured to transmit a signal representing a command selected from the group consisting of commands for controlling the volume of the sound reproduction device, controlling the power setting of the sound reproduction device, and muting the sound of the sound reproduction device.

35. The audio system of claim 32, wherein the remote control is configured to transmit a signal representing a command for selecting the AM/FM radio tuner as the audio source for the sound reproduction device.

36. The audio system of claim 27, wherein the remote control is configured to transmit a signal representing a command for selecting the computer as the audio source for the sound reproduction device.

37. The audio system of claim 27, wherein the remote control is configured to transmit a signal representing a command selected from the group consisting of commands for causing the computer to play a music file, causing the computer to pause the play of a music file, causing the computer to select a playlist, causing the computer to select the next or previous music file, causing the computer to select an assemblage of music files based on a first type of metadata included in the music files, causing the computer to repeat the play of a music file, and causing the computer to shuffle the play of selected music files.

38. The audio system of claim 37, wherein the remote control is configured to transmit a signal representing a command for causing the computer to select an assemblage of music files based on a first type of metadata included in the music files, and the assemblage is based on information about the music genre.

39. The audio system of claim 37, wherein the remote control is configured to transmit a signal representing a command for causing the computer to select an assemblage of music files based on a first type of metadata included in the music files.

40. The audio system of claim 39, wherein the assemblage is based on information about the music artist.

41. The audio system of claim 39, wherein the assemblage is based on information about the album associated with the music files.

42. The audio system of claim 39, wherein the remote control is further configured to transmit a signal representing a command for causing the computer to select a subset of the assemblage of music files based on a second type of metadata included in the music files.

43. The audio system of claim 42, wherein the assemblage is based on information about the music genre, and the subset is based on information about the music artist.

44. The audio system of claim 27, wherein the audio information is in digital form.

45. The audio system of claim 27, wherein the audio information is in analog form.

46. The audio system of claim 27 wherein the sound reproduction device is configured to operate in at least two modes: a first mode wherein the sound reproduction device produces audible sound from audio information received from the computer via the connector; and a second mode wherein the sound reproduction device produces audible sound from the AM/FM radio tuner.

47. The audio system of claim 46 further comprising one or more control buttons on the housing, wherein at least one of the control buttons is configured to control, via the connector, a user function of the computer relating to control of audio information when the sound reproduction device is operating in the first mode, and configured to control a user function of the AM/FM radio tuner when the sound reproduction device is operating in the second mode.

48. The audio system of claim 46 further comprising a plurality of preset buttons, wherein the preset buttons are assignable to a first set of user-defined playlists when the sound reproduction device is configured to operate in the first mode, and assignable to broadcast frequencies of the AM/FM radio tuner when the sound reproduction device is configured to operate in the second mode.

49. The audio system of claim 48 further comprising a scrolling button that, when activated, is configured to assign the plurality of preset buttons to a second set of user-defined playlists.

50. The audio system of claim 27, wherein the connection includes (i) an audio signal path configured to receive the audio information from the computer and (ii) a separate signal path configured to transmit to the computer signals for controlling the computer.

51. The audio system of claim 27, wherein the sound reproduction device is configured to respond to signals received from the computer.

52. The audio system of claim 51, wherein signals to the computer and signals from the computer to the sound reproduction device are transmitted via a signal path of the connector.

53. An audio system configured to connect to a separate computer, the audio system comprising:
(A) a sound reproduction device comprising: a housing;
one or more speakers located at least partially within the housing;
an amplifier located within the housing for powering the one or more speakers;
control circuitry located within the housing; and
a connector located at least partially within the housing that is configured to provide a physical and electrical connection exclusively between the sound reproduction device and the computer, wherein the connection includes one or more signal paths configured to (i) receive audio information from the computer, (ii) transmit to the computer signals for controlling the computer, and (iii) receive signals from the computer; and
(B) a remote control device configured to transmit signals representing at least a first type of command from a user and a second type of command from a user to the sound reproduction device, wherein the first type of command is a command to controla user function of the sound reproduction device and the second type of command is a command to control a user function of the computer,
wherein the control circuitry is configured to receive the signals from the remote control and, in response to receiving such signals:
(i) control the user function of the sound reproduction device when the user issues a command of the first type, and
(ii) transmit to the computer, via a signal path of the connector, a signal for controlling the user function of the computer when the user issues a command of the second type.

54. The audio system of claim 53, wherein the computer is a personal computer.

55. The audio system of claim 53, wherein the connection includes (i) an audio signal path configured to receive the audio information from the computer and (ii) a separate signal path configured to transmit to the computer signals for controlling the computer.

56. The audio system of claim 53, wherein the audio information is in digital form.

57. The audio system of claim 53, wherein the audio information is in analog form.

58. The audio system of claim 53, wherein the audio information comprises digital music files stored on the computer.

59. An audio system configured to connect to a separate computer that has a plurality of user functions, a subset of the user functions relating to control of audio information, and is configured to provide audio information from any one of a plurality of sources, including digital music files stored on the computer and a network accessible by the computer, the audio system comprising:
(A) a sound reproduction device comprising: a housing;
one or more speakers located at least partially within the housing;
an amplifier located within the housing for powering the one or more speakers;
control circuitry located within the housing; and a connector located at least partially within the housing that is configured to provide a physical and electrical connection exclusively between the sound reproduction device and the computer, wherein the connection includes one or more signal paths configured to (i) receive audio information from the computer corresponding to the digital music files stored on the computer and audio information from the network via the computer, (ii) transmit to the computer signals for controlling the computer, and (iii) receive signals from the computer; and (B) a remote control device configured to transmit signals representing at least a first type of command from a user and a second type of command from a user to the sound reproduction device, wherein the first type of command is a command to control a user function of the sound reproduction device and the second type of command is a command to control a user function of the computer, wherein the control circuitry is configured to receive the signals from the remote control and, in response to receiving such signals:
  (i) control the user function of the sound reproduction device when the user issues a command of the first type, and
  (ii) transmit to the computer, via a signal path of the connector, a signal for controlling the user function of the computer when the user issues a command of the second type.

60. The audio system of claim 59, wherein the connection includes (i) an audio signal path configured to receive the audio information from the computer and from the network via the computer and (ii) a separate signal path configured to transmit to the computer signals for controlling the computer.

61. The audio system of claim 59, wherein the audio information is in digital form.

62. The audio system of claim 59, wherein the audio information is in analog form.

63. A system comprising:
(A) a computer having a plurality of user functions, a subset of the user functions relating to control of audio information, and comprising:
  (a) a storage device configured to store a plurality of digital music files, each music file including within the music file at least a first and second type of metadata that characterizes the music file; and
  (b) a display for displaying a user interface configured to present a first assemblage of the plurality of music files in a first set of groups according to the first type of metadata associated with the music files, and, in response to a user selection of a group in the first assemblage, present a second assemblage of the music files in the selected group, wherein the second assemblage presents the music files in the selected group in a second set of groups according to the second type of metadata associated with the music files in the selected group;
(B) a sound reproduction device comprising:
  (a) a housing;
  (b) one or more speakers located at least partially within the housing;
  (c) an amplifier located within the housing for powering the one or more speakers;
  (d) control circuitry located within the housing; and
  (e) a connector located at least partially within the housing that is configured to provide a physical and electrical connection exclusively between the sound reproduction device and the computer, wherein the connection includes one or more signal paths configured to (i) receive audio information from the computer, and (ii) transmit to the computer signals for controlling the computer; and
(C) a remote control device configured to transmit signals representing at least a first type of command from a user and a second type of command from a user to the sound reproduction device, wherein the first type of command is a command to control a user function of the sound reproduction device and the second type of command is a command to control a user function of the computer relating to control of audio information, wherein the control circuitry is configured to receive the signals from the remote control and, in response to receiving such signals:
  (i) control the user function of the sound reproduction device when the user issues a command of the first type, and
  (ii) transmit to the computer, via a signal path of the connector, a signal for controlling the user function of the computer when the user issues a control command of the second type.

64. The system of claim 63, wherein the computer further comprises:
  (a) a processor; and
  (b) instructions stored on a computer-readable media that, when executed, cause the processor to:
    (i) assemble the plurality of music files into a first set of groups based on the first metadata associated with each respective music file; and
    (ii) assemble the plurality of music files into a second set of groups based on the second metadata associated with each respective music file.

65. The system of claim 63, wherein the computer is a personal computer.

66. The system of claim 63, wherein the sound reproduction device is configured to respond to signals received from the computer.

67. The system of claim 66, wherein signals to the computer and signals from the computer to the sound reproduction device are transmitted via a signal path of the connector.

68. The system of claim 63, wherein the computer is further configured to provide audio information from any one of a plurality of sources, including digital music files stored on the computer and a network accessible by the computer; and wherein the sound reproduction device is configured to received, via the connector, audio information from the computer corresponding to the digital music files and audio information from the network.

69. The system of claim 68, wherein the sound reproduction device further includes an audio source.

70. The system of claim 69, wherein the audio source of the sound reproduction device comprises an AM/FM radio tuner.

71. The audio system of claim 1, wherein the computer is a personal computer.

72. The audio system of claim 59, wherein the computer is a personal computer.

73. The audio system of claim 1, wherein the sound reproduction device further comprises a digital to analog converter configured to convert digital audio information from the computer to analog representations of the audio information for reproduction by the sound reproduction device.

74. The audio system of claim 27, wherein the sound reproduction device further comprises a digital to analog converter configured to convert digital audio information from the computer to analog representations of the audio information for reproduction by the sound reproduction device.

75. The audio system of claim 53, wherein the sound reproduction device further comprises a digital to analog converter configured to convert digital audio information from the computer to analog representations of the audio information for reproduction by the sound reproduction device.

76. The audio system of claim 59, wherein the sound reproduction device further comprises a digital to analog converter configured to convert digital audio information from the computer to analog representations of the audio information for reproduction by the sound reproduction device.

77. The system of claim 63, wherein the sound reproduction device further comprises a digital to analog converter configured to convert digital audio information from the computer to analog representations of the audio information for reproduction by the sound reproduction device.

78. A system comprising:
(A) a computer having a plurality of user functions, a subset of the user functions relating to control of audio information, and comprising:
  (a) a processor;
  (b) a display; and
  (c) a storage device configured to store a plurality of digital music files, each music file including within the music file at least a first and second type of metadata that characterizes the music file,
  the storage device further including instructions that, when executed by the processor, present a user interface on the display that shows a first assemblage of the plurality of music files in a first set of groups according to the first type of metadata associated with the music files, and, in response to a user selection of a group in the first assemblage, shows a second assemblage of the music files in the selected group, wherein the second assemblage presents the music files in the selected group in a second set of groups according to the second type of metadata associated with the music files in the selected group;
(B) a sound reproduction device comprising:
  (a) a housing;
  (b) one or more speakers located at least partially within the housing;
  (c) an amplifier located within the housing for powering the one or more speakers;
  (d) control circuitry located within the housing; and (e) a connector located at least partially within the housing that is configured to provide a physical and electrical connection exclusively between the sound reproduction device and the computer, wherein the connection includes one or more signal paths configured to (i) receive audio information from the computer, and (ii) transmit to the computer signals for controlling the computer; and
(C) a remote control device configured to transmit signals representing at least a first type of command from a user and a second type of command from a user to the sound reproduction device, wherein the first type of command is a command to control a user function of the sound reproduction device and the second type of command is a command to control a user function of the computer relating to control of audio information,
wherein the control circuitry is configured to receive the signals from the remote control and, in response to receiving such signals:
  (i) control the user function of the sound reproduction device when the user issues a command of the first type, and
  (ii) transmit to the computer, via a signal path of the connector, a signal for controlling the user function of the computer when the user issues a control command of the second type.

* * * * *